US012627681B2

(12) United States Patent
Sinha et al.

(10) Patent No.: US 12,627,681 B2
(45) Date of Patent: May 12, 2026

(54) RANSOMWARE DETECTION AND/OR REMEDIATION AS A SERVICE IN FILE SERVER SYSTEMS

(71) Applicant: Nutanix, Inc., San Jose, CA (US)

(72) Inventors: Pankaj Kumar Sinha, Fremont, CA (US); Partha Pratim Nayak, San Jose, CA (US); Tushar Dnyandev Adivarekar, Pune (IN)

(73) Assignee: Nutanix, Inc., San Jose, CA (US)

( * ) Notice: Subject to any disclaimer, the term of this patent is extended or adjusted under 35 U.S.C. 154(b) by 4 days.

(21) Appl. No.: 18/499,144

(22) Filed: Oct. 31, 2023

(65) Prior Publication Data

US 2024/0430274 A1     Dec. 26, 2024

(30) Foreign Application Priority Data

Jun. 26, 2023     (IN) .............................. 202311042690

(51) Int. Cl.
*H04L 9/40* (2022.01)

(52) U.S. Cl.
CPC ................................. *H04L 63/1416* (2013.01)

(58) Field of Classification Search
None
See application file for complete search history.

(56) References Cited

U.S. PATENT DOCUMENTS

| | | | |
|---|---|---|---|
| 926,449 | A | 6/1909 | Yampolsky |
| 5,276,867 | A | 1/1994 | Kenley et al. |
| 5,615,363 | A | 3/1997 | Jenness |
| 5,664,144 | A | 9/1997 | Yanai et al. |

| | | | |
|---|---|---|---|
| 5,870,555 | A | 2/1999 | Pruett et al. |
| 5,873,085 | A | 2/1999 | Enoki et al. |
| 5,924,096 | A | 7/1999 | Draper et al. |
| 6,055,543 | A | 4/2000 | Christensen et al. |
| 6,085,234 | A | 7/2000 | Pitts et al. |
| 6,101,508 | A | 8/2000 | Wolff |
| 6,212,531 | B1 | 4/2001 | Blea et al. |
| 6,289,356 | B1 | 9/2001 | Hitz et al. |
| 6,341,340 | B1 | 1/2002 | Tsukerman et al. |
| 6,442,602 | B1 | 8/2002 | Choudhry |
| 6,539,381 | B1 | 3/2003 | Prasad et al. |
| 6,539,382 | B1 | 3/2003 | Byrne et al. |
| 6,963,914 | B1 | 11/2005 | Breitbart et al. |
| 6,968,345 | B1 | 11/2005 | Muhlestein |

(Continued)

FOREIGN PATENT DOCUMENTS

| | | |
|---|---|---|
| CN | 105100210 A | 11/2015 |
| CN | 108090118 A | 5/2018 |
| CN | 110516005 A | 11/2019 |
| CN | 110519112 A | 11/2019 |
| CN | 2019226365 A1 | 11/2019 |
| CN | 110569269 A | 12/2019 |
| CN | 106663056 B | 2/2020 |
| CN | 111078653 A | 4/2020 |
| CN | 112883009 A | 6/2021 |

(Continued)

OTHER PUBLICATIONS

US 11,048,595 B2, 06/2021, Venkatesh et al. (withdrawn)

(Continued)

*Primary Examiner* — Brandon Hoffman
(74) *Attorney, Agent, or Firm* — Stoel Rives LLP

(57) ABSTRACT

Examples of analytics systems may include a cloud based no-touch auto-update mechanism that may have access to ransomware signatures. For example, the service may pull ransomware signatures from a centralized public datastore through APIs and update the ransomware signatures on file servers subscribed to the analytics system.

24 Claims, 7 Drawing Sheets

(56)           References Cited

U.S. PATENT DOCUMENTS

| | | | |
|---|---|---|---|
| 7,120,631 | B1 | 10/2006 | Vahalia et al. |
| 7,146,524 | B2 | 12/2006 | Patel et al. |
| 7,159,056 | B2 | 1/2007 | Goldick |
| 7,162,467 | B2 | 1/2007 | Eshleman et al. |
| 7,356,679 | B1 | 4/2008 | Le et al. |
| 7,366,738 | B2 | 4/2008 | Yorke et al. |
| 7,409,511 | B2 | 8/2008 | Edwards et al. |
| 7,506,213 | B1 | 3/2009 | Cabrera, III et al. |
| 7,548,939 | B2 | 6/2009 | Kalach et al. |
| 7,606,868 | B1 | 10/2009 | Le et al. |
| 7,702,843 | B1 | 4/2010 | Chen et al. |
| 7,725,671 | B2 | 5/2010 | Prahlad et al. |
| 7,739,316 | B2 | 6/2010 | Thompson et al. |
| 7,752,492 | B1 | 7/2010 | Armangau et al. |
| 7,752,669 | B2 | 7/2010 | Palliyil et al. |
| 7,774,391 | B1 | 8/2010 | Le et al. |
| 7,805,469 | B1 | 9/2010 | Nagaralu et al. |
| 7,805,511 | B1 | 9/2010 | Panicker et al. |
| 7,840,533 | B2 | 11/2010 | Prahlad et al. |
| 7,890,529 | B1 | 2/2011 | Srinivasan et al. |
| 7,937,453 | B1 | 5/2011 | Hayden et al. |
| 8,095,810 | B2 | 1/2012 | Matsuzawa et al. |
| 8,095,931 | B1 | 1/2012 | Chen et al. |
| 8,261,268 | B1 | 9/2012 | Forgette |
| 8,352,482 | B2 | 1/2013 | Hansen |
| 8,352,608 | B1 | 1/2013 | Keagy et al. |
| 8,365,167 | B2 | 1/2013 | Beaty et al. |
| 8,396,890 | B2 | 3/2013 | Lim |
| 8,407,448 | B1 | 3/2013 | Hayden et al. |
| 8,447,728 | B2 | 5/2013 | Prahlad et al. |
| 8,463,617 | B2 | 6/2013 | Ranous et al. |
| 8,473,462 | B1 | 6/2013 | Banerjee |
| 8,484,163 | B1 | 7/2013 | Yucel et al. |
| 8,484,356 | B1 | 7/2013 | Douglis et al. |
| 8,510,836 | B1 | 8/2013 | Nachenberg |
| 8,539,076 | B2 | 9/2013 | Nakano et al. |
| 8,543,790 | B2 | 9/2013 | Chen et al. |
| 8,549,518 | B1 | 10/2013 | Aron et al. |
| 8,549,650 | B2 | 10/2013 | Hanson |
| 8,584,239 | B2 | 11/2013 | Aziz et al. |
| 8,601,473 | B1 | 12/2013 | Aron et al. |
| 8,635,351 | B2 | 1/2014 | Astete et al. |
| 8,676,958 | B1 | 3/2014 | Hendon et al. |
| 8,688,660 | B1 | 4/2014 | Sivasubramanian et al. |
| 8,706,692 | B1 | 4/2014 | Luthra et al. |
| 8,725,679 | B2 | 5/2014 | Nair et al. |
| 8,751,515 | B1 | 6/2014 | Xing et al. |
| 8,762,335 | B2 | 6/2014 | Prahlad et al. |
| 8,805,951 | B1 | 8/2014 | Faibish et al. |
| 8,825,848 | B1 | 9/2014 | Dotan et al. |
| 8,838,923 | B2 | 9/2014 | Prahlad et al. |
| 8,843,459 | B1 | 9/2014 | Aston et al. |
| 8,843,997 | B1 | 9/2014 | Hare |
| 8,850,130 | B1 | 9/2014 | Aron et al. |
| 8,863,124 | B1 | 10/2014 | Aron |
| 8,898,668 | B1 | 11/2014 | Costea et al. |
| 8,914,429 | B2 | 12/2014 | Pitts |
| 8,935,563 | B1 | 1/2015 | Rajaa et al. |
| 8,949,557 | B2 | 2/2015 | Kamei et al. |
| 8,966,188 | B1 | 2/2015 | Bardale |
| 8,972,637 | B1 | 3/2015 | Hushon et al. |
| 8,983,952 | B1 | 3/2015 | Zhang et al. |
| 8,984,027 | B1 | 3/2015 | Patwardhan et al. |
| 8,996,783 | B2 | 3/2015 | Huang et al. |
| 9,009,106 | B1 | 4/2015 | Aron et al. |
| 9,043,567 | B1 | 5/2015 | Modukuri et al. |
| 9,069,708 | B2 | 6/2015 | Gill et al. |
| 9,152,628 | B1 | 10/2015 | Stacey et al. |
| 9,154,535 | B1 | 10/2015 | Harris |
| 9,201,698 | B2 | 12/2015 | Ashok et al. |
| 9,201,704 | B2 | 12/2015 | Chang et al. |
| 9,201,887 | B1 | 12/2015 | Earl et al. |
| 9,213,513 | B2 | 12/2015 | Hartz et al. |
| 9,244,674 | B2 | 1/2016 | Waterman et al. |
| 9,244,969 | B1 | 1/2016 | Love et al. |
| 9,256,475 | B1 | 2/2016 | Aron et al. |
| 9,256,612 | B1 | 2/2016 | Bhatt et al. |
| 9,262,449 | B2 | 2/2016 | Amarendran et al. |
| 9,268,586 | B2 | 2/2016 | Voccio et al. |
| 9,274,817 | B1 | 3/2016 | Fan et al. |
| 9,286,298 | B1 | 3/2016 | Gillett |
| 9,292,327 | B1 | 3/2016 | Von Thenen et al. |
| 9,311,327 | B1 | 4/2016 | Xing |
| 9,336,132 | B1 | 5/2016 | Aron et al. |
| 9,336,232 | B1 | 5/2016 | Srivastav et al. |
| 9,348,702 | B2 | 5/2016 | Hsu et al. |
| 9,372,710 | B2 | 6/2016 | Kenchammana-hosekote et al. |
| 9,405,566 | B2 | 8/2016 | Chawla et al. |
| 9,411,628 | B2 | 8/2016 | Bezbaruah et al. |
| 9,430,255 | B1 | 8/2016 | Beda et al. |
| 9,442,952 | B2 | 9/2016 | Preslan et al. |
| 9,448,887 | B1 | 9/2016 | Dayan et al. |
| 9,456,049 | B2 | 9/2016 | Soundararajan et al. |
| 9,483,644 | B1 | 11/2016 | Paithane et al. |
| 9,497,257 | B1 | 11/2016 | Love et al. |
| 9,503,542 | B1 | 11/2016 | Wang et al. |
| 9,513,946 | B2 | 12/2016 | Sevigny et al. |
| 9,535,907 | B1 | 1/2017 | Stringham |
| 9,563,555 | B2 | 2/2017 | Flynn et al. |
| 9,571,561 | B2 | 2/2017 | Jang |
| 9,588,977 | B1 | 3/2017 | Wang et al. |
| 9,619,257 | B1 | 4/2017 | Aron et al. |
| 9,639,428 | B1 | 5/2017 | Boda et al. |
| 9,652,265 | B1 | 5/2017 | Narayanasamy et al. |
| 9,658,899 | B2 | 5/2017 | Jenkins |
| 9,690,670 | B1 | 6/2017 | Paulzagade et al. |
| 9,733,958 | B2 | 8/2017 | Cui et al. |
| 9,740,436 | B2 | 8/2017 | Fiebrich-Kandler et al. |
| 9,740,472 | B1 | 8/2017 | Sohi et al. |
| 9,740,723 | B2 | 8/2017 | Prahlad et al. |
| 9,747,287 | B1 | 8/2017 | Bhardwaj et al. |
| 9,762,460 | B2 | 9/2017 | Pawlowski et al. |
| 9,766,912 | B1 | 9/2017 | Jorgensen |
| 9,772,866 | B1 | 9/2017 | Aron et al. |
| 9,798,573 | B1 | 10/2017 | Koshy |
| 9,838,415 | B2 | 12/2017 | Powers et al. |
| 9,846,701 | B2 | 12/2017 | Faitelson et al. |
| 9,846,706 | B1 | 12/2017 | Basov et al. |
| 9,853,978 | B2 | 12/2017 | Tellvik et al. |
| 9,870,291 | B2 | 1/2018 | Bezbaruah et al. |
| 9,870,370 | B2 | 1/2018 | Faitelson et al. |
| 9,904,724 | B1 | 2/2018 | Chaulk et al. |
| 9,940,154 | B2 | 4/2018 | Ramani et al. |
| 9,946,573 | B2 | 4/2018 | Mcdermott |
| 10,009,215 | B1 | 6/2018 | Shorey |
| 10,025,878 | B1 | 7/2018 | Lefever et al. |
| 10,050,862 | B2 | 8/2018 | Nambiar et al. |
| 10,083,022 | B2 | 9/2018 | Fukui et al. |
| 10,084,873 | B2 | 9/2018 | Dornemann |
| 10,095,506 | B2 | 10/2018 | Venkatesh et al. |
| 10,101,989 | B2 | 10/2018 | Sinha et al. |
| 10,114,706 | B1 | 10/2018 | Chougala et al. |
| 10,127,059 | B2 | 11/2018 | Astete et al. |
| 10,133,619 | B1 | 11/2018 | Nagpal et al. |
| 10,140,115 | B2 | 11/2018 | Fukui et al. |
| 10,152,233 | B2 | 12/2018 | Xu et al. |
| 10,152,606 | B2 | 12/2018 | Faitelson et al. |
| 10,210,048 | B2 | 2/2019 | Sancheti |
| 10,248,657 | B2 | 4/2019 | Prahlad et al. |
| 10,311,153 | B2 | 6/2019 | Mason, Jr. et al. |
| 10,318,743 | B2 | 6/2019 | Sinha et al. |
| 10,394,547 | B2 | 8/2019 | Fukui et al. |
| 10,419,426 | B2 | 9/2019 | Bakshan et al. |
| 10,452,853 | B2 | 10/2019 | Grafi |
| 10,516,688 | B2 | 12/2019 | Tamir et al. |
| 10,521,116 | B2 | 12/2019 | Parthasarathy |
| 10,523,592 | B2 | 12/2019 | Byers et al. |
| 10,530,742 | B2 | 1/2020 | Shah et al. |
| 10,536,482 | B2 | 1/2020 | Gabaev et al. |
| 10,540,164 | B2 | 1/2020 | Bafna et al. |
| 10,540,165 | B2 | 1/2020 | Bafna et al. |
| 10,540,166 | B2 | 1/2020 | Arikatla et al. |
| RE47,896 | E | 3/2020 | Liberman Ben-ami et al. |
| 10,594,582 | B2 | 3/2020 | Joshi et al. |

(56) References Cited

U.S. PATENT DOCUMENTS

| | | |
|---|---|---|
| 10,594,730 B1 | 3/2020 | Summers et al. |
| 10,628,587 B2 | 4/2020 | Stepanek et al. |
| 10,635,558 B2 | 4/2020 | Wu et al. |
| 10,719,305 B2 | 7/2020 | Sinha et al. |
| 10,719,306 B2 | 7/2020 | Deshmukh et al. |
| 10,719,307 B2 | 7/2020 | Kanada et al. |
| 10,728,090 B2 | 7/2020 | Deshmukh et al. |
| 10,762,060 B1 | 9/2020 | Faulkner et al. |
| 10,809,998 B2 | 10/2020 | Venkatesh et al. |
| 10,817,203 B1 | 10/2020 | Anand et al. |
| 10,824,455 B2 | 11/2020 | Arikatla et al. |
| 10,831,465 B2 | 11/2020 | Sharpe et al. |
| 10,838,708 B2 | 11/2020 | Sinha et al. |
| 10,853,486 B2 | 12/2020 | Faitelson et al. |
| 10,855,631 B2 | 12/2020 | Faitelson et al. |
| 10,938,854 B2 | 3/2021 | Strogov et al. |
| 10,949,192 B2 | 3/2021 | Venkatesh et al. |
| 10,949,385 B2 | 3/2021 | Cronan |
| 11,036,690 B2 | 6/2021 | Bhagwat et al. |
| 11,057,422 B2 | 7/2021 | Ranum et al. |
| 11,086,826 B2 | 8/2021 | Thummala et al. |
| 11,106,447 B2 | 8/2021 | Gupta et al. |
| 11,275,755 B2 | 3/2022 | Palus et al. |
| 11,327,844 B1 | 5/2022 | Aquino et al. |
| 11,334,533 B2 | 5/2022 | Kumar et al. |
| 11,341,236 B2 | 5/2022 | Miller et al. |
| 11,347,843 B2 | 5/2022 | Suwad et al. |
| 11,360,860 B2 | 6/2022 | Khandkar et al. |
| 11,372,729 B2 | 6/2022 | Pandey et al. |
| 11,455,290 B1 | 9/2022 | Brahmadesam et al. |
| 11,516,251 B2 | 11/2022 | Zurko et al. |
| 11,537,713 B2 | 12/2022 | Rajasekharan et al. |
| 11,632,394 B1 | 4/2023 | Rodriguez et al. |
| 11,698,965 B2 | 7/2023 | Constantinescu et al. |
| 11,755,736 B1 | 9/2023 | Vasudeva et al. |
| 11,829,607 B2 | 11/2023 | Patnaik et al. |
| 11,934,670 B2 | 3/2024 | Subramanian et al. |
| 11,977,532 B2 | 5/2024 | Liang et al. |
| 12,182,364 B2 | 12/2024 | Parker et al. |
| 12,197,398 B2 | 1/2025 | Tripathi et al. |
| 12,242,455 B2 | 3/2025 | Kotwal et al. |
| 12,248,434 B2 | 3/2025 | Kotwal et al. |
| 12,248,435 B2 | 3/2025 | Sinha et al. |
| 12,367,108 B2 | 7/2025 | Kotwal et al. |
| 2002/0065835 A1 | 5/2002 | Fujisaki |
| 2002/0069196 A1 | 6/2002 | Betros et al. |
| 2002/0120763 A1 | 8/2002 | Miloushev et al. |
| 2002/0174140 A1 | 11/2002 | Peake et al. |
| 2003/0014442 A1 | 1/2003 | Shiigi et al. |
| 2003/0115218 A1 | 6/2003 | Bobbitt et al. |
| 2003/0163597 A1 | 8/2003 | Hellman et al. |
| 2003/0182301 A1 | 9/2003 | Patterson et al. |
| 2003/0195942 A1 | 10/2003 | Muhlestein et al. |
| 2003/0200098 A1 | 10/2003 | Geipel et al. |
| 2004/0030822 A1 | 2/2004 | Rajan et al. |
| 2004/0054777 A1 | 3/2004 | Ackaouy et al. |
| 2004/0078440 A1 | 4/2004 | Potter et al. |
| 2004/0103104 A1 | 5/2004 | Hara et al. |
| 2004/0181425 A1 | 9/2004 | Schwerin-wenzel et al. |
| 2004/0199734 A1 | 10/2004 | Rajamani et al. |
| 2004/0210591 A1 | 10/2004 | Hirschfeld et al. |
| 2004/0225742 A1 | 11/2004 | Loaiza et al. |
| 2004/0267832 A1 | 12/2004 | Wong et al. |
| 2005/0022122 A1 | 1/2005 | Barrus et al. |
| 2005/0044197 A1 | 2/2005 | Lai |
| 2005/0120160 A1 | 6/2005 | Plouffe et al. |
| 2005/0120180 A1 | 6/2005 | Schornbach et al. |
| 2005/0125503 A1 | 6/2005 | Iyengar et al. |
| 2005/0172078 A1 | 8/2005 | Wu et al. |
| 2005/0193043 A1 | 9/2005 | Hoover |
| 2005/0193221 A1 | 9/2005 | Yoneyama |
| 2005/0193245 A1 | 9/2005 | Hayden et al. |
| 2005/0226059 A1 | 10/2005 | Kavuri et al. |
| 2005/0228798 A1 | 10/2005 | Shepard et al. |
| 2005/0267941 A1 | 12/2005 | Addante et al. |
| 2006/0010227 A1 | 1/2006 | Atluri |
| 2006/0047685 A1 | 3/2006 | Dearing et al. |
| 2006/0053139 A1 | 3/2006 | Marzinski et al. |
| 2006/0080445 A1 | 4/2006 | Chang et al. |
| 2006/0167921 A1 | 7/2006 | Grebus et al. |
| 2006/0206536 A1 | 9/2006 | Sawdon et al. |
| 2006/0206901 A1 | 9/2006 | Chan |
| 2006/0224918 A1 | 10/2006 | Koike |
| 2006/0225065 A1 | 10/2006 | Chandhok et al. |
| 2006/0235850 A1 | 10/2006 | Hazelwood et al. |
| 2006/0271510 A1 | 11/2006 | Harward et al. |
| 2006/0271931 A1 | 11/2006 | Harris et al. |
| 2007/0022129 A1 | 1/2007 | Bahar et al. |
| 2007/0038913 A1 | 2/2007 | Allen et al. |
| 2007/0088669 A1 | 4/2007 | Jaschek et al. |
| 2007/0100905 A1 | 5/2007 | Masters et al. |
| 2007/0171921 A1 | 7/2007 | Wookey et al. |
| 2007/0179995 A1 | 8/2007 | Prahlad et al. |
| 2007/0180302 A1 | 8/2007 | Allen et al. |
| 2007/0185934 A1 | 8/2007 | Cannon et al. |
| 2007/0198550 A1 | 8/2007 | Irving et al. |
| 2007/0244899 A1 | 10/2007 | Faitelson et al. |
| 2007/0250671 A1 | 10/2007 | Lyon |
| 2007/0250930 A1 | 10/2007 | Aziz et al. |
| 2007/0276823 A1* | 11/2007 | Borden .............. G06Q 20/3825 |
| | | 707/999.005 |
| 2007/0300220 A1 | 12/2007 | Seliger et al. |
| 2008/0040388 A1 | 2/2008 | Petri et al. |
| 2008/0040483 A1 | 2/2008 | Nakatani et al. |
| 2008/0071997 A1 | 3/2008 | Loaiza et al. |
| 2008/0098194 A1 | 4/2008 | Hashimoto et al. |
| 2008/0104349 A1 | 5/2008 | Maruyama et al. |
| 2008/0104589 A1 | 5/2008 | Mccrory et al. |
| 2008/0133486 A1 | 6/2008 | Fitzgerald et al. |
| 2008/0134178 A1 | 6/2008 | Fitzgerald et al. |
| 2008/0189468 A1 | 8/2008 | Schmidt et al. |
| 2008/0201414 A1 | 8/2008 | Amir et al. |
| 2008/0201457 A1 | 8/2008 | London |
| 2008/0208909 A1 | 8/2008 | Rowley |
| 2008/0244222 A1 | 10/2008 | Supalov et al. |
| 2008/0256138 A1 | 10/2008 | Sim-tang |
| 2008/0270677 A1 | 10/2008 | Kolakowski |
| 2008/0282350 A1 | 11/2008 | Khilnani et al. |
| 2008/0320499 A1 | 12/2008 | Suit |
| 2008/0320583 A1 | 12/2008 | Sharma et al. |
| 2009/0006801 A1 | 1/2009 | Shultz et al. |
| 2009/0037430 A1 | 2/2009 | Mukkamala et al. |
| 2009/0100248 A1 | 4/2009 | Kami |
| 2009/0158082 A1 | 6/2009 | Jain et al. |
| 2009/0171971 A1 | 7/2009 | Goddard et al. |
| 2009/0193272 A1 | 7/2009 | Matsuzawa et al. |
| 2009/0216975 A1 | 8/2009 | Halperin et al. |
| 2009/0228889 A1 | 9/2009 | Yoshida |
| 2009/0248870 A1 | 10/2009 | Kamei et al. |
| 2009/0249470 A1 | 10/2009 | Litvin et al. |
| 2009/0254572 A1 | 10/2009 | Redlich et al. |
| 2009/0265780 A1 | 10/2009 | Korkus et al. |
| 2009/0271412 A1 | 10/2009 | Lacapra et al. |
| 2009/0287887 A1 | 11/2009 | Matsuki et al. |
| 2009/0288084 A1 | 11/2009 | Astete et al. |
| 2010/0023521 A1 | 1/2010 | Arcese et al. |
| 2010/0027552 A1 | 2/2010 | Hill |
| 2010/0030825 A1 | 2/2010 | Matsuzawa et al. |
| 2010/0070725 A1 | 3/2010 | Prahlad et al. |
| 2010/0082716 A1 | 4/2010 | Agetsuma et al. |
| 2010/0082774 A1 | 4/2010 | Pitts |
| 2010/0095289 A1 | 4/2010 | Nguyen et al. |
| 2010/0138921 A1 | 6/2010 | Na et al. |
| 2010/0161657 A1 | 6/2010 | Cha et al. |
| 2010/0162268 A1 | 6/2010 | Thomas et al. |
| 2010/0169392 A1 | 7/2010 | Lev et al. |
| 2010/0174745 A1 | 7/2010 | Ryan et al. |
| 2010/0214908 A1 | 8/2010 | Ralev |
| 2010/0241785 A1 | 9/2010 | Chen et al. |
| 2010/0250824 A1 | 9/2010 | Belay |
| 2010/0275205 A1 | 10/2010 | Nakajima |
| 2011/0010560 A1 | 1/2011 | Etchegoyen |
| 2011/0022694 A1 | 1/2011 | Dalal et al. |
| 2011/0022695 A1 | 1/2011 | Dalal et al. |

(56) References Cited

U.S. PATENT DOCUMENTS

| | | |
|---|---|---|
| 2011/0022812 A1 | 1/2011 | Van et al. |
| 2011/0022883 A1 | 1/2011 | Hansen |
| 2011/0047340 A1 | 2/2011 | Olson et al. |
| 2011/0047525 A1 | 2/2011 | Castellanos et al. |
| 2011/0078318 A1 | 3/2011 | Desai et al. |
| 2011/0119763 A1 | 5/2011 | Wade et al. |
| 2011/0125835 A1 | 5/2011 | Soltis |
| 2011/0137879 A1 | 6/2011 | Dubey et al. |
| 2011/0161299 A1 | 6/2011 | Prahlad et al. |
| 2011/0178831 A1 | 7/2011 | Ravichandran |
| 2011/0179414 A1 | 7/2011 | Goggin et al. |
| 2011/0184993 A1 | 7/2011 | Chawla et al. |
| 2011/0185292 A1 | 7/2011 | Chawla et al. |
| 2011/0196899 A1 | 8/2011 | Hughes et al. |
| 2011/0225574 A1 | 9/2011 | Khalidi et al. |
| 2011/0239213 A1 | 9/2011 | Aswani et al. |
| 2011/0251992 A1 | 10/2011 | Bethlehem et al. |
| 2011/0252208 A1 | 10/2011 | Ali et al. |
| 2011/0255538 A1 | 10/2011 | Srinivasan et al. |
| 2011/0265076 A1 | 10/2011 | Thorat et al. |
| 2011/0271279 A1 | 11/2011 | Pate |
| 2011/0276578 A1 | 11/2011 | Allalouf et al. |
| 2011/0276656 A1 | 11/2011 | Knapp et al. |
| 2011/0276963 A1 | 11/2011 | Wu et al. |
| 2011/0283277 A1 | 11/2011 | Castillo et al. |
| 2011/0289561 A1 | 11/2011 | Ivanov et al. |
| 2011/0295806 A1 | 12/2011 | Erofeev |
| 2011/0307729 A1 | 12/2011 | Matsuzawa et al. |
| 2011/0320690 A1 | 12/2011 | Petersen et al. |
| 2012/0005440 A1 | 1/2012 | Nakao et al. |
| 2012/0011401 A1 | 1/2012 | Ranganathan et al. |
| 2012/0017114 A1 | 1/2012 | Timashev et al. |
| 2012/0023495 A1 | 1/2012 | Machida |
| 2012/0030456 A1 | 2/2012 | Wu et al. |
| 2012/0054546 A1 | 3/2012 | Kampouris et al. |
| 2012/0054736 A1 | 3/2012 | Arcese et al. |
| 2012/0081395 A1 | 4/2012 | Adi et al. |
| 2012/0084381 A1 | 4/2012 | Alladi et al. |
| 2012/0151484 A1 | 6/2012 | Frank et al. |
| 2012/0166866 A1 | 6/2012 | Rao et al. |
| 2012/0233463 A1 | 9/2012 | Holt et al. |
| 2012/0254445 A1 | 10/2012 | Kawamoto et al. |
| 2012/0254567 A1 | 10/2012 | Umbehocker |
| 2012/0266162 A1 | 10/2012 | Baron |
| 2012/0272237 A1 | 10/2012 | Baron |
| 2012/0278473 A1 | 11/2012 | Griffiths |
| 2012/0290630 A1 | 11/2012 | Aizman et al. |
| 2012/0304247 A1 | 11/2012 | Badger et al. |
| 2012/0310881 A1 | 12/2012 | Shadmon |
| 2012/0310892 A1 | 12/2012 | Dam et al. |
| 2012/0324183 A1 | 12/2012 | Chiruvolu et al. |
| 2013/0006938 A1 | 1/2013 | Prahlad et al. |
| 2013/0046740 A1 | 2/2013 | Li et al. |
| 2013/0047160 A1 | 2/2013 | Conover |
| 2013/0055018 A1 | 2/2013 | Joshi et al. |
| 2013/0061110 A1 | 3/2013 | Zvibel |
| 2013/0061167 A1 | 3/2013 | Rhodes et al. |
| 2013/0066930 A1 | 3/2013 | Kamei et al. |
| 2013/0117744 A1 | 5/2013 | Klein et al. |
| 2013/0132674 A1 | 5/2013 | Sundrani |
| 2013/0145222 A1 | 6/2013 | Birdsall |
| 2013/0151888 A1 | 6/2013 | Bhattiprolu et al. |
| 2013/0152085 A1 | 6/2013 | D'Amore et al. |
| 2013/0185716 A1 | 7/2013 | Yin et al. |
| 2013/0198738 A1 | 8/2013 | Reddin et al. |
| 2013/0212345 A1 | 8/2013 | Nakajima |
| 2013/0227379 A1 | 8/2013 | Gupta et al. |
| 2013/0227552 A1 | 8/2013 | Reddin et al. |
| 2013/0227566 A1 | 8/2013 | Higuchi et al. |
| 2013/0232491 A1 | 9/2013 | Radhakrishnan et al. |
| 2013/0246335 A1 | 9/2013 | Ahuja et al. |
| 2013/0246705 A1 | 9/2013 | Diare |
| 2013/0247036 A1 | 9/2013 | Fujiwara |
| 2013/0262396 A1 | 10/2013 | Kripalani et al. |
| 2013/0283267 A1 | 10/2013 | Cooper et al. |
| 2013/0297869 A1 | 11/2013 | Mills et al. |
| 2014/0006708 A1 | 1/2014 | Huynh et al. |
| 2014/0025796 A1 | 1/2014 | Mbhor et al. |
| 2014/0041044 A1 | 2/2014 | Hymel et al. |
| 2014/0059392 A1 | 2/2014 | Ren et al. |
| 2014/0089354 A1 | 3/2014 | Gonsalves et al. |
| 2014/0095544 A1 | 4/2014 | Eshel et al. |
| 2014/0095555 A1 | 4/2014 | Kim et al. |
| 2014/0095816 A1 | 4/2014 | Hsu et al. |
| 2014/0115182 A1 | 4/2014 | Sabaa et al. |
| 2014/0123138 A1 | 5/2014 | Lee et al. |
| 2014/0146055 A1 | 5/2014 | Bala et al. |
| 2014/0149794 A1 | 5/2014 | Shetty et al. |
| 2014/0149983 A1 | 5/2014 | Bonilla et al. |
| 2014/0173199 A1 | 6/2014 | Gupta et al. |
| 2014/0181116 A1 | 6/2014 | Wang |
| 2014/0188808 A1 | 7/2014 | Wolf et al. |
| 2014/0189429 A1 | 7/2014 | Gill et al. |
| 2014/0189677 A1 | 7/2014 | Curzi et al. |
| 2014/0189685 A1 | 7/2014 | Kripalani |
| 2014/0189686 A1 | 7/2014 | Masters et al. |
| 2014/0195485 A1 | 7/2014 | Dorman |
| 2014/0196038 A1 | 7/2014 | Kottomtharayil et al. |
| 2014/0201177 A1 | 7/2014 | Suryanarayan et al. |
| 2014/0201725 A1 | 7/2014 | Tian et al. |
| 2014/0207824 A1 | 7/2014 | Brandwine et al. |
| 2014/0230024 A1 | 8/2014 | Uehara et al. |
| 2014/0237464 A1 | 8/2014 | Waterman et al. |
| 2014/0250300 A1 | 9/2014 | Runkis et al. |
| 2014/0279909 A1 | 9/2014 | Sudarsanam et al. |
| 2014/0310710 A1 | 10/2014 | Lubsey et al. |
| 2014/0337576 A1 | 11/2014 | Burton et al. |
| 2014/0359612 A1 | 12/2014 | D'Amato et al. |
| 2014/0372717 A1 | 12/2014 | Ciu et al. |
| 2015/0006788 A1 | 1/2015 | Liu et al. |
| 2015/0007172 A1 | 1/2015 | Hudzia et al. |
| 2015/0007180 A1 | 1/2015 | Sharp et al. |
| 2015/0026682 A1 | 1/2015 | Singh et al. |
| 2015/0032690 A1 | 1/2015 | Hoque et al. |
| 2015/0039735 A1 | 2/2015 | Zeyliger et al. |
| 2015/0039837 A1 | 2/2015 | Quan et al. |
| 2015/0081644 A1 | 3/2015 | Pitts |
| 2015/0082432 A1 | 3/2015 | Eaton et al. |
| 2015/0095788 A1 | 4/2015 | Thiele et al. |
| 2015/0106802 A1 | 4/2015 | Ivanov et al. |
| 2015/0124622 A1 | 5/2015 | Kovvali et al. |
| 2015/0142745 A1 | 5/2015 | Tekade et al. |
| 2015/0142747 A1 | 5/2015 | Zou |
| 2015/0178019 A1 | 6/2015 | Hegdal et al. |
| 2015/0205639 A1 | 7/2015 | Matsumoto et al. |
| 2015/0207815 A1 | 7/2015 | Cai et al. |
| 2015/0213032 A1 | 7/2015 | Powell et al. |
| 2015/0220324 A1 | 8/2015 | Arcese et al. |
| 2015/0229656 A1 | 8/2015 | Shieh |
| 2015/0234885 A1 | 8/2015 | Weinstein et al. |
| 2015/0242291 A1 | 8/2015 | Chang et al. |
| 2015/0278046 A1 | 10/2015 | Zellermayer et al. |
| 2015/0293830 A1 | 10/2015 | Bhide et al. |
| 2015/0293896 A1 | 10/2015 | Runkis et al. |
| 2015/0301903 A1 | 10/2015 | Mutha et al. |
| 2015/0324217 A1 | 11/2015 | Shilmover et al. |
| 2015/0326531 A1 | 11/2015 | Cui et al. |
| 2015/0331757 A1 | 11/2015 | Durge et al. |
| 2015/0347440 A1 | 12/2015 | Habouzit et al. |
| 2015/0347542 A1 | 12/2015 | Sullivan et al. |
| 2015/0356094 A1 | 12/2015 | Gorelik |
| 2015/0378761 A1 | 12/2015 | Sevigny et al. |
| 2016/0055065 A1 | 2/2016 | Haustein et al. |
| 2016/0063272 A1 | 3/2016 | Sharma et al. |
| 2016/0070492 A1 | 3/2016 | Cherubini et al. |
| 2016/0077988 A1 | 3/2016 | Tipton et al. |
| 2016/0078068 A1 | 3/2016 | Agrawal et al. |
| 2016/0085480 A1 | 3/2016 | Chiu et al. |
| 2016/0085574 A1 | 3/2016 | Dornemann et al. |
| 2016/0087861 A1 | 3/2016 | Kuan et al. |
| 2016/0110214 A1 | 4/2016 | Vincent et al. |
| 2016/0110267 A1 | 4/2016 | Earl et al. |
| 2016/0124665 A1 | 5/2016 | Jain et al. |
| 2016/0162371 A1 | 6/2016 | Prabhu et al. |

(56) References Cited

U.S. PATENT DOCUMENTS

| | | |
|---|---|---|
| 2016/0171241 A1 | 6/2016 | Yun |
| 2016/0179416 A1 | 6/2016 | Mutha et al. |
| 2016/0179419 A1 | 6/2016 | Yamaguchi et al. |
| 2016/0188232 A1 | 6/2016 | Ramachandran et al. |
| 2016/0188407 A1 | 6/2016 | Bronnikov et al. |
| 2016/0202916 A1 | 7/2016 | Cui et al. |
| 2016/0210204 A1 | 7/2016 | Clark et al. |
| 2016/0216993 A1 | 7/2016 | Beckwith et al. |
| 2016/0224363 A1 | 8/2016 | Joy |
| 2016/0301766 A1 | 10/2016 | Ionescu et al. |
| 2016/0321291 A1 | 11/2016 | Malhotra et al. |
| 2016/0328226 A1 | 11/2016 | Arya et al. |
| 2016/0335134 A1 | 11/2016 | Gupta et al. |
| 2016/0357611 A1 | 12/2016 | Sapuram et al. |
| 2016/0359697 A1 | 12/2016 | Scheib et al. |
| 2016/0359887 A1 | 12/2016 | Yadav et al. |
| 2016/0378528 A1 | 12/2016 | Zamir |
| 2016/0378616 A1 | 12/2016 | Wigmore et al. |
| 2017/0004131 A1 | 1/2017 | Ben Dayan et al. |
| 2017/0005990 A1 | 1/2017 | Birger et al. |
| 2017/0012904 A1 | 1/2017 | Matzek et al. |
| 2017/0019457 A1 | 1/2017 | Latha R et al. |
| 2017/0024152 A1 | 1/2017 | Bhagi et al. |
| 2017/0024224 A1 | 1/2017 | Bakke et al. |
| 2017/0034189 A1* | 2/2017 | Powell .................. H04L 63/145 |
| 2017/0039078 A1 | 2/2017 | Chen et al. |
| 2017/0039218 A1 | 2/2017 | Prahlad et al. |
| 2017/0048223 A1 | 2/2017 | Anantha Padmanaban et al. |
| 2017/0063907 A1 | 3/2017 | Muddu et al. |
| 2017/0068469 A1 | 3/2017 | Shankar et al. |
| 2017/0075921 A1 | 3/2017 | Benton et al. |
| 2017/0090776 A1 | 3/2017 | Kowles |
| 2017/0091047 A1 | 3/2017 | Bangalore et al. |
| 2017/0109184 A1 | 4/2017 | Ramani et al. |
| 2017/0115909 A1 | 4/2017 | Wade et al. |
| 2017/0116050 A1 | 4/2017 | Thukkaram et al. |
| 2017/0116210 A1 | 4/2017 | Park et al. |
| 2017/0142134 A1 | 5/2017 | Gilbert |
| 2017/0147446 A1 | 5/2017 | Zhang et al. |
| 2017/0160983 A1 | 6/2017 | Fiske et al. |
| 2017/0177638 A1 | 6/2017 | Bhosale et al. |
| 2017/0206074 A1 | 7/2017 | Arcese et al. |
| 2017/0206207 A1 | 7/2017 | Bondurant et al. |
| 2017/0208113 A1 | 7/2017 | Douros et al. |
| 2017/0220661 A1 | 8/2017 | Cao et al. |
| 2017/0223031 A1 | 8/2017 | Gu et al. |
| 2017/0228300 A1 | 8/2017 | Thomas et al. |
| 2017/0235507 A1 | 8/2017 | Sinha et al. |
| 2017/0235562 A1 | 8/2017 | Bafna et al. |
| 2017/0235563 A1 | 8/2017 | Bafna et al. |
| 2017/0235589 A1 | 8/2017 | Gopalapura Venkatesh et al. |
| 2017/0235590 A1 | 8/2017 | Sinha et al. |
| 2017/0235591 A1 | 8/2017 | Kanada et al. |
| 2017/0235653 A1 | 8/2017 | Arikatla et al. |
| 2017/0235654 A1 | 8/2017 | Deshmukh et al. |
| 2017/0235751 A1 | 8/2017 | Gupta et al. |
| 2017/0235758 A1 | 8/2017 | Gopalapura Venkatesh et al. |
| 2017/0235760 A1 | 8/2017 | Sharpe et al. |
| 2017/0235761 A1 | 8/2017 | Bafna et al. |
| 2017/0235762 A1 | 8/2017 | Sharpe et al. |
| 2017/0235763 A1 | 8/2017 | Ventatesh et al. |
| 2017/0235764 A1 | 8/2017 | Sharpe et al. |
| 2017/0235950 A1 | 8/2017 | Gopalapura Venkatesh et al. |
| 2017/0237529 A1 | 8/2017 | Eriksson et al. |
| 2017/0242599 A1 | 8/2017 | Patnaik et al. |
| 2017/0262346 A1 | 9/2017 | Pradhan et al. |
| 2017/0277556 A1 | 9/2017 | Ishii et al. |
| 2017/0277903 A1 | 9/2017 | Christodorescu et al. |
| 2017/0279674 A1 | 9/2017 | Zhu |
| 2017/0286228 A1 | 10/2017 | Redko et al. |
| 2017/0286442 A1 | 10/2017 | Xie et al. |
| 2017/0302589 A1 | 10/2017 | Leafe et al. |
| 2017/0371724 A1 | 12/2017 | Wagner et al. |
| 2018/0004509 A1 | 1/2018 | Narasimhan et al. |
| 2018/0004656 A1 | 1/2018 | Battaje et al. |
| 2018/0004766 A1 | 1/2018 | Darling |
| 2018/0039649 A1 | 2/2018 | Fine et al. |
| 2018/0062993 A1 | 3/2018 | Wu et al. |
| 2018/0089224 A1 | 3/2018 | Muthuswamy et al. |
| 2018/0089226 A1 | 3/2018 | Ben Dayan et al. |
| 2018/0107674 A1 | 4/2018 | Cantwell et al. |
| 2018/0121035 A1 | 5/2018 | Filippi et al. |
| 2018/0129426 A1 | 5/2018 | Aron et al. |
| 2018/0137014 A1 | 5/2018 | Li et al. |
| 2018/0143845 A1 | 5/2018 | Chawla et al. |
| 2018/0145960 A1 | 5/2018 | Bakshan et al. |
| 2018/0157521 A1 | 6/2018 | Arikatla et al. |
| 2018/0157522 A1 | 6/2018 | Bafna et al. |
| 2018/0157561 A1 | 6/2018 | Venkatesh et al. |
| 2018/0157677 A1 | 6/2018 | Bafna et al. |
| 2018/0157752 A1 | 6/2018 | Arikatla et al. |
| 2018/0157860 A1 | 6/2018 | Nair et al. |
| 2018/0159729 A1 | 6/2018 | Deshmukh et al. |
| 2018/0159826 A1 | 6/2018 | Msan et al. |
| 2018/0173731 A1 | 6/2018 | Nazari et al. |
| 2018/0205787 A1 | 7/2018 | Ben Dayan et al. |
| 2018/0253192 A1 | 9/2018 | Varadharajan et al. |
| 2018/0276390 A1 | 9/2018 | Grafi |
| 2018/0278602 A1 | 9/2018 | Koushik et al. |
| 2018/0287902 A1 | 10/2018 | Chitalia et al. |
| 2018/0330108 A1 | 11/2018 | Gordon et al. |
| 2018/0332105 A1 | 11/2018 | Huang et al. |
| 2018/0349703 A1 | 12/2018 | Rathod |
| 2018/0357251 A1 | 12/2018 | Kumarasamy et al. |
| 2018/0367557 A1 | 12/2018 | Brown et al. |
| 2018/0373762 A1 | 12/2018 | Faitelson et al. |
| 2019/0026101 A1 | 1/2019 | Venkatesh et al. |
| 2019/0034240 A1 | 1/2019 | Nabi et al. |
| 2019/0034453 A1 | 1/2019 | Jarvis et al. |
| 2019/0073265 A1 | 3/2019 | Brennan et al. |
| 2019/0079747 A1 | 3/2019 | Sinha et al. |
| 2019/0108340 A1 | 4/2019 | Bedhapudi et al. |
| 2019/0109870 A1 | 4/2019 | Bedhapudi et al. |
| 2019/0129808 A1 | 5/2019 | Acharya et al. |
| 2019/0171527 A1 | 6/2019 | Mutalik et al. |
| 2019/0179711 A1 | 6/2019 | Luo et al. |
| 2019/0182294 A1 | 6/2019 | Rieke et al. |
| 2019/0196718 A1 | 6/2019 | Pai et al. |
| 2019/0207925 A1 | 7/2019 | Anantha Padmanaban et al. |
| 2019/0303571 A1 | 10/2019 | Chelarescu et al. |
| 2019/0332683 A1 | 10/2019 | Thummala et al. |
| 2019/0347418 A1 | 11/2019 | Strogov et al. |
| 2019/0354513 A1 | 11/2019 | Kumar et al. |
| 2019/0370227 A1 | 12/2019 | Gupta et al. |
| 2019/0370360 A1 | 12/2019 | Mainali et al. |
| 2019/0392053 A1 | 12/2019 | Chalakov et al. |
| 2020/0004962 A1 | 1/2020 | Araujo et al. |
| 2020/0007530 A1 | 1/2020 | Mohamad Abdul et al. |
| 2020/0026612 A1 | 1/2020 | Ben Dayan et al. |
| 2020/0034069 A1 | 1/2020 | Batra et al. |
| 2020/0036647 A1 | 1/2020 | Gupta et al. |
| 2020/0081704 A1 | 3/2020 | Bafna et al. |
| 2020/0081733 A1 | 3/2020 | Buck et al. |
| 2020/0125580 A1 | 4/2020 | Shao |
| 2020/0137157 A1 | 4/2020 | Joseph et al. |
| 2020/0174975 A1 | 6/2020 | Shaw et al. |
| 2020/0218614 A1 | 7/2020 | Adduri et al. |
| 2020/0241972 A1 | 7/2020 | Dain et al. |
| 2020/0250306 A1 | 8/2020 | Pendyala et al. |
| 2020/0272492 A1 | 8/2020 | Guturi et al. |
| 2020/0274869 A1 | 8/2020 | Tahenakos et al. |
| 2020/0301880 A1 | 9/2020 | George et al. |
| 2020/0302081 A1 | 9/2020 | Faitelson et al. |
| 2020/0358621 A1 | 11/2020 | Ngo |
| 2020/0380000 A1 | 12/2020 | Busjaeger et al. |
| 2020/0396286 A1 | 12/2020 | Nallathambi et al. |
| 2021/0004353 A1 | 1/2021 | Jain et al. |
| 2021/0044604 A1 | 2/2021 | Annen et al. |
| 2021/0097181 A1* | 4/2021 | Reid ..................... G06F 21/565 |
| 2021/0141630 A1 | 5/2021 | Sharpe et al. |
| 2021/0152581 A1 | 5/2021 | Hen et al. |
| 2021/0160257 A1 | 5/2021 | Elyashiv et al. |
| 2021/0165783 A1 | 6/2021 | Deshpande et al. |
| 2021/0182392 A1 | 6/2021 | Hargrove |

(56) References Cited

U.S. PATENT DOCUMENTS

| | | | |
|---|---|---|---|
| 2021/0200641 A1 | 7/2021 | Bafna et al. |
| 2021/0216234 A1 | 7/2021 | Singler et al. |
| 2021/0224233 A1 | 7/2021 | Bafna et al. |
| 2021/0226998 A1 | 7/2021 | Narayanaswamy et al. |
| 2021/0247973 A1 | 8/2021 | Gupta et al. |
| 2021/0255926 A1 | 8/2021 | Wang et al. |
| 2021/0266329 A1 | 8/2021 | Fuhry et al. |
| 2021/0279227 A1 | 9/2021 | Peercy et al. |
| 2021/0303537 A1 | 9/2021 | Liang et al. |
| 2021/0349859 A1 | 11/2021 | Bafna et al. |
| 2021/0365257 A1 | 11/2021 | Venkatesh et al. |
| 2021/0390080 A1 | 12/2021 | Tripathi et al. |
| 2021/0397587 A1 | 12/2021 | Thummala et al. |
| 2021/0406136 A1 | 12/2021 | Venkatesh et al. |
| 2022/0004377 A1 | 1/2022 | Sharpe et al. |
| 2022/0012134 A1 | 1/2022 | Chatterjee et al. |
| 2022/0114006 A1 | 4/2022 | Raghavan et al. |
| 2022/0131879 A1 | 4/2022 | Naik et al. |
| 2022/0188719 A1 | 6/2022 | Ramaswamy et al. |
| 2022/0197748 A1 | 6/2022 | Behera et al. |
| 2022/0210093 A1 | 6/2022 | Kumar et al. |
| 2022/0253783 A1 | 8/2022 | Mookherjee |
| 2022/0300335 A1 | 9/2022 | Venkatesh et al. |
| 2022/0318099 A1 | 10/2022 | Kotwal et al. |
| 2022/0318203 A1 | 10/2022 | Kotwal et al. |
| 2022/0318204 A1 | 10/2022 | Sinha et al. |
| 2022/0318208 A1 | 10/2022 | Tripathi et al. |
| 2022/0342866 A1 | 10/2022 | Kotwal |
| 2023/0039072 A1 | 2/2023 | Shomo et al. |
| 2023/0142344 A1 | 5/2023 | Nakar |
| 2023/0289443 A1 | 9/2023 | Sinha et al. |
| 2023/0325353 A1 | 10/2023 | Gursha et al. |
| 2024/0111716 A1 | 4/2024 | Gupta et al. |
| 2024/0111733 A1 | 4/2024 | Pathak et al. |
| 2024/0168923 A1 | 5/2024 | Sinha et al. |

FOREIGN PATENT DOCUMENTS

| | | | |
|---|---|---|---|
| CN | 114840487 A | 8/2022 |
| CN | 115314320 A | 11/2022 |
| CN | 115827556 A | 3/2023 |
| EP | 1039380 B1 | 9/2000 |
| EP | 1145496 B1 | 10/2001 |
| EP | 1189138 A2 | 3/2002 |
| EP | 1062581 B1 | 10/2003 |
| EP | 1214663 B1 | 6/2006 |
| EP | 1677188 A3 | 7/2006 |
| EP | 1979814 B1 | 10/2008 |
| EP | 2759942 A1 | 7/2014 |
| EP | 2179371 B1 | 4/2019 |
| KR | 102024142 B1 | 9/2019 |
| WO | 2010050944 A1 | 5/2010 |
| WO | 2012058482 A1 | 5/2012 |
| WO | 2012126177 A2 | 9/2012 |
| WO | 2016014035 A1 | 1/2016 |
| WO | 2016018446 A1 | 2/2016 |
| WO | 2017196974 A1 | 11/2017 |
| WO | 2017223265 A1 | 12/2017 |
| WO | 2018014650 A1 | 1/2018 |
| WO | 2020190669 A1 | 9/2020 |
| WO | 2021082157 A1 | 5/2021 |
| WO | 2021089196 A1 | 5/2021 |

OTHER PUBLICATIONS

U.S. Appl. No. 18/183,883 titled "Data Analytics Systems for File Systems Including Examples of Path Generation" filed Mar. 13, 2023.

Isilon OneFS, Version 8.0.1; Web Administration Guide, Oct. 2016.

Dell EMC; Dell EMC Isilon OneFS Operating System; Scale-out NAS to maximize the data capital and business value of your unstructured data, 2020, pp. all.

Dell EMC; White Paper; Dell EMC Isilon Onefs Operating System; Powering the Isilon Scale-Out Storage Platform, Dec. 2019, pp. all.

"Administering VMware vSAN—VMware vSphere 7.0", Update 1; docs.vmware.com/en/VMware-vSphere/7.0/vsan-701-administration-guide.pdf, 2015-2020, pp. 1-114.

"Backup vSAN 7 File Share with Veeam Backup & Replication 10", Sysadmin Stories, https://www.sysadminstories.com/2020/06/backup-vsan-7-file-share-with-veeam.html, Jun. 2, 2020, pp. 1-7.

"Characteristics of a vSAN Cluster", VMWare Docs; retrieved from: https://docs.vmware.com/en/VMware-vSphere/7.0/com.vmware.vsphere.vsan-planning.doc/GUID-C0818534-7B96-43E4-93BB-7955449852DE.html, May 31, 2019, pp. 1-2.

"Cisco Ransomware Defense", https://www.cisco.com/c/dam/global/en_ca/assets/pdfs/at-a-glance-c45-737465.pdf., 2016, pp. 1-2.

"Citrix XenDesktop 7.1 on Microsoft Hyper-V Server 2012 R2 on Nutanix Virtual Computing Platform", Citrix APAC Solutions, Jun. 25, 2014, pp. 1-94.

"Clustered Data Ontap 8.2 File Access Management Guide for CIFS", NetApp; (year 2014), Feb. 2014, pp. all.

"Configuring Active Directory Lookup for UNIX GID and UID Information", O'Reily Media, Inc. https://learning.oreilly.com/library/view/windows-server-2012/9780133116007/ch09lev2sec6.html; 2012; captured Apr. 15, 2021, 2012, 1-2.

"CryptoSpike Demo: Ransomware protection for NetApp files", https://www.youtube.com/watch?v=jdh-ehkHDMQ [youtube.com], Sep. 13, 2019.

"Designing and Sizing Virtual SAN Fault Domains", Administering VMware Virtual SAN; VMware vSphere 6.5; vSAN 6.6; https://docs.vmware.com/en/VMware-vSphere/6.5/virtual-san-66-administration-guide.pdf, captured Aug. 20, 2021, 2017, pp. 34.

"EMC Isilon OneFS Operating System; Powering scale-out storage for the new world of Big Data in the enterprise", www.EMC.com, Feb. 2020, pp. all.

"Enabling or disabling SMB automatic node referrals", NetApp https://docs.netapp.com/ontap-9/index.jsp?topic=%2Fcom.netapp.doc.cdot-famg-cifs%2FGUID-AC7E8515-3A4C-4BB5-A8C8-38B565C952E0.html, Sep. 19, 2019, pp. all.

"Guaranteeing throughput with QoS", NetApp https://docs.netapp.com/ontap-9/index.jsp?topic=%2Fcom.netapp.doc.pow-perf-mon%2FGUID-77DF9BAF-4ED7-43F6-AECE-95DFB0680D2F.html, Sep. 19, 2019, pp. all.

"High Availability and Data Protection With Dell EMC Isilon Scale-Out NAS", Dell: Dell Inc., Jul. 2018, pp. all.

"How to troubleshoot the 'Autolocation' feature in Clustered Data ONTAP", NetApp https://kb.netapp.com/app/answers/answer_view/a_id/1030857/loc/en_US#_highlight, Sep. 19, 2019, pp. all.

"How to Troubleshoot the 'Autolocation' feature in Clustered Data ONTAP—Results", NetApp https://kb.netapp.com/app/results/kw/autolocation/, Sep. 19, 2019, pp. all.

"Hybrid Cloud Storage with Cloudian HyperStore and Amazon S3", Cloudian Inc.; www.cloudian.com, 2014, pp. all.

"Improving client response time by providing SMB automatic node referrals with Auto Location", NetApp https://library.netapp.com/ecmdocs/ECMP1196891/html/GUID-0A5772A4-A6D7-4A00-AC2A-92B868C5B3B5.html, Sep. 19, 2019, pp. all.

"Managing Workloads", NetApp https://docs.netapp.com/ontap-9/index.jsp?topic=%2Fcom.netapp.doc.pow-perf-mon%2FGUID-13D35FC5-AF37-4BBD-8A8E-B10B41451A16.html, Sep. 19, 2019, pp. all.

"Nutanix AFS—Introduction & Steps for Setting Up", Retrieved from https ://virtual building blocks. com/2 0 1 8/01 /03/nutanix-afs-introduction-steps-for-setting-up/ (Year: 2018), Jan. 3, 2018, 1-23.

"Nutanix Files Guide", Nutanix, Sep. 14, 2018, pp. all.

"Path Failover and Virtual Machines", vSphere Storage; Update 2; VMware vSphere 7.0; VMware ESXi 7.0; vCenter Server 7.0; https://docs.vmware.com/en/VMware-vSphere/7.0/vsphere-esxi-vcenter-server-702-storage-guide.pdf, Jun. 25, 2021, pp. 238.

"Preparing Storage Systems for Snapmirror Replication", NetApp ; NetApp, Apr. 2005, pp. all.

"Protect Your Data With Netapp Element Software", Solution Brief; NetApp, 2018, pp. all.

(56) References Cited

OTHER PUBLICATIONS

"Ransomeware Protection for NetApp", https://www.catalogicsoftware. com/products/cryptospike/ [protect-us.mimecast.com], 2021, Oct. 25, 2021, pp. all.

"Ransomware protection solutions", https://www.ibm.com/in-en/ ransomware, Retrieved Feb. 8, 2023, pp. 1-2.

"Setting up and Using Acropolis File Services (AFS) on Nutanix AOS 5.0", Virtual Dennis—Sharing Technical Tips Learned the Hard Way, Dec. 30, 2016, pp. all.

"Small office server and UID translation", Unix & Linux, https:// unix.stackexchange.com/questions/373747/small-office-server-and- uid-translation, Jul. 2017, 1-5.

"Tech TopX: AHV One Click Upgrade", Screen captures from YouTube video clip, 13 pages, uploaded on Dec. 8, 2015 by user "Nutanix University". Retrieved from Internet: https://www.youtube. com/watch?v=3dALdzw6qZM, Dec. 8, 2015, pp. all.

"Technical Overview and Best Practices", VMware vSphere VMFS ; a VMware Technical White Paper updated for VMware vSphere 5.1, Version 3.0, Nov. 27, 2012, pp. all.

"The rise of ransomware", https://www.cisco.com/c/dam/en/us/ solutions/collateral/enterprise-networks/ransomware-defense/at-a- glance-c45-737465.pdf, 2017, pp. 1-2.

"Understanding Multipathing and Failover", vSphere Storage; VMware vSphere 7.0; VMware ESXi 7.0; vCenter Server 7.0 https://docs. vmware.com/en/VMware-vSphere/7.0/vsphere-esxi-vcenter-server- 702-storage-guide.pdf, Jun. 25, 2021, pp. 234-268.

"Virtual Disk Manager User's Guide: Virtual Disk Development Kit", vmware.com; https://www.vmware.com/pdf/VirtualDiskManager. pdf, 2008, 1-12.

"VMware vCenter Server: Centrally Mananged Virtual Infrastruc- ture Delivered with Confidence", VMWare Datasheet; https://www. vmware.com/content/dam/digitalmarketing/vmware/en/pdf/products/ vCenter/vmware-vcenter-server-datasheet.pdf, captured Aug. 20, 2021, 2015, 2015, pp. 1-2.

"VMware VSAN 7.0 Release Notes", VMware; https://docs.vmware. com/en/VMware-vSphere/7.0/rn/vmware-vsan-70-release-notes. html, Mar. 8, 2021, pp. 1-12.

"VSAN 7.0 U2 Proof of Concept Guide", VMwareStorage; https:// images.core.vmware.com/sites/default/files/resource/vsan_70_u2_ proof_of_concept_guide_noindex.pdf, Apr. 2021, pp. 1-267.

"VSAN File Services Tech Note l VMware", Aug. 2021, 1-7.

"VSAN Health Service—File Service—File Server Health (77165)", VMware, Knowledge Base; https://kb.vmware.com/s/article/77165, May 15, 2021, pp. 1-5.

"VSAN Monitoring and Troubleshooting—VMware vSphere 7.0", https://docs.vmware.com/, Sep. 2018, 1-61.

"VSAN Performance Graphs in the vSphere Web Client (2144493)", Nov. 9, 2020, 1-42.

"VSan Planning and Deployment", Update 2 VMWare vSphere 6.7; VMware vSAN 6.7; https://docs.vmware.com/en/VMware-vSphere/ 6.7/vsan-673-planning-deployment-guide.pdf, Aug. 20, 2019, pp. 1-85.

"VSan Stretched Cluster Guide", VMwareStorage; https://images. core.vmware.com/sites/default/files/resource/vsan_stretched_cluster_ guide_noindex.pdf, printed Jun. 24, 2021, Jun. 2020, pp. 1-62.

"VSphere Availability—VMware vSphere 6.7", https://docs.vmware. com/, Jan. 11, 2019, 1-105.

"VSphere Storage—VMware vSphere 6.7", https://docs.vmware. com/, Jan. 4, 2021, 1-382.

Berger, Victor , "Anomaly detection in user behavior of websites using Hierarchical Temporal Memories", KTH Royal Institute of Technology l School of Computer Science and Communication http://www.diva-portal.org/smash/get/diva2:1094877/FULLTEXT01. pdf, 2017, pp. 1-40.

Bhardwaj, Rishi , "The Wonderful World of Distributed Systems and the Art of Metadata Management", Nutanix, Inc., https://www. nutanix.com/blog/the-wonderful-world-of-distributed-systems-and- metadata-management; captured Aug. 19, 2021, Sep. 24, 2015, pp. 1-8.

Bigler, , "Nutanix File Analytics", Dready's Blog, https://dreadysblog. com/2019/04/12/nutanix-file-analytics/, Apr. 12, 2019, 1-12.

Birk, Ryan , "How it Works: Understanding vSAN Architecture Components", altaro.com, Feb. 28, 2018, 1-10.

Bounds, Jay , "High-Availability (HA) Pair Controller Configura- tion Overview and Best Practices", NetApp, Feb. 2016, pp. all.

Cano, Ignacio et al., "Curator: Self-Managing Storage for Enter- prise Clusters", University of Washington, Mar. 2017, pp. all.

Cormac, , "Native File Services for vSAN 7", CormacHogan.com; https://cormachogan.com/2020/03/11/native-file-services-for-vsan- 7/, Mar. 11, 2020, 1-23.

Costa, Jorge , "High Availability Setup Using Veritas Cluster Server and NetApp Synchronous SnapMirror—One button Failover/ Failback with SnapMirror Sync and Veritas Cluster Server", NetApp Community, Nov. 18, 2010, pp. all.

Delaney, , "5 Methods For Detecting Ransomware Activity". https:// www.rapid7.com/blog/post/2016/05/16/methods-for-detecting- ransomware-activity/ [protect-us.mimecast.com], May 16, 2016.

Derschmitz, , "Ransomware protection for files with NetApp and CryptoSpike", https://derschmitz.com/2020/01/24/ransomware- protection-for-files-with-netapp-and-cryptospike/ [protect-us.mimecast. com], Jan. 24, 2020.

Feroce, Danilo , "Leveraging VMware vSAN for Highly Available Management Clusters", VMware, Inc., Version 2.9, VMware, Inc.; https://www.vmware.com/content/dam/digitalmarketing/vmware/en/ pdf/vcat/vmware-leveraging-virtual-san-for-ha-management-clusters. pdf, Jan. 2018, 1-22.

Fojta, Tomas , "Quotas and Quota Policies in VMware Cloud Director—Tom Fojta's Blog", Nov. 6, 2020, 1-4.

Fojta, Tomas , "vSAN File Services with vCloud Director—Tom Fojta's Blog", (wordpress.com) ("Fojta Blog"), Feb. 11, 2021, pp. 1-8.

Hogan, Cormac , "New updates from Nutanix—NOS 3.0 and NX-3000", https://cormachogan.com/2012/12/20/new-from-nutanix- nos-3-0-nx-3000/, Dec. 20, 2012, pp. 1-7.

Jung, Young-Woo et al., "Standard-Based Vitrual Infrastructure Resource Management for Distributed and Heterogeneous Servers", ICACT, Feb. 15, 2009, pp. all.

Kaam, Bas V. , "New in AOS 5.0: Nutanix Acropolis File Services", basvankaam.com, Jan. 5, 2017, pp. all.

Kemp, Erik , "NetApp SolidFire SnapMirror Architecture and Configuration", Technical Report, NetApp, Dec. 2017, pp. all.

Kleyman, Bill , "How Cloud Computing Changes Storage Tiering", https://www.datacenterknowledge.com ; captured Jun. 4, 2019, Nov. 12, 2015, pp. all.

Leibovici, Andre , "Nutanix One-Click Upgrade now takes care of Firmware and Hypervisor too!", myvirtualcloud.net https:// myvirtualcloud.net/nutanix-one-click-upgrade-now-takes-care-of- firmware-and-hypervisor-too/, Jul. 31, 2014, pp. 1-4.

Mantri, Aditya et al., "Pre-Encryption and Identification (PEI): An Anti-crypto Ransomware Technique", https://www.tandfonline.com/ doi/abs/10.1080/03772063.2022.2048706, Retrieved Feb. 8, 2023, pp. 1-6.

Matos, David et al., "RockFS: Cloud-backed File System Resilience to Client-Side Attacks", INESC-ID, Instituto Superior Tecnico, Universidade de Lisboa, Portugal Technical University of Munich, Department of Informatics, Germany, DOI: 10.1145/3274808. 3274817 ISBN: 978-1-4503-5702-9, Nov. 26, 2018, pp. 107-119.

McGhee, , "File Auditing and Analytics for your Nutanix Files Enterprise Cloud", Nutanix, Inc. https://next.nutanix.com/community- blog-154/file-auditing-and-analytics-for-your-nutanix-files-enterprise- cloud-31950#, Mar. 1, 2019, 1-9.

McGhee, , "Nutanix Files: File Analytics", Nutanix, Inc. https:// next.nutanix.com/nutanix-files-71/nutanix-files-file-analytics- 33179, Aug. 21, 2019, 1.

Mehnaz, Shagufta et al., "A Fine-grained Approach for Anomaly Detection in File System Accesses", Dept. of Computer Science l University of West Lafayette http://library.usc.edu.ph/ACM/SIGSAC% 202017/codaspy/p3.pdf, DOI: http://dx.doi.org/10.1145/3029806. 3029809, Mar. 24, 2017, pp. 1-12.

Mercier, , "Nutanix Files Analytics At-A-Glance (Part I)", World Wide Technology, https://www.wwt.com/article/nutanix-files-analytics- at-a-glance-part-i, May 23, 2019, 1-12.

(56) References Cited

OTHER PUBLICATIONS

Mercier, , "Nutanix Files Analytics At-A-Glance (Part II)", World Wide Technology, https://www.wwt.com/article/nutanix-files-analytics-at-a-glance-part-ii, May 31, 2019, 1-9.

Mercier, , "Nutanix Files Analytics At-A-Glance (Part III)", World Wide Technology, https://www.wwt.com/article/nutanix-files-analytics-at-a-glance-part-iii, Jun. 7, 2019, 1-12.

Padioleau, Yoann et al., "A Logic File System", https://hal.archives-ouvertes.fr/hal-03214497/document, Jun. 2003, pp. 99-112.

Poitras, Steven , "The Nutanix Bible", https://www.nutanixbible.com, Jun. 23, 2023, pp. 1-263.

Poitras, Steven , "The Nutanix Bible", https://nutanixbible.com/, Apr. 9, 2019, pp. all.

Poitras, Steven , "The Nutanix Bible", http://stevenpoitras.com/the-nutanix-bible/ (Publication date based on indicated capture date by Archive.org; first publication date unknown), Jan. 11, 2014, pp. all.

Poitras, Steven , "The Nutanix Bible", https://nutanixbible.com/, Jan. 12, 2016, pp. all.

Poitras, Steven , "The Nutanix Bible", https://nutanixbible.com/, Jan. 3, 2017, pp. all.

Poitras, Steven , "The Nutanix Bible", https://nutanixbible.com/, Jan. 3, 2018, pp. all.

Poitras, Steven , "The Nutanix Bible", http://stevenpoitras.com/the-nutanix-bible/ (Publication date based on indicated capture date by Archive.org; first publication date unknown), Jan. 7, 2015, pp. all.

Poitras, Steven , "The Nutanix Bible", https://nutanixbible.com/, Jan. 8, 2019, pp. all.

Poitras, Steven , "The Nutanix Bible", https://nutanixbible.com/, Jul. 25, 2019, pp. all.

Poitras, Steven , "The Nutanix Bible", http://stevenpoitras.com/the-nutanix-bible/ (Publication date based on indicated capture date by Archive.org; first publication date unknown), Jun. 20, 2014, pp. all.

Poitras, Steven , "The Nutanix Bible", https://nutanixbible.com/, Jun. 25, 2018, pp. all.

Poitras, Steven , "The Nutanix Bible", https://nutanixbible.com/, Jun. 8, 2017, pp. all.

Poitras, Steven , "The Nutanix Bible", http://stevenpoitras.com/the-nutanix-bible/ (Publication date based on indicated capture date by Archive.org; first publication date unknown), Jun. 9, 2015, pp. all.

Poitras, Steven , "The Nutanix Bible", https://nutanixbible.com/, Jun. 9, 2016, pp. all.

Poitras, Steven , "The Nutanix Bible", https://nutanixbible.com/, Mar. 2, 2020, pp. all.

Poitras, Steven , "The Nutanix Bible", https://nutanixbible.com/, Mar. 2, 2021, pp. all.

Poitras, Steven , "The Nutanix Bible", http://stevenpoitras.com/the-nutanix-bible/ (Publication date based on indicated capture date by Archive.org; first publication date unknown), Oct. 15, 2013, pp. all.

Poitras, Steven , "The Nutanix Bible", https://nutanixbible.com/, Sep. 1, 2020, pp. all.

Poitras, Steven , "The Nutanix Bible", https://nutanixbible.com/, Sep. 17, 2019, pp. all.

Poitras, Steven , "The Nutanix Bible", https://nutanixbible.com/, Sep. 3, 2021, pp. all.

Poitras, Steven , "The Nutanix Bible", https://nutanixbible.com/, Sep. 4, 2015, pp. all.

Poitras, Steven , "The Nutanix Bible—Classic Edition", https://nutanixbible.com/ (Mar. 1, 2023), Mar. 1, 2023, pp. all.

Poitras, Steven , "The Nutanix Bible—Classic Edition", https://nutanixbible.com/ (Sep. 9, 2022), Sep. 9, 2022, pp. all.

Rajendran, Cedric , "Working with vSAN Health Checks", VMware vSan Virtual Blocks Blog; https://blogs.vmware.com/virtualblocks/2019/07/18/working-with-vsan-health-checks/, Jul. 18, 2019, pp. 1-6.

Ruth, Paul , "Autonomic Live Adaption of Virtual Computational Environments in a Multi-Domain Infrastructure", 2006 IEEE International Conference on Autonomic Computing, 2006, pp. 5-14.

Seget, Vladan , "VMware vSAN 7 now with native file services and quotas", 4sysops; https://4sysops.com/archives/vmware-vsan-7-now-with-native-file-services-and-quotas/, May 1, 2020,.

Seget, Vladan , "VMware vSphere 7.0 and vSAN storage improvements", Apr. 1, 2020, pp. 1-12.

Sturniolo, Andy , "VMware vSAN File Services and Veeam", Veeam Blog, https://www.veeam.com/blog/veeam-backup-vsan-file-services.html, Jul. 22, 2020, 1-9.

Wang, Xiaobin et al., "An abnormal file access behavior detection approach based on file path diversity", Institution of Engineering and Technology https://ieeexplore.ieee.org/abstract/document/6913685, DOI: 10.1049/cp.2014.0632, Oct. 2014, pp. 1-5.

Young-Woo, , "Standard-based Virtual Infrastructure Resource Management for Distributed and Heterogeneous Servers", ICACT, Feb. 15, 2009.

Zemlyanaya, D. et al., "Virus signature detection algorithm", https://www.researchgate.net/publication/357414139_Virus_signature_detection_algorithm, 2021, pp. 1-8.

U.S. Appl. No. 19/005,002 titled "Malicious Activity Detection, Validation, and Remediation in Virtualized Fileservers" filed Dec. 30, 2024.

Padilla,, Kenneth , "Dell EMC Unity: Cloud Tiering Appliance (CTA)", https ://www. del I technologies. co ml asseUen-us/products/storage/i ndustry-market/h 16376-del I-e m c-u ni ty-cl oud-tieri ng-appl iance. pdf, 2021.

Amazon EFS lifecycle management, https://docs.aws.amazon.com/efs/latest/ug/lifecycle-management-efs.html ,2022 ,pp. 1-5.

Configure a lifecycle management policy, https://learn.microsoft.com/en-us/azure/storage/blobs/lifecycle-management-policy-configure?tabs=azure-portal#optionally-enable-access-time-tracking , Aug. 31, 2023 , pp. 6.

File Time Stamp Preservation with Object Storage, https://www.ibm.com/docs/en/ahts/4.0?topic=scias-file-time-stamp-preservation-object-storage , Sep. 25, 2023 , pp. 2.

File-Based Primary Storage Ransomware Protection, https://www.storagenewsletter.com/2023/09/11/file-based-primary-storage-ransomware-protection/ ,Aug. 23, 2023 , pp. 20.

FileCloud Launches Industry's First Enterprise File Share and Sync Solution with Built-In Ransomware Protection, https://www.filecloud.com/blog/2016/09/filecloud-launches-industrys-first-enterprise-file-share-and-sync-solution-with-built-in-ransomware-protection/ , Sep. 28, 2016 , pp. 6.

Incident Response Playbook: Ransom Response for S3, https://github.com/aws-samples/aws-customer-playbook-framework/blob/main/docs/Ransom_Response_S3.md ,2021 , pp. 10.

Optimize costs by automatically managing the data lifecycle, https://learn.microsoft.com/en-us/azure/storage/blobs/lifecycle-management-overview , Oct. 26, 2023 , pp. 15.

Ransomware Protection, https://forum.photostructure.com/t/ransomware-protection/428 , Mar. 2021 , pp. 3.

Bazalgette, Tim et al., Robust identification of ransomware encryption over SMB, Darktrace | https://darktrace.com/research/robust-identification-of-ransomware-encryption-over-smb , Before Mar. 11, 2022 , pp. 4.

Halbert, Lisa et al., Enable or disable last access time updates, https://docs.netapp.com/us-en/storagegrid-116/tenant/enabling-or-disabling-last-access-time-updates.html , Jan. 15, 2022 , pp. 3.

Lavoie, Tony et al., ONTAP Essentials: Alerts, https://docs.netapp.com/us-en/cloudinsights/cs_alert_data.html#alert , Jul. 28, 2023 , pp. 8.

Mazzoli, Robert et al., Alert policies in Microsoft 365, https://learn.microsoft.com/en-us/purview/alert-policies ,Jul. 21, 2023 , pp. 36.

Mildenberge, Tobias et al., How to Use Object Storage to Mitigate Ransomware Attacks, https://contabo.com/blog/how-to-use-object-storage-to-mitigate-ransomware-attacks/#:~:text=Object%20storage%20is%20a%20popular,most%20common%20ransomware%20attack%20vectors , Feb. 21, 2023 , pp. 3.

Mohan, Vinod et al., Immutable Storage for Data Protection and Recovery, https://www.datacore.com/blog/immutable-storage-for-data-protection-and-recovery/ , Dec. 20, 2021 , pp. 9.

O'Neil, Megan et al., The anatomy of ransomware event targeting data residing in Amazon S3, https://aws.amazon.com/blogs/security/anatomy-of-a-ransomware-event-targeting-data-in-amazon-s3/ ,Feb. 6, 2023 , pp. 6.

(56)     References Cited

OTHER PUBLICATIONS

O'Riordan, Finbarr et al., Protect Against Potential Ransomware Attacks on ObjectStorage, https://infohub.delltechnologies.com/en-us/p/protect-against-potential-ransomware-attacks-on-object-storage/ , Oct. 6, 2021 , pp. 1-4.

Reich, Itzik et al., Dell ObjectScale 1.2—Redefiing Object Storage Options, https://volumes.blog/2023/07/11/dell-objectscale-1-2-redefining-object-storage-options/ , Jul. 11, 2023 , pp. 20.

Seaborn, Mark et al., Protecting data against ransomware using IBM Cloud Object Storage, https://www.ibm.com/blog/protecting-data-against-ransomware-using-ibms-cloud-object-storage/ , Oct. 14, 2022 , pp. 10.

Singireddy, Hareesh et al., Expiring Amazon S3 Objects Based on Last Accessed Date to DecreaseCosts, AWS Architecture Blog | https://aws.amazon.com/blogs/architecture/expiring-amazon-s3-objects-based-on-last-accessed-date-to-decrease-costs/ ,Aug. 3, 2021 , pp. 3.

Timmerman, Arjan et al., GigaOm Sonar Report for File-Based Primary Storage Ransomware Protection, https://gigaom.com/reprint/gigaom-sonar-report-for-file-based-primary-storage-ransomware-protection-237771-netapp/#post-id-1017085 ,Aug. 23, 2023.

Werber, Mat et al., Query Amazon S3 Analytics data with Amazon Athena, https://aws.amazon.com/blogs/storage/query-amazon-s3-analytics-data-with-amazon-athena/ , Jan. 7, 2020 , pp. 7.

U.S. Appl. No. 19/071,587 titled "File Analytics Systems Including Examples Providing Metrics Adjusted for Application Operation" filed Mar. 5, 2025.

U.S. Appl. No. 19/071,618 titled "File Analytics Systems and Methods" filed Mar. 5, 2025.

U.S. Appl. No. 19/076,847 titled "Data Analytics Systems With Effective Access Permission Monitoring" filed Mar. 11, 2025.

* cited by examiner

RANSOMWARE DETECTION AND/OR REMEDIATION AS A SERVICE IN FILE SERVER SYSTEMS

CROSS-REFERENCE TO RELATED APPLICATION(S)

This application claims the benefit under 35 U.S.C. 119 of the earlier filing date of Indian application No. 202311042690, filed Jun. 26, 2023, which application is hereby incorporated by reference in its entirety for any purpose.

TECHNICAL FIELD

Examples described herein relate to ransomware detection and/or remediation systems for file server systems, including virtualized distributed file servers hosting file systems. Examples of systems which may provide real-time updates of ransomware signatures and/or detect new ransomware signatures are described.

BACKGROUND

Data, including files, are increasingly important to enterprises and individuals. The ability to store significant corpuses of files is important to the operation of many modern enterprises. Existing systems that store enterprise data may be complex or cumbersome to interact with in order to quickly or easily establish what actions have been taken with respect to the enterprise's data and what attention may be needed from an administrator. In addition, an incomplete catalog of the file system may result in an incomplete analysis of the enterprise data to determine usage characteristics and to detect anomalies.

Ransomware is a type of malicious software, examples of which may be designed to block access to a computer system or computer files until a sum of money is paid. Most ransomware variants encrypt user files on the affected computer, hold the decryption key (making user files inaccessible), and demand a ransom payment to restore access.

Ransomware is a growing threat, and many existing solutions are not able to provide automated detection of, remediation of, and recovery from attacks. Some existing approaches include intrusive detection implemented at the network layer monitoring an end point. Such monitoring approaches generally focus on who and what are being attacked rather than detecting evidence of attack. Further these approaches are generally not designed to inform the end-user that infection has been detected. Other existing approaches include taking backup or snapshots of the file system at regular intervals, such that snapshots may be used to restore an attacked system. Such approaches generally lead to loss of data, as data created between backups is often lost and not recoverable after ransomware attack. Further existing approaches may detect ransomware through pre-defined digital signatures. Such methods capture already known ransomware, but systems remain vulnerable to new and non-cataloged ransomware.

DETAILED DESCRIPTION

Figure 1A:
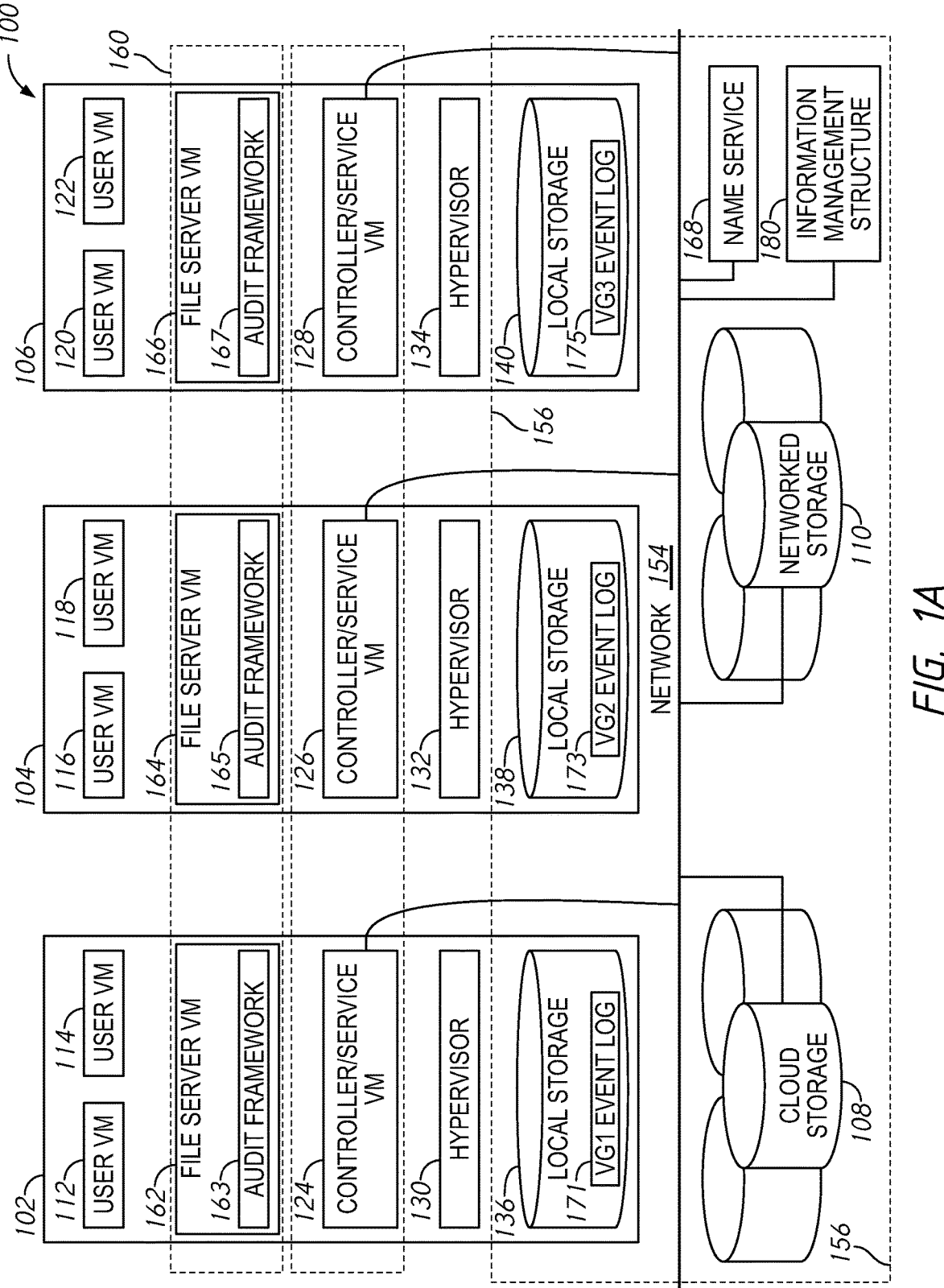
FIG. 1A is a schematic illustration of a distributed computing system hosting a virtualized file server arranged in accordance with examples described herein.

Certain details are set forth herein to provide an understanding of described embodiments of technology. However, other examples may be practiced without various of these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

Data analytics systems described herein may provide a cloud-hosted analytics and monitoring service for file servers. The file servers may be hosted on any number of architectures, such as Nutanix Files and/or Isilon and/or NetApp file servers. Data analytics systems described herein may centralize data from clusters connected to admin systems operating at various data center locations. Cloud resources may reduce scaling constraints, as the cloud is not dependent on the file server resources, which may provide near-real-time analytics and alerts even for load-heavy file servers of more than 250 million files and over 500 TB of storage. Hosting file analytics on premises may limit the service to local file servers only. In contrast, systems described herein may function on a global level, in a cluster-neutral environment, without being tied to a single cluster.

Examples described herein include metadata and events-based file analytics systems for file systems. In some examples, the file systems may be implemented using hyper-converged scale out distributed file storage systems. Embodiments presented herein include a file analytics system which may retrieve, organize, aggregate, and/or analyze information pertaining to a file system. Information about the file system may be stored in an analytics datastore. The file analytics system may query or monitor the analytics datastore to provide information (e.g., to an administrator) in the form of display interfaces, reports, and alerts and/or notifications. In some examples, the file analytics system may be hosted in a remote computing environment (e.g., in a cloud computing architecture). In some examples, the file analytics system may be hosted on a computing node, whether standalone or on a cluster of computing nodes. In some examples, the file analytics system may interface with a file system managed by a distributed virtualized file server (VFS) hosted on a cluster of computing nodes. An example VFS may provide for shared storage (e.g., across an enterprise), failover and backup functionalities, as well as scalability and security of data stored on the VFS.

Data analytics systems described herein may scan metadata from the file system, and/or receive event data from the file system, and may store the metadata and/or event data in a database, data warehouse, or other location. This data may be used to provide a variety of analytics for the file system.

Data analytics systems described herein may utilize the metadata and event data to provide tiering instructions to the file system. Tiering generally may refer to moving files or other amounts of data from one tier of storage to another tier of storage. Typically, "hot" or more frequently used data may be stored in a storage tier which may generally have higher performance and/or be more expensive than "cold" or less frequently used data. Determining which data to send to which tier, and moving the data, can be a large project-particularly when managing TBs of storage.

Data analytics systems described herein may be utilized to identify files to be moved from one tier of storage to another, and to schedule the files for tiering. The data analytics systems may additionally or instead be used to recall files or other data from one tier to another.

During operation, the file analytics system may retrieve metadata associated with the file system, configuration and/or user information from the file system, and/or event data from the file system.

In some examples, the file server may include an audit framework that manages event data in an event log. The audit framework may be configured to communicate with the analytics system to provide event data and/or metadata to the analytics system from the event log.

In some examples, the information retrieved or received by the analytics system may include event data records and metadata. The metadata collection process may include gathering the overall size, structure, and storage locations of parts of the file system managed by the file server, as well as details (e.g., file size, allocated storage quota, creation and/or modification information, owner information, permissions information, etc.) for each data item (e.g., file, folder, directory, share, etc.) in the file system. In some examples, the metadata collection process may rely on scanning one or more snapshots of the file system managed by the file server to gather the metadata, such as one or more snapshots generated by a disaster recovery application of the file server. The analytics tool may use the information gathered from the one or more snapshots to develop a comprehensive picture of the file system managed by the file server. In some examples, the analytics tool may employ multiple threads to perform scanning of the snapshots in parallel. The multiple threads may be employed to scan different shares in parallel, different files of a common share in parallel, or any combination thereof.

To capture configuration information, the file analytics system may use an application programming interface (API) architecture to request the configuration information. The configuration information may include user information, a number of shares, deleted shares, created shares, etc.

To capture event data, the VFS may include an audit framework with a connector that is configured to communicate the event data records and other information for consumption by a file analytics system. The event data records may include data related to various operations on the file system executed by the VFS, such as adding, deleting, moving, modifying, etc., a file, folder, directory, share, etc.

The event data records may indicate an event type (e.g., add, move, delete, modify, a user associated with the event, an event time, etc.).

To capture event data, the file analytics system may interface with the file server to receive event data. Received event data may be stored by the file analytics system in an analytics datastore, which may be a database and/or data warehouse. The event data may include data related to various operations performed with the file system, such as creating, deleting, reading, opening, editing, moving, modifying, etc., a file, folder, directory, share, etc., within the file system. The event information may indicate an event type (e.g., create, read, edit, delete), a user associated with the event, an event time, etc. Examples of events which may be supported in some examples include file open, file write, file rename, file create, file read, file delete, security change, directory create, directory delete, file open/permission denied, file close, and/or set attribute. Events may include file server audit events (e.g., Server Message Block (SMB) audit events). Events as described herein may be for either a file, directory, share, or other item of the file server.

The file analytics system may generate reports, including predetermined reports and/or customizable reports. The reports may be related to aggregate and/or specific user activity; aggregate file system activity; specific file, directory, share, etc., activity; etc.; or any combination of thereof.

Examples described herein provide analytics which may be used, for example, to collect, analyze, and display data about a file system. Generally, data from any file system may be obtained and analyzed in accordance with techniques described herein. In some examples, the file system may be implemented as a virtualized file system, such as on a distributed virtualized file server which may host a file system. Virtualization may be advantageous in modern business and computing environments in part because of the resource utilization advantages provided by virtualized computing systems. Without virtualization, if a physical machine is limited to a single dedicated process, function, and/or operating system, then during periods of inactivity by that process, function, and/or operating system, the physical machine is not utilized to perform useful work. This may be wasteful and inefficient if there are users on other physical machines which are currently waiting for computing resources. To address this problem, virtualization allows multiple virtualized computing instances, such as virtual machines (VMs) and/or containers to share the underlying physical resources so that during periods of inactivity by one virtualized computing instance, other instances can take advantage of the resource availability to process workloads. This can produce efficiencies for the utilization of physical devices and can result in reduced redundancies and better resource cost management.

Furthermore, virtualized computing systems may be used to not only utilize the processing power of the physical devices but also to aggregate the storage of the individual physical devices to create a logical storage pool where the data may be distributed across the physical devices but appears to the virtual machines and/or containers to be part of the system that the virtual machine and/or container is hosted on. Such systems may operate using metadata, which may be distributed and replicated any number of times across the system, to locate the indicated data.

Examples of virtualized file servers that may be used in examples described herein are also described in U.S. Published Patent Application 2017/0235760, published Aug. 17, 2017, entitled "Virtualized File Server" on U.S. application Ser. No. 15/422,220 filed Feb. 1, 2017, which application and publication are hereby incorporated herein by reference in their entirety for any purpose.

Examples of analytics systems which may be integrated with virtualized file servers are also described in U.S. application Ser. No. 17/304,096, filed Jun. 14, 2021, and entitled "File Analytics Systems and Methods," which application is hereby incorporated by reference herein in its entirety for any purpose.

FIG. 1A is a schematic illustration of a distributed computing system hosting a virtualized file server arranged in accordance with examples described herein. The system 100, which may be a virtualized system and/or a clustered virtualized system, includes a virtualized file server (VFS) 160. While shown as a virtual machine, examples of analytics applications may be implemented using one or more virtual computing instances, which may be implemented for example as virtual machines, containers, or combinations thereof. In some examples an analytics system, which may include an analytics datastore, may be provided as a hosted solution in one or more cloud computing platforms, which may be in communication with the system 100 of FIG. 1A.

The system of FIG. 1A can be implemented using a distributed computing system. Distributed computing systems generally include multiple computing nodes (e.g., physical computing resources)—host machines 102, 106, and 104 are shown in FIG. 1A—that may manage shared storage, which may be arranged in multiple tiers. The storage may include storage that is accessible through network 154, such as, by way of example and not limitation, cloud storage 108 (e.g., which may be accessible through the Internet), network-attached storage 110 (NAS) (e.g., which may be accessible through a LAN), or a storage area network (SAN). Examples described herein may also or instead permit local storage 136, 138, and 140 that is incorporated into or directly attached to the host machine and/or appliance to be managed as part of storage pool 156. Accordingly, the storage pool may include local storage of one or more of the computing nodes in the system, storage accessible through a network, or both local storage of one or more of the computing nodes in the system and storage accessible over a network. In some examples, the storage pool 156 may include only the local storage of nodes in the cluster—e.g., local storage 136, 138, and 140. Examples of local storage may include solid state drives (SSDs), hard disk drives (HDDs, and/or "spindle drives"), optical disk drives, external drives (e.g., a storage device connected to a host machine via a native drive interface, or a serial attached SCSI interface), or any other direct-attached storage. These storage devices, both direct-attached and/or network-accessible, collectively form storage pool 156 in some examples. Virtual disks (or "vDisks") may be structured from the physical storage devices in storage pool 156. A vDisk generally refers to a storage abstraction that is exposed by a component (e.g., a virtual machine, hypervisor, and/or container described herein) to be used by a client (e.g., a user VM, such as user VM 112). In examples described herein, controller VMs—e.g., controller VM 124, 126, and/or 128 of FIG. 1A may provide access to vDisks. In other examples, access to vDisks may additionally or instead be provided by one or more hypervisors (e.g., hypervisor 130, 132, and/or 134). In some examples, the vDisk may be exposed via iSCSI ("internet small computer system interface") or NFS ("network file system") and may be mounted as a virtual disk on the user VM. In some examples, vDisks may be organized into one or more volume groups (VGs).

Each host machine 102, 106, 104 may run virtualization software. Virtualization software may include one or more virtualization managers (e.g., one or more virtual machine managers, such as one or more hypervisors, and/or one or more container managers). Examples of hypervisors include NUTANIX AHV, VMWARE ESX (I), MICROSOFT HYPER-V, DOCKER hypervisor, and REDHAT KVM. Examples of container managers include Kubernetes. The virtualization software shown in FIG. 1A includes hypervisors 130, 132, and 134 which may create, manage, and/or destroy user VMs, as well as manage the interactions between the underlying hardware and user VMs. While hypervisors are shown in FIG. 1A, containers may be used additionally or instead in other examples. User VMs may run one or more applications that may operate as "clients" with respect to other elements within system 100. While shown as virtual machines in FIG. 1A, containers may be used to implement client processes in other examples. Hypervisors may connect to one or more networks, such as network 154 of FIG. 1A, to communicate with storage pool 156 and/or other computing system(s) or components.

In some examples, controller virtual machines, such as CVMs 124, 126, and 128 of FIG. 1A, are used to manage storage and input/output ("I/O") activities according to particular embodiments. While examples are described herein using CVMs to manage storage I/O activities, in other examples, container managers and/or hypervisors may additionally or instead be used to perform described CVM functionality. The arrangement of virtualization software should be understood to be flexible. In some examples, CVMs act as the storage controller. Multiple such storage controllers may coordinate within a cluster to form a unified storage controller system. CVMs may run as virtual machines on the various host machines, and work together to form a distributed system that manages all the storage resources, including local storage, network-attached storage 110, and cloud storage 108. The CVMs may connect to network 154 directly, or via a hypervisor. Since the CVMs run independent of hypervisors 130, 132, 134, in examples where CVMs provide storage controller functionally, the system may be implemented within any virtual machine architecture since the CVMs of particular embodiments can be used in conjunction with any hypervisor from any virtualization vendor. In other examples, the hypervisor may provide storage controller functionality and/or one or more containers may be used to provide storage controller functionality (e.g., to manage I/O requests to and from the storage pool 156).

A host machine may be designated as a leader node within a cluster of host machines. For example, host machine 104 may be a leader node. A leader node may have a software component designated to perform operations of the leader. For example, CVM 126 on host machine 104 and/or file server VM 164 of host machine 104 may be designated to perform such operations. A leader may be responsible for monitoring or handling requests from other host machines or software components on other host machines throughout the virtualized environment. For example, a leader service may handle the distribution of requests to and from other instances of that service throughout the distributed environment. If a leader fails, a new leader may be designated. In particular embodiments, a management module (e.g., in the form of an agent) may be running on the leader node.

Virtual disks may be made available to one or more user processes. In the example of FIG. 1A, each CVM 124, 126, and 128 may export one or more block devices or NFS server targets that appear as disks to user VMs 112, 114, 116, 118, 120, and 122. These disks are virtual, since they are implemented by the software running inside CVMs 124,

126, and 128. Thus, to user VMs, CVMs appear to be exporting a clustered storage appliance that contains some disks. User data (e.g., including the operating system in some examples) in the user VMs may reside on these virtual disks.

Performance advantages can be gained in some examples by allowing the virtualization system to access and utilize local storage 136, 138, and 140. This is because I/O performance may be much faster when performing access to local storage as compared to performing access to network-attached storage 110 across a network 154. This faster performance for locally attached storage can be increased even further by using certain types of optimized local storage devices, such as SSDs.

As a user process (e.g., a user VM) performs I/O operations (e.g., a read operation or a write operation), the I/O commands may be sent to the hypervisor that shares the same server as the user process, in examples utilizing hypervisors. For example, the hypervisor may present to the virtual machines an emulated storage controller, receive an I/O command, and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 156. Additionally or alternatively, CVMs 124, 126, 128 may present an emulated storage controller either to the hypervisor or to user VMs to facilitate I/O operations. CVMs 124, 126, and 128 may be connected to storage within storage pool 156. CVM 124 may have the ability to perform I/O operations using local storage 136 within the same host machine 102, by connecting via network 154 to cloud storage 108 or network-attached storage 110, or by connecting via network 154 to local storage 138 or 140 within another host machine 104 or 106 (e.g., via connecting to another CVM 126 or 128). In particular embodiments, any computing system may be used to implement a host machine.

Examples described herein include virtualized file servers. A virtualized file server may be implemented using a cluster of virtualized software instances (e.g., a cluster of file server virtual machines). A virtualized file server 160 is shown in FIG. 1A including a cluster of file server virtual machines. The file server virtual machines may additionally or instead be implemented using containers. In some examples, the VFS 160 provides file services to user VMs 112, 114, 116, 118, 120, and 122. The file services may include storing and retrieving data persistently, reliably, and/or efficiently in some examples. The user virtual machines may execute user processes, such as office applications or the like, on host machines 102, 104, and 106. The stored data may be represented as a set of storage items, such as files organized in a hierarchical structure of folders (also known as directories), which can contain files and other folders, and shares, which can also contain files and folders. Generally, the file server virtual machines may present a single namespace of storage items to user VMs.

In particular embodiments, the VFS 160 may include a set of file server virtual machines (FSVMs) 162, 164, and 166 that execute on host machines 102, 104, and 106. The set of file server virtual machines (FSVMs) may operate together to form a cluster. The FSVMs may process storage item access operations requested by user VMs executing on the host machines 102, 104, and 106. The FSVMs 162, 164, and

166 may communicate with storage controllers provided by CVMs 124, 126, 128 and/or hypervisors executing on the host machines 102, 104, 106 to store and retrieve files, folders, SMB shares, or other storage items. The FSVMs 162, 164, and 166 may store and retrieve block-level data on the host machines 102, 104, 106, e.g., on the local storage 136, 138, 140 of the host machines 102, 104, 106. The block-level data may include block-level representations of the storage items. The network protocol used for communication between user VMs, FSVMs, CVMs, and/or hypervisors via the network 154 may be Internet Small Computer Systems Interface (ISCSI), Server Message Block (SMB), Network File System (NFS), pNFS (Parallel NFS), or another appropriate protocol.

Generally, FSVMs may be utilized to receive and process requests in accordance with a file system protocol—e.g., NFS, SMB. In this manner, the cluster of FSVMs may provide a file system that may present files, folders, and/or a directory structure to users, where the files, folders, and/or directory structure may be distributed across a storage pool in one or more shares. The cluster of FSVMs may present a single namespace of storage items of a file system stored in the storage pool.

For the purposes of VFS 160, host machine 106 may be designated as a leader node within a cluster of host machines. In this case, FSVM 166 on host machine 106 may be designated to perform such operations. A leader may be responsible for monitoring or handling requests from FSVMs on other host machines throughout the virtualized environment. If FSVM 166 fails, a new leader may be designated for VFS 160.

In some examples, the user VMs may send data to the VFS 160 using write requests, and may receive data from it using read requests. The read and write requests, and their associated parameters, data, and results, may be sent between a user VM and one or more file server VMs (FSVMs) located on the same host machine as the user VM or on different host machines from the user VM. The read and write requests may be sent between host machines 102, 104, 106 via network 154, e.g., using a network communication protocol such as iSCSI, CIFS, SMB, TCP, Internet Protocol (IP), or the like. When a read or write request is sent between two VMs located on the same one of the host machines 102, 104, 106 (e.g., between the user VM 112 and the FSVM 162 located on the host machine 102), the request may be sent using local communication within the host machine 102 instead of via the network 154. Such local communication may be faster than communication via the network 154 in some examples. The local communication may be performed by, e.g., writing to and reading from shared memory accessible by the user VM 112 and the FSVM 162, sending and receiving data via a local "loop-back" network interface, local stream communication, or the like.

In some examples, the storage items stored by the VFS 160, such as files and folders, may be distributed among storage managed by multiple FSVMs 162, 164, 166. In some examples, when storage access requests are received from the user VMs, the VFS 160 identifies FSVMs 162, 164, 166 at which requested storage items, e.g., folders, files, or portions thereof, are stored or managed, and directs the user VMs to the locations of the storage items. The FSVMs 162, 164, 166 may maintain a storage map, such as a sharding map, that maps names or identifiers of storage items to their corresponding locations. The storage map may be a distributed data structure of which copies are maintained at each FSVM 162, 164, 166 and accessed using distributed locks or other storage item access operations. In some examples, the storage map may be maintained by an FSVM at a leader node such as the FSVM 166, and the other FSVMs 162 and 164 may send requests to query and update the storage map to the leader FSVM 166. Other implementations of the storage map are possible using appropriate techniques to provide asynchronous data access to a shared resource by multiple readers and writers. The storage map may map names or identifiers of storage items in the form of text strings or numeric identifiers, such as file system paths, folder names, file names, and/or identifiers of portions of folders or files (e.g., numeric start offset positions and counts in bytes or other units) to locations of the files, folders, or portions thereof. Locations may be represented as names of FSVMs, e.g., "FSVM-1", as network addresses of host machines on which FSVMs are located (e.g., "ip-addr1" or 128.1.1.10), or as other types of location identifiers.

When a user application, e.g., executing in a user VM 112 on host machine 102 initiates a storage access operation, such as reading or writing data, the user VM 112 may send the storage access operation in a request to one of the FSVMs 162, 164, 166 on one of the host machines 102, 104, 106. An FSVM 164 executing on a host machine 102 that receives a storage access request may use the storage map to determine whether the requested file or folder is located on and/or managed by the FSVM 164. If the requested file or folder is located on and/or managed by the FSVM 164, the FSVM 164 executes the requested storage access operation. Otherwise, the FSVM 164 responds to the request with an indication that the data is not on the FSVM 164, and may redirect the requesting user VM 112 to the FSVM on which the storage map indicates the file or folder is located. The client may cache the address of the FSVM on which the file or folder is located, so that it may send subsequent requests for the file or folder directly to that FSVM.

As an example and not by way of limitation, the location of a file or a folder may be pinned to a particular FSVM 162 by sending a file service operation that creates the file or folder to a CVM, container, and/or hypervisor associated with (e.g., located on the same host machine as) the FSVM 162—the CVM 124 in the example of FIG. 1A. The CVM, container, and/or hypervisor may subsequently process file service commands for that file for the FSVM 162 and send corresponding storage access operations to storage devices associated with the file. In some examples, the FSVM may perform these functions itself. The CVM 124 may associate local storage 136 with the file if there is sufficient free space on local storage 136. Alternatively, the CVM 124 may associate a storage device located on another host machine 104, e.g., in local storage 138, with the file under certain conditions, e.g., if there is insufficient free space on the local storage 136, or if storage access operations between the CVM 124 and the file are expected to be infrequent. Files and folders, or portions thereof, may also be stored on other storage devices, such as the network-attached storage (NAS) 110 or the cloud storage 108 of the storage pool 156.

In particular embodiments, a name service 168, such as that specified by the Domain Name System (DNS) Internet protocol, may communicate with the host machines 102, 104, 106 via the network 154 and may store a database of domain names (e.g., host names) to IP address mappings. The domain names may correspond to FSVMs, e.g., fsvm1.domain.com or ip-addr1.domain.com for an FSVM named FSVM-1. The name service 168 may be queried by the user VMs to determine the IP address of a particular host machine (e.g., computing node) 102, 104, 106 given a name of the host machine, e.g., to determine the IP address of the host name ip-addr1 for the host machine 102. The name service 168 may be located on a separate server computer system or on one or more of the host machines 102, 104, 106. The names and IP addresses of the host machines of the VFS 160, e.g., the host machines 102, 104, 106, may be stored in the name service 168 so that the user VMs may determine the IP address of each of the host machines 102, 104, 106, or FSVMs 162, 164, 166. The name of each VFS instance, e.g., FS1, FS2, or the like, may be stored in the name service 168 in association with a set of one or more names that contains the name(s) of the host machines 102, 104, 106 or FSVMs 162, 164, 166 of the VFS 160 instance. The FSVMs 162, 164, 166 may be associated with the host names ip-addr1, ip-addr2, and ip-addr3, respectively. For example, the file server instance name FS1.domain.com may be associated with the host names ip-addr1, ip-addr2, and ip-addr3 in the name service 168, so that a query of the name service 168 for the server instance name "FS1" or "FS1.domain.com" returns the names ip-addr1, ip-addr2, and ip-addr3. As another example, the file server instance name FS1.domain.com may be associated with the host names fsvm-1, fsvm-2, and fsvm-3. Further, the name service 168 may return the names in a different order for each name lookup request, e.g., using round-robin ordering, so that the sequence of names (or addresses) returned by the name service for a file server instance name is a different permutation for each query until all the permutations have been returned in response to requests, at which point the permutation cycle starts again, e.g., with the first permutation. In this way, storage access requests from user VMs may be balanced across the host machines, since the user VMs submit requests to the name service 168 for the address of the VFS instance for storage items for which the user VMs do not have a record or cache entry, as described below.

In particular embodiments, each FSVM may have two IP (Internet Protocol) addresses: an external IP address and an internal IP address. The external IP addresses may be used by SMB/CIFS clients, such as user VMs, to connect to the FSVMs. The external IP addresses may be stored in the name service 168. The IP addresses ip-addr1, ip-addr2, and ip-addr3 described above are examples of external IP addresses. The internal IP addresses may be used for iSCSI communication to CVMs, e.g., between the FSVMs 162, 164, 166 and the CVMs 124, 126, 128. Other internal communications may be sent via the internal IP addresses as well, e.g., file server configuration information may be sent from the CVMs to the FSVMs using the internal IP addresses, and the CVMs may get file server statistics from the FSVMs via internal communication.

Since the VFS 160 is provided by a distributed cluster of FSVMs 162, 164, 166, the user VMs that access particular requested storage items, such as files or folders, do not necessarily know the locations of the requested storage items when the request is received. A distributed file system protocol, e.g., MICROSOFT DFS or the like, may therefore be used, in which a user VM 112 may request the addresses of FSVMs 162, 164, 166 from a name service 168 (e.g., DNS). The name service 168 may send one or more network addresses of FSVMs 162, 164, 166 to the user VM 112. The addresses may be sent in an order that changes for each subsequent request in some examples. These network addresses are not necessarily the addresses of the FSVM 164 on which the storage item requested by the user VM 112 is located, since the name service 168 does not necessarily have information about the mapping between storage items and FSVMs 162, 164, 166. Next, the user VM 112 may send an access request to one of the network addresses provided by the name service, e.g., the address of FSVM 164. The FSVM 164 may receive the access request and determine whether the storage item identified by the request is located on the FSVM 164. If so, the FSVM 164 may process the request and send the results to the requesting user VM 112. However, if the identified storage item is located on a different FSVM 166, then the FSVM 164 may redirect the user VM 112 to the FSVM 166 on which the requested storage item is located by sending a "redirect" response referencing FSVM 166 to the user VM 112. The user VM 112 may then send the access request to FSVM 166, which may perform the requested operation for the identified storage item.

A particular VFS 160, including the items it stores, e.g., files and folders, may be referred to herein as a VFS "instance" and may have an associated name, e.g., FS1, as described above. Although a VFS instance may have multiple FSVMs distributed across different host machines, with different files being stored on FSVMs, the VFS instance may present a single name space to its clients such as the user VMs. The single name space may include, for example, a set of named "shares" and each share may have an associated folder hierarchy in which files are stored. Storage items such as files and folders may have associated names and metadata such as permissions, access control information, size quota limits, file types, files sizes, and so on. As another example, the name space may be a single folder hierarchy, e.g., a single root directory that contains files and other folders. User VMs may access the data stored on a distributed VFS instance via storage access operations, such as operations to list folders and files in a specified folder, create a new file or folder, open an existing file for reading or writing, and read data from or write data to a file, as well as storage item manipulation operations to rename, delete, copy, or get details, such as metadata, of files or folders. Note that folders may also be referred to herein as "directories."

In particular embodiments, storage items such as files and folders in a file server namespace may be accessed by clients, such as user VMs, by name and/or path, e.g., "\Folder-1\File-1" and "\Folder-2\File-2" for two different files named File-1 and File-2 in the folders Folder-1 and Folder-2, respectively (where Folder-1 and Folder-2 are sub-folders of the root folder). Names that identify files in the namespace using folder names and file names may be referred to as "path names." Client systems may access the storage items stored on the VFS instance by specifying the file names or path names, e.g., the path name "\Folder-1\File-1", in storage access operations. If the storage items are stored on a share (e.g., a shared drive), then the share name may be used to access the storage items, e.g., via the path name "\\Share-1\Folder-1\File-1" to access File-1 in folder Folder-1 on a share named Share-1.

In particular embodiments, although the VFS may store different folders, files, or portions thereof at different locations, e.g., on different FSVMs, the use of different FSVMs or other elements of storage pool 156 to store the folders and files may be hidden from the accessing clients. The share name is not necessarily a name of a location such as an FSVM or host machine. For example, the name Share-1 does not identify a particular FSVM on which storage items of the share are located. The share Share-1 may have portions of storage items stored on three host machines, but a user may simply access Share-1, e.g., by mapping Share-1 to a client computer, to gain access to the storage items on Share-1 as if they were located on the client computer. Names of storage items, such as file names and folder names, may similarly be location-independent. Thus, although storage items, such as files and their containing folders and shares, may be stored at different locations, such as different host machines, the files may be accessed in a location-transparent manner by clients (such as the user VMs). Thus, users at client systems need not specify or know the locations of each storage item being accessed. The VFS may automatically map the file names, folder names, or full path names to the locations at which the storage items are stored. As an example and not by way of limitation, a storage item's location may be specified by the name, address, or identity of the FSVM that provides access to the storage item on the host machine on which the storage item is located. A storage item such as a file may be divided into multiple parts that may be located on different FSVMs, in which case access requests for a particular portion of the file may be automatically mapped to the location of the portion of the file based on the portion of the file being accessed (e.g., the offset from the beginning of the file and the number of bytes being accessed).

In particular embodiments, VFS 160 determines the location, e.g., FSVM, at which to store a storage item when the storage item is created. For example, an FSVM 162 may attempt to create a file or folder using a CVM 124 on the same host machine 102 as the user VM 114 that requested creation of the file, so that the CVM 124 that controls access operations to the file folder is co-located with the user VM 114. While operations with a CVM are described herein, the operations could also or instead occur using a hypervisor and/or container in some examples. In this way, since the user VM 114 is known to be associated with the file or folder and is thus likely to access the file again, e.g., in the near future or on behalf of the same user, access operations may use local communication or short-distance communication to improve performance, e.g., by reducing access times or increasing access throughput. If there is a local CVM on the same host machine as the FSVM, the FSVM may identify it and use it by default. If there is no local CVM on the same host machine as the FSVM, a delay may be incurred for communication between the FSVM and a CVM on a different host machine. Further, the VFS 160 may also attempt to store the file on a storage device that is local to the CVM being used to create the file, such as local storage, so that storage access operations between the CVM and local storage may use local or short-distance communication.

In some examples, if a CVM is unable to store the storage item in local storage of a host machine on which an FSVM resides, e.g., because local storage does not have sufficient available free space, then the file may be stored in local storage of a different host machine. In this case, the stored file is not physically local to the host machine, but storage access operations for the file are performed by the locally-associated CVM and FSVM, and the CVM may communicate with local storage on the remote host machine using a network file sharing protocol, e.g., isCSI, SAMBA, or the like.

In some examples, if a virtual machine, such as a user VM 112, CVM 124, or FSVM 162, moves from a host machine 102 to a destination host machine 104, e.g., because of resource availability changes, and data items such as files or folders associated with the VM are not locally accessible on the destination host machine 104, then data migration may be performed for the data items associated with the moved VM to migrate them to the new host machine 104, so that they are local to the moved VM on the new host machine 104. FSVMs may detect removal and addition of CVMs (as may occur, for example, when a CVM fails or is shut down) via the iSCSI protocol or other technique, such as heartbeat messages. As another example, an FSVM may determine that a particular file's location is to be changed, e.g., because a disk on which the file is stored is becoming full, because changing the file's location is likely to reduce network communication delays and therefore improve performance, or for other reasons. Upon determining that a file is to be moved, VFS 160 may change the location of the file by, for example, copying the file from its existing location(s), such as local storage 136 of a host machine 102, to its new location(s), such as local storage 138 of host machine 104 (and to or from other host machines, such as local storage 140 of host machine 106 if appropriate), and deleting the file from its existing location(s). Write operations on the file may be blocked or queued while the file is being copied, so that the copy is consistent. The VFS 160 may also redirect storage access requests for the file from an FSVM at the file's existing location to an FSVM at the file's new location.

In particular embodiments, VFS 160 includes at least three file server virtual machines (FSVMs) 162, 164, 166 located on three respective host machines 102, 104, 106. To provide high-availability, in some examples, there may be a maximum of one FSVM for a particular VFS instance VFS 160 per host machine in a cluster. If two FSVMs are detected on a single host machine, then one of the FSVMs may be moved to another host machine automatically in some examples, or the user (e.g., system administrator) may be notified to move the FSVM to another host machine. The user may move an FSVM to another host machine using an administrative interface that provides commands for starting, stopping, and moving FSVMs between host machines.

In some examples, two FSVMs of different VFS instances may reside on the same host machine. If the host machine fails, the FSVMs on the host machine become unavailable, at least until the host machine recovers. Thus, if there is at most one FSVM for each VFS instance on each host machine, then at most one of the FSVMs may be lost per VFS per failed host machine. As an example, if more than one FSVM for a particular VFS instance were to reside on a host machine, and the VFS instance includes three host machines and three FSVMs, then loss of one host machine would result in loss of two-thirds of the FSVMs for the VFS instance, which may be more disruptive and more difficult to recover from than loss of one-third of the FSVMs for the VFS instance.

In some examples, users, such as system administrators or other users of the system and/or user VMs, may expand the cluster of FSVMs by adding additional FSVMs. Each FSVM may be associated with at least one network address, such as an IP (Internet Protocol) address of the host machine on which the FSVM resides. There may be multiple clusters, and all FSVMs of a particular VFS instance are ordinarily in the same cluster. The VFS instance may be a member of a MICROSOFT ACTIVE DIRECTORY domain, which may provide authentication and other services such as a name service.

In some examples, files hosted by a virtualized file server, such as the VFS 160, may be provided in shares—e.g., SMB shares and/or NFS exports. SMB shares may be distributed shares (e.g., home shares) and/or standard shares (e.g., general shares). NFS exports may be distributed exports (e.g., sharded exports) and/or standard exports (e.g., non-sharded exports). A standard share may in some examples be an SMB share and/or an NFS export hosted by a single FSVM (e.g., FSVM 162, FSVM 164, and/or FSVM 166 of FIG. 1A). The standard share may be stored, e.g., in the storage pool in one or more volume groups and/or vDisks and may be hosted (e.g., accessed and/or managed) by the single FSVM. The standard share may correspond to a particular folder (e.g., \\enterprise\finance may be hosted on one FSVM, \\enterprise\hr on another FSVM). In some examples, distributed shares may be used which may distribute hosting of a top-level directory (e.g., a folder) across multiple FSVMs. So, for example, \\enterprise\users\ann and \\enterprise\users\bob may be hosted at a first FSVM, while \\enterprise\users\chris and \\enterprise\users\dan are hosted at a second FSVM. In this manner a top-level directory (e.g., \\enterprise\users) may be hosted across multiple FSVMs. This may also be referred to as a sharded or distributed share (e.g., a sharded SMB share). As discussed, a distributed file system protocol, e.g., MICROSOFT DFS or the like, may be used, in which a user VM may request the addresses of FSVMs 162, 164, 166 from a name service (e.g., DNS).

Accordingly, systems described herein may include one or more virtual file servers, where each virtual file server may include a cluster of file server VMs and/or containers operating together to provide a file system. Examples of systems described herein may include a file analytics system that may collect, monitor, store, analyze, and report on various analytics associated with the virtual file server(s). By providing a file analytics system, system administrators may advantageously find it easier to manage their files stored in a file system, and may more easily gain, understand, protect and utilize insights about the stored data and/or the usage of the file system over time. Examples of file analytics systems are described as being provided in a hosted system (e.g., cloud computing system), however, it is to be understood that the analytics VM may be implemented in various examples using one or more virtual machines and/or one or more containers or other virtual computing instances.

Accordingly, an analytics system may be in communication with the system 100 of FIG. 1A. The analytics system may retrieve, organize, aggregate, and/or analyze information corresponding to a file system. The information may be stored in an analytics datastore. The analytics system may query or monitor the analytics datastore to provide information to an administrator in the form of display interfaces, reports, and alerts/notifications. The analytics system may be provided as a hosted analytics system on a computing system and/or platform in communication with the VFS 160. For example, the analytics system may be provided as a hosted analytics system in the cloud—e.g., provided on one or more cloud computing platforms.

During operation, the analytics system may perform multiple functions related to information collection, including a metadata collection process to receive metadata associated with the file system, a configuration information collection process to receive configuration and user information from the VFS 160, and an event data collection process to receive event data from the VFS 160.

The metadata collection process may include gathering the overall size, structure, and storage locations of the VFS 160 and/or parts of the file system managed by the VFS 160, as well as details for one or more (e.g., each) data item (e.g., file, folder, directory, share, etc.) in the VFS 160 and/or other metadata associated with the VFS 160. In some examples, the analytics system may communicate with each of the FSVMs 162, 164, 166 of the VFS 160 during the metadata collection process to retrieve respective portions of the metadata.

In some examples, the analytics system may make an initial scan of the VFS 160 to obtain initial metadata concerning the file system (e.g., number of files, directories, file names, file sizes, file owner ID and/or name, file permissions (e.g., access control lists, etc.)). The analytics system may provide an API call (e.g., SMB ACL call) to the VFS 160 to retrieve owner usernames and/or ACL permission information based on the owner identifier and the ACL identifier.

In some examples, the analytics system may communicate with each of the FSVMs 162, 164, 166 of the VFS 160 during the metadata collection process to retrieve respective portions of the metadata from the file system. In some examples, the metadata collection processes performed by the analytics system may include a multi-threaded breadth-first search (BFS) that involves performing parallel threaded file system scanning. The parallel threaded file system scanning may include parallel scanning of different shares, parallel scanning of different folders of a common share, or any combination thereof. In some examples, the metadata collection process may implement a parallel BFS with level order traversal of a directory tree to collect metadata. Level order traversal may include processing a directory tree one level at a time. For example, starting with a top-level directory, a first level of a directory tree is processed before moving onto a next level of the directory tree. The level order traversal includes a current queue, which includes each item in the level of the directory tree currently being processed, and a next queue, which includes children of the level of the directory tree currently being processed. When processing of the current queue is completed, the current queue may be loaded with the next queue entries. By performing level order traversal, a size of the two queues may be more manageable, as compared with a system where every item from a directory tree is loaded into a single queue. The parallel BFS may include starting a thread on each level, and letting processing of all the data items on that level be completed in the current queue before making a move to the next or child queue.

To capture configuration information, the analytics system may use an application programming interface (API) architecture to request the configuration information from the VFS 160. The API architecture may include representation state transfer (REST) API architecture. The configuration information may include user information, a number of shares, deleted shares, created shares, etc. In some examples, the analytics system may communicate directly with the leader FSVM of the FSVMs 162, 164, 166 of the VFS 160 to collect the configuration information. In some examples, the analytics system may communicate directly with another component (e.g., application, process, and/or service) of the VFS 160 or of the distributed computing system 100 (e.g., one or more storage controllers, virtualization managers, the CVMs 124, 126, 128, the hypervisors 130, 132, 134, etc.) to collect the configuration information. In some examples, the analytics system may communicate directly with another component (e.g., application, process, and/or service) of the VFS 160 or of the distributed computing system or in communication with the distributed computing system 100 (e.g., computing node, an administrative system, a storage controller, the CVMs 124, 126, 128, the hypervisors 130, 132, 134, etc.) to collect the configuration information.

To capture event data, the analytics system may interface with the VFS 160 to receive event data for storage in an analytics datastore. The VFS 160 may include or may be associated with an audit framework with a connector that is configured to provide the event data for consumption by the analytics system. For example, the FSVMs 162, 164, 166 of the VFS 160 may each include or may be associated with a respective audit framework 163, 165, 167 with a connector that may provide the event data to the analytics system. In some examples, while the audit framework 163, 165, 167 for each FSVM 162, 164, 166 is depicted as being part of the FSVMs 162, 164, 166, the audit framework 163, 165, 167 may be hosted by another component (e.g., application, process, and/or service) of the VFS 160 or of the distributed computing system 100 (e.g., one or more storage controller(s), the CVMs 124, 126, 128, the hypervisors 130, 132, 134, etc.) without departing from the scope of the disclosure. The audit framework generally refers to one or more software components which may be provided to collect, store, analyze, and/or transmit audit data (e.g., data regarding events in the file system). The event data may include data related to various operations performed with the VFS 160, such as adding, deleting, moving, modifying, etc., a file, folder, directory, share, etc., within the VFS 160. The event information may indicate an event type (e.g., add, move, delete, modify), a user associated with the event, an event time, etc. In some examples, once an event is written to the analytics datastore, it is not able to be modified. In some examples, the analytics system may aggregate multiple events into a single event for storage in the analytics datastore. For example, if a known task (e.g., moving a file) results in generation of a predictable sequence of events, the analytics system may aggregate that sequence into a single event.

In some examples, the analytics system and/or the corresponding VFS 160 may include protections to prevent event data from being lost. In some examples, the VFS 160 may store event data until it is provided to the analytics system. For example, if the analytics system becomes unavailable, the VFS 160 may persistently store the event data until the analytics system becomes available.

To support the persistent storage, as well as provision of the event data to the analytics system, the FSVMs 162, 164, 166 of the VFS 160 may each include or be associated with the audit framework that includes a dedicated event log (e.g., tied to an FSVM-specific volume group) that is capable of being scaled to store all event data and/or metadata for a particular FSVM until successfully sent to the analytics system. In some examples, the audit framework for each FSVM 162, 164, 166 may be hosted by another component (e.g., application, process, and/or service) of the VFS 160 or of the distributed computing system or in communication with the distributed computing system 100 (e.g., computing node, an administrative system, a storage controller, the CVMs 124, 126, 128, the hypervisors 130, 132, 134, etc.)

For example, each respective audit framework 163, 165, 167 may manage a separate respective event log via a separate volume group (e.g., the audit framework 163 manages the volume group 1 (VG1) event log 171, the audit framework 165 manages the volume group 2 (VG2) event log 173, and the audit framework 167 manages the volume group 3 (VG3) event log 175). The VG1-3 event logs 171, 173, and 175 may each be capable of being scaled to store all event data and/or metadata for parts of the VFS 160 that are managed by the respective FSVM 162, 164, 166. In some examples, the data may be persisted (e.g., maintained) until successfully provided to the analytics system. While the VG1-3 event logs 171, 173, 175 are each shown in the respective local storages 136, 138, and 140, the VG1-3 event logs 171, 173, 175 may be maintained anywhere in the storage pool 156 without departing from the scope of the disclosure.

In some examples, if one of the FSVMs 162, 164, or 166 fails, the failed FSVM may be migrated to another one of the host machines (e.g., computing nodes) 102, 104, or 106. In addition, the audit framework 163, 165, or 167 associated

US 12,627,681 B2

Figure 1B:
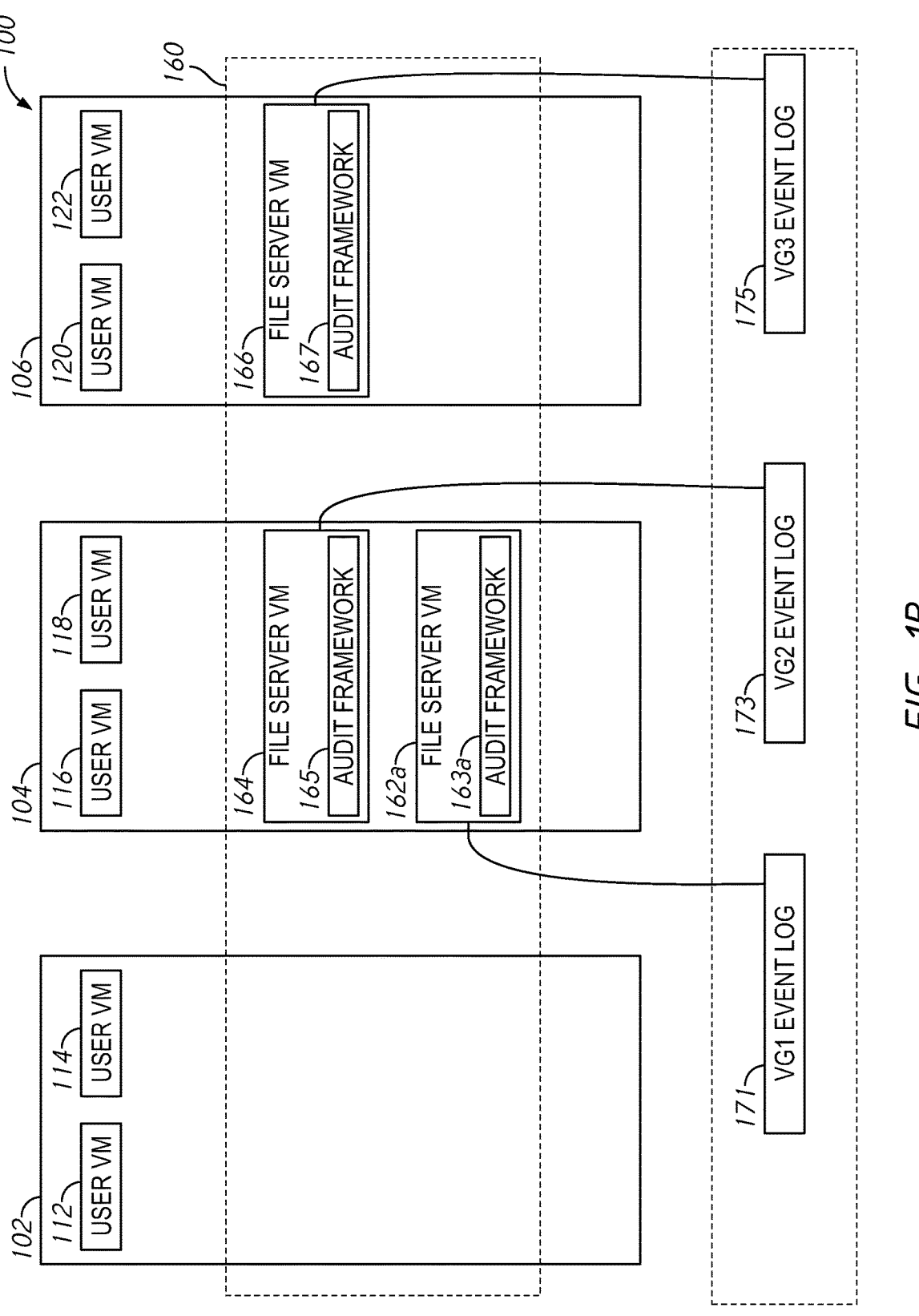
FIG. 1B is a schematic illustration of the distributed computing system of FIG. 1A showing a failover of a failed file server virtual machine (FSVM) in accordance with examples described herein.

17 with the failed FSVM may also migrate over to the same computing node as the failed FSVM, and may continue updating the same VG1-3 event log 171, 173, or 175 based on the write index. FIG. 1B is a schematic illustration of the distributed computing system 100 of FIG. 1A showing a failover of a failed FSVM in accordance with examples described herein. As shown in FIG. 1B, the FSVM 162 has failed. In response to failure of the FSVM 162, the FSVM 162 may be migrated to the computing node 104 as FSVM 162a. In addition, the audit framework 163 may be migrated to the computing node 104 as the audit framework 163a. The FSVM 162 may mount the VG1 event log 171 to continue updating the event log based on a write index established by the audit framework 163. In some examples, rather than migrating as a separate VM, the file server VM 162's role may be assumed by the file server VM 164 and/or another file server VM. For example, responsive to failure of the FSVM 162, the FSVM 164 or an audit framework associated with the FSVM 164 may manage the VG1 event log 171. The VG1 event log 171 may be migrated to a volume group of the FSVM 164 and/or may otherwise be made accessible to the FSVM 164 and/or an audit framework associated with the FSVM 164.

The audit framework (e.g., each audit framework 163, 165, and/or 167) may include an audit queue, an event logger, an event log, and a service connector. The audit queue may be configured to receive event data and/or metadata from the VFS 160 via network file server or server message block server communications, and to provide the event data and/or metadata to the mediator (e.g., event logger). The event logger may be configured to store the received event data and/or metadata from the audit queue, as well as retrieve requested event data and/or metadata from the event log in response to a request from the service connector. The service connector may be configured to communicate with other services (e.g., such as the analytics VM system) to respond to requests for provision of event data and/or metadata, as well as receive acknowledgments when event data and/or metadata are successfully received by the analytics system. The events in the event log may be uniquely identified by a monotonically increasing sequence number, will be persisted to an event log, and will be read from it when requested by the service connector.

The event logger may coordinate all of the event data and/or metadata writes and reads to and from the event log, which may facilitate the use of the event log for multiple services. The event logger may keep the in-memory state of the write index in the event log, and may persist it periodically to a control record (e.g., a master block). When the audit framework is started or restarted, the master record may be read to set the write index.

Multiple services may be able to read from an event log (e.g., the VG1-3 event logs 171, 173, 175) via their own service connectors (e.g., Kafka connectors). A service connector may have the responsibility of sending event data and metadata to the requesting service (e.g., such as the analytics system) reliably, keeping track of its state, and reacting to its failure and recovery. Each service connector may be tasked with persisting its respective read index, as well as being able to communicate the respective read index to the event logger when initiating an event read. The service connector may increment the in-memory read index only after receiving acknowledgment from its corresponding service and will periodically persist in-memory state. The persisted read index value may be read at start/restart (e.g., or after a service interruption) and used to set the in-memory read index to a value from which to start reading from. In some examples, when an event data record is read from the event log by a particular service, the event logger may stop maintenance of the event data record (e.g., allow it to be overwritten or removed from the event log).

During service start/recovery, a service connector may detect its presence and initiate an event read by communicating the read index to the event logger to read from the event log as part of the read call. The event logger may use the read index to find the next event to read and send to the requesting service (e.g., the analytics system) via the service connector.

The analytics system and/or the VFS 160 may further include architecture to prevent event data from being processed out of chronological order. For example, the service connector and/or the requesting service may keep track of the message sequence number it has seen before failure, and may ignore any messages which have a sequence number less than and equal to the sequence it has seen before failure. An exception may be raised by the message topic broker of the requesting service if the event log does not have the event for the sequence number expected by the service connector or if the message topic broker indicates that it has received a message with a sequence number that is not consecutive. In order to use the same event log for other services, a superset of all the proto fields will be taken to create a common format for an event record. The service connector will be responsible for filtering the required fields to get the ones it needs.

Other mechanisms can be used to implement an audit framework in other examples.

In some examples, the audit framework and event log may be tied to a particular FSVM and its own volume group. Thus, if an FSVM is migrated to another computing node, the event log may move with the FSVM and be maintained in the separate volume group from event logs of other FSVMs.

In some examples, the VFS 160 may be configured with denylist policies to denylist or prevent certain types of events from being analyzed and/or sent to the analytics system, such as specific event types, events corresponding to a particular user, events corresponding to a particular client IP address, events related to certain file types, or any combination thereof. The denylisted events may be provided from the VFS 160 to the analytics system in response to an API call from the analytics system. In addition, the analytics system may include an interface that allows a user to request and/or update the denylist policy, and send the updated denylist policy to the VFS 160. In some examples, the analytics VM 170 may be configured to process multiple channels of event data in parallel, while maintaining integrity and sequencing of the event data such that older event data does not overwrite newer event data.

In some examples, the analytics system may perform the metadata collection process in parallel with receipt of event data. The analytics system may reconcile information captured via the metadata collection process with event data information to prevent older data from overwriting newer data. In cases of reconciliation of the file system state caused by triggering an on demand scan, the state of the files index may be updated by both the event flow process and the scan process. To avoid the race condition, and maintain data integrity, when a metadata record corresponding to a storage item is received, the analytics system may determine if any records for the storage item exist, and if so, may decline to update those records. If no records exist, then the analytics system may add a record for the storage item.

The analytics system may process the metadata, event data, and configuration information to populate the analytics datastore. The analytics datastore may include an entry for each item in the VFS 160. In some examples, the event data and the metadata may include a unique user identifier that ties back to a user, but may not be used outside of the event data generation in some examples. In some examples, the analytics system may retrieve a user ID-to-username relationship from an active directory of the VFS 160 by connecting to a lightweight directory access protocol (LDAP) (e.g., for SMB, perform LDAP search on configured active directory, or on NFS, perform PDAP search on configured active directory or execute an API call if RFC2307 is not configured). In addition, rather than requesting a username or other identifier associated with the unique user identifier for every event, the analytics system may maintain a username-to-unique user identifier conversion table (e.g., stored in cache) for at least some of the unique user identifiers, and the username-to-unique user identifier conversion table may be used to retrieve a username, which may reduce traffic and improve performance of the VFS 160. Any mechanism to provide user context for active directory enabled SMB shares may help an administrator understand which user performed which operation as well as ownership of the file.

The analytics system may generate reports, including standard or default reports and/or customizable reports. The reports may be related to aggregate and/or specific user activity; aggregate file system activity; specific file, directory, share, etc., activity; etc.; or any combination of thereof. If multiple report requests are submitted at a same time and/or during at least partially overlapping times, examples of the analytics VM may queue report requests and process the requests sequentially and/or partially sequentially. The status of report requests in the queue may be displayed (e.g., queued, processing, completed, etc.). In some examples, the analytics system may manage and facilitate administrator-set archival policies, such as time-based archival (e.g., archive data based on a last-accessed date being greater than a threshold), storage capacity-based archival (e.g., archiving certain data when available storage falls below a threshold), or any combination thereof.

Although some examples for generating and providing metadata and event data are described herein, other mechanisms for obtaining and/or communicating metadata and/or event data from a file server may be used in other examples.

In some examples, the analytics system may be configured to analyze the received event data to detect irregular, anomalous, and/or malicious activity within the file system. For example, the analytics system may detect malicious software activity (e.g., ransomware) or anomalous user activity (e.g., deleting a large amount of files, deleting a large share, etc.).

Figure 2:
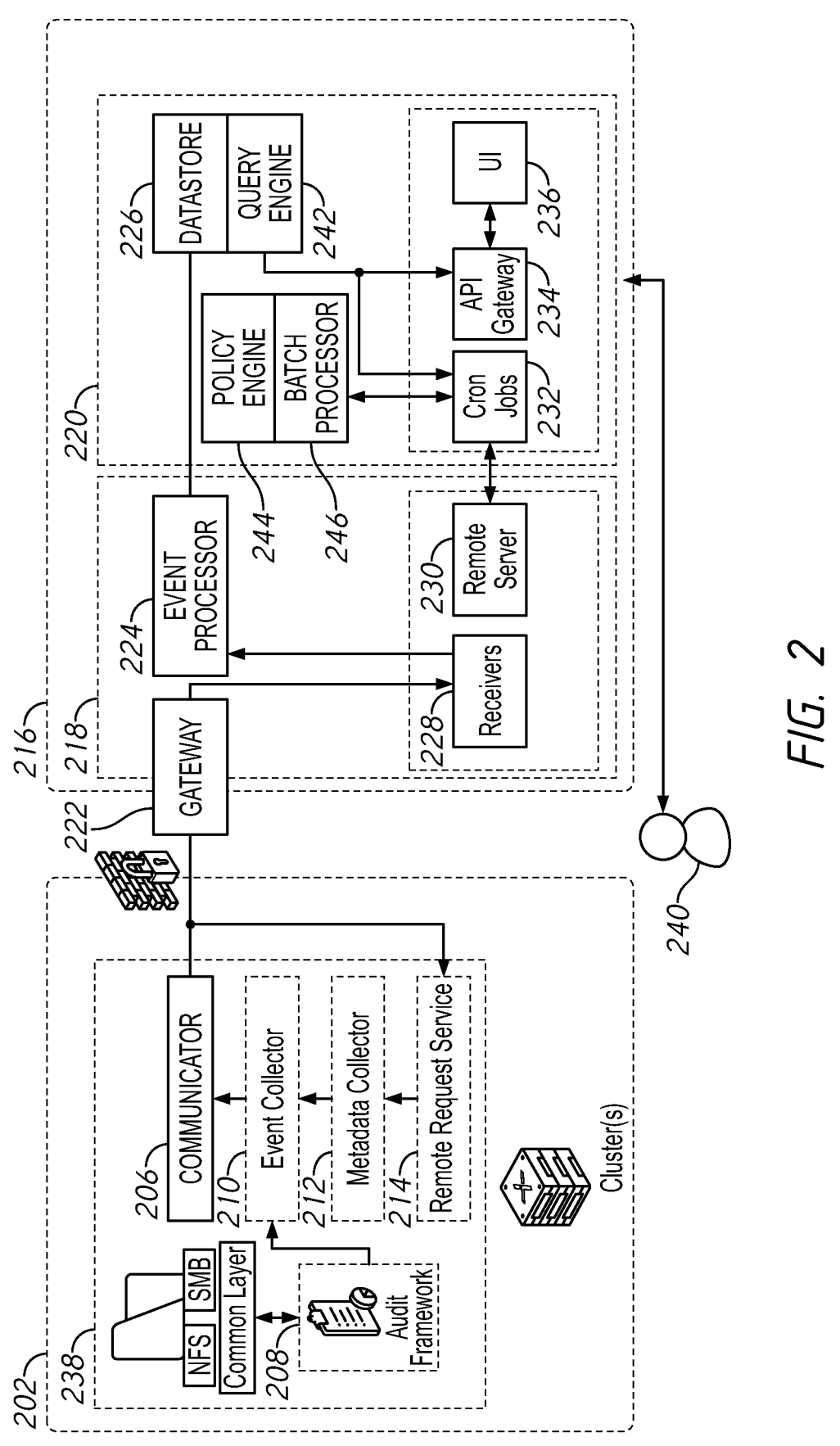
FIG. 2 is a schematic illustration of an analytics system in communication with a file server arranged in accordance with examples described herein.

FIG. 2 is a schematic illustration of an analytics system in communication with a file server arranged in accordance with examples described herein. The system includes a file server 202 in communication with analytics system 216. The file server 202 includes FSVM 238. The FSVM 238 may include protocol layer 204, communicator 206, audit framework 208, event collector 210, metadata collector 212, and remote request service 214. The file server 202 may be hosted on a cluster of computing nodes. The analytics system 216 may be a hosted system on one or more cloud service providers. The analytics system 216 may include gateway 222, virtual network 218, and virtual network 220. The virtual network 218 may include event processor 224, receivers 228, and server 230. The virtual network 220 may include batch processor 246, policy engine 244, datastore 226, query engine 242, job scheduler 232, API gateway 234, and user interface 236.

The components shown in FIG. 2 are exemplary. Additional, fewer, and/or different components may be used in other examples. Examples of the analytics system 216 are described herein as provided on AMAZON WEB SERVICES (AWS), although other cloud providers may be used in other examples. The file server 202 is illustrated as including an FSVM (e.g., FSVM 238), however, other file servers which may not include FSVMs may be used in other examples.

The file server 202 of FIG. 2 may be implemented by file servers described herein, such as the virtualized file server described with reference to FIG. 1A and FIG. 1B. For example, the FSVM 238 may be implemented by, or used to implement, one or more of the FSVMs 160, 162, or 164 of FIG. 1A. However, in other examples, other file servers may be used to provide metadata and event data to the analytics system 216.

File servers may collect metadata and event data and provide the metadata and event data to file analytics systems described herein. The metadata for a file system provided by a file server generally may include overall size, structure, and storage locations of parts of the file system managed by the file server, as well as details for each data item (e.g., file, folder, directory, share, owner information, and/or permission information). The details for each data item may include, for example, an identification of the data item, size, name, file type, owner, and/or permissions information. The metadata may be used by file analytics systems described herein to provide analytics regarding the file system. In the example of FIG. 2, the metadata may be collected by metadata collector 212, which may be a service operating within the FSVM 238. The metadata collector 212 for example, may be software (e.g., executable instructions configured to be executed by one or more processors of a host machine hosting the FSVM 238, for example). In some examples, the file server 202 may include a cluster of FSVMs, and each FSVM may include a metadata collector which may collect the metadata of the share, or portion of share, that is associated with that FSVM. The metadata from each FSVM may be communicated to the analytics system from each FSVM, and/or the metadata from each FSVM may be communicated to a leader FSVM on a leader node and provided to the analytics system. The metadata collector 212 may scan the file system, or a portion of the file system accessible to the FSVM 238, and may collect metadata associated with the files in the file system. Other mechanisms may be used to gather file system metadata in other examples.

Example file servers may include event collector(s), such as event collector 210 of FIG. 2. The event collector 210 may be implemented as software (e.g., executable instructions configured to be executed by one or more processors of a host machine hosting the FSVM 238, for example). File servers may utilize event collector(s) to record events that effect the file system. Examples of events include add, move, delete, modify, and rename. An event record may be made for each event which may include an identification of the item associated with the event (e.g., a file, folder, share), a user associated with the event, and an event time. Other attributes of the event may be included in the event record in other examples. In the example of FIG. 2, the event collector 210 may generate the event record and may include events for a share or portion of share associated with the FSVM 238. The event data from each FSVM may be communicated to the analytics system from each FSVM, and/or the metadata from each FSVM may be communicated to a leader FSVM on a leader node and provided to the analytics system.

In some examples, the file server may act to collect and/or transmit metadata and/or event data at the request of the analytics system. For example, the file server 202 may perform a metadata scan responsive to a request from analytics system 216. The remote request service 214 may be provided in the file server 202 to receive a request from the analytics system 216, which may be, for example, an API call, to initiate a metadata scan and/or to provide event data. The metadata collector 212 and/or event collector 210 may act in response to a request from analytics system 216 to perform a metadata scan and/or to provide event data. The analytics system 216 may request a metadata scan and/or may request event data using remote request service 214 in some examples.

File servers described herein may accordingly provide one or more file systems. A file system generally refers to an arrangement of files in folders which may be accessed in accordance with a namespace. For example, a path in the namespace may be used to access a particular file. Generally file servers described herein may have an ability to receive and respond to requests formulated in accordance with a file server protocol, such as NFS and/or SMB. So, the example file server 202 in FIG. 2 may include protocol layer 204. The protocol layer 204 may include an ability to receive an NFS and/or SMB request for files. In some examples, a common layer may be provided in the protocol layer 204 which may allow for the receipt of both NFS and SMB requests to access the namespace of files provided by the file server.

File servers described herein may include an audit framework, such as audit framework 208 of FIG. 2. The audit framework 208 may be one or more software services provided by the audit framework 208, such as by the FSVM 238 of audit framework 208. The audit framework 208 may include a dedicated event log (e.g., tied to an FSVM-specific volume group). The event log may be capable of being scaled to store all event data records and/or metadata for a particular FSVM or other portion of the file system, and may be stored according to a retention policy. The audit framework may include an audit queue, an event logger, an event log, and a service connector. The audit framework may receive event data records and/or metadata from the file server and to provide the event data records and/or metadata to the event collector 210 and/or metadata collector 212. In some examples, the event data records may be stored with a unique index value, such as a monotonically increasing sequence number, which may be used as a reference by the requesting services to request a specific event data record. The event logger may keep the in-memory state of the write index value in the event log, and may persist it periodically to a control record (e.g., a master block). When the audit framework is started or restarted, the master record may be read to set the write index.

File servers described herein may include a communication component, such as communicator 206. The communicator 206 may be implemented using a software service operating on a host machine that forms part of the file server 202. The communicator 206 may provide event and/or metadata to the analytics system 216. For example, the communicator 206 may provide data from the event collector 210 and/or metadata collector 212 to the analytics system 216. The communicator 206 may connect to the analytics system 216 over a network, such as the Internet. For example, the analytics system 216 may be a hosted solution residing in a cloud service provider, and the file server 202 may be an on premises file server which may communicate with the cloud service provider using communicator 206.

In this manner, during operation of a file server, metadata and event data regarding files and other items in a file system may be collected by the file server. The metadata and/or event data may be provided to an analytics system, such as the analytics system 216 of FIG. 2. The analytics system 216 may receive the metadata and/or events data at a gateway 222.

Analytics systems described herein may include one or more receiver processes, such as receivers 228 of FIG. 2. The receivers 228 may receive the metadata and/or event data provided by the file server through the gateway 222. Metadata and/or event data may be provided to an event processor 224. The event processor 224 may be implemented using a software process in the hosted cloud environment. For example, the event processor 224 may be implemented using AWS KINESIS and/or AWS LAMBDA. The event processor 224 may process a data stream from the file server and store metadata in a datastore, such as datastore 226. The metadata may be used, for example, to create a record in datastore 226 for each item in the file system. The records in the datastore 226 may be updated by the event processor 224 in response to event data from the file server.

Accordingly, file analytics systems described herein may maintain a datastore, such as datastore 226 of FIG. 2, which may contain records corresponding to data items in a file system. The records may be populated using metadata from the file system, and may be updated (e.g., maintained) based on event data from the file system. For example, a rename event from the file system may cause the event processor 224 to update a name of a data item in the datastore 226 in accordance with the event. The records in the datastore 226 may include, by way of example, an ID of the item (e.g., an inode number), a name, size, file type, owner, and most recent user. Other information may be included in other examples. In some examples, the datastore 226 may additionally or instead include a record associated with each event received from the file system. For example, the datastore 226 may include a record of an event including an ID of a data item (e.g., a file) involved in the event, a type of event, and updated information regarding the data item following the event (e.g., new name and/or location). The datastore 226 may be implemented using a database in some examples (e.g., an elastic search database). In some examples, the datastore 226 may be implemented using a data warehouse. For example, SNOWFLAKE may be used to implement datastore 226 in some examples.

A data warehouse generally refers to a data management system that may be used to store enterprise data and provide an analytical processing function to access the data. Accordingly, query engine 242 is depicted in FIG. 2 to represent processing functionality that may be used to query, access, write, or otherwise manipulate data in the datastore 226. The query engine 242 may be integral to the datastore 226 in some examples. The query engine 242 may be implemented using software, such as in a virtual machine or container or other virtualized computing system provided by a cloud provider. The query engine 242 may be implemented using computer readable media encoded with executable instructions which, when executed, cause one or more processors to perform the query engine functionality described herein. Generally, the query engine 242 may provide an analytical processing function of a data warehouse, including an ability to iteratively query the data in the data warehouse. A data warehouse may include a relational database and extraction, loading, and/or transformation software processes to prepare data in the data warehouse for analysis. The data warehouse may provide other functions for querying and/or analyzing data in some examples. Generally, a data warehouse may not include traditional indexes that may historically be used in relational databases to speed up access to the data. Rather, a system of iterative queries may be used to access the data in a data warehouse. These iterative queries and other functionality may be performed by query engine 242 in some examples.

Examples of analytics systems described herein may include a batch processor that may be utilized to execute batch operations on the file system based on the metadata and event data obtained by the file analytics system. For example, the analytics system 216 of FIG. 2 includes batch processor 246. The batch processor 246 may be implemented using AWS BATCH, for example. The batch processor 246 may be a software service that facilitates batch operations using data from the datastore 226. In some examples, the jobs that may be executed by the batch processor 246 are generated and/or scheduled by a scheduler, such as job scheduler 232 of FIG. 2.

Examples of analytics systems described herein may include a user interface. For example, the analytics system 216 of FIG. 2 may include user interface 236. The user interface 236 may allow a user, such as user 240 of FIG. 2, to access one or more reports or data based on data in the datastore 226. The user interface 236 may include a display and/or one or more input and/or output device(s) including an interface to receive text and/or click or other touch inputs. The user 240 may be a human user and/or may be one or more other software processes or computing systems which may interact with analytics system 216.

In some examples, data tiering policies may be determined, changed, and/or updated based on metadata and/or events data collected by file analytics systems. For example, the VFS 160 of FIG. 1A and/or FIG. 1B may implement data tiering. Data tiering generally refers to the process of assigning different categories of data to various levels or types of storage media, typically with the goal of reducing the total storage cost. Tiers may be determined by performance and/or cost of the media, and data may be ranked by how often it is accessed. Tiered storage policies typically may place the most frequently accessed data on the highest performing storage. Rarely accessed data may be stored on a low-performance, cheaper storage. Storage tiers are often aligned with a stage in the data lifecycle. The main benefits of tiering data may be around how data is managed through its lifecycle. This is in line with best practice data management policies and can also contribute towards data center and storage management; often the success of tiering will be measured by cost impact.

Virtualized file servers, such as VFS 160 of FIG. 1A and/or FIG. 1B may implement storage tiering. For example, data may be stored in particular media in the storage pool 156 based on a tiering policy. For example, less frequently accessed data may be stored on a lower performing media. The file server VMs and/or controller VMs and/or hypervisors shown in FIG. 1A and/or FIG. 1B may be used to implement a tiering policy and determine on which media to store various data. For example, a tiering engine may be implemented using one or more of the nodes of the VFS 160 and may direct the storage and/or relocation of files to a preferred tier of storage. In one example, a first tier of storage may be local storage of each of the nodes. In some examples, the storage pool 156 may only, or primarily, include the local storage of each of the nodes, such as local storage 136, local storage 138, and local storage 140. Accordingly, in some examples, during normal operation, the data (e.g., files and folders) of the file system may be stored on local storage of the nodes. In some examples, another tier of storage may be networked storage, such as networked storage 110. Networked storage 110 may not be part of the storage pool during normal operation in some examples, although in other examples it may be. In some examples, another tier of storage may be cloud storage, such as cloud storage 108. Generally, each tier of storage may be associated with a particular access time and a particular cost.

File analytics systems may provide information to the file server based on captured metadata and/or events data regarding the stored files. The information provided by analytics based on metadata and events may be used by the VFS 160 to implement, create, modify, and/or update tiering policies and/or to tier data.

Individual files may be tiered as objects in a tiered storage (e.g., implemented as part of and/or as an extension of storage pool 156 of FIG. 1A and/or FIG. 1B). When a file is moved to the tiered storage, for example at the direction or request of a tiering engine implemented in VFS 160, the data may be truncated from the primary storage in order to save space. The truncated file remains on the primary storage containing the metadata, e.g., ACLs, extended attributes, alternative data stream, and tiering information. For example, pointers (such as URLs) to access the objects in the tiered storage containing the file data may be stored. When the truncated file on the primary storage is accessed by a client (e.g., by a user VM), the data is available from the tiered storage.

In some examples, the decision to tier and/or how and/or when to tier may be made at least in part by a policy engine implemented by an analytics system described herein. For example, policy engine 244 of FIG. 2 may be used. The policy engine may determine what files and when to tier based on the tiering policies, file access patterns, and/or attributes (e.g., metadata and/or event data obtained by the file server 202 and stored in datastore 226). The policy engine may keep track of the results of the tiering and untiering executions. For example, when the data is tiered or recalled by a tiering engine of the virtual file server, an event may be generated (e.g., Op code=kTier or kRecall). The tiering event may be sent through the data pipeline (e.g., by communicator 206 to gateway 222). In this manner, the file analytics system may store indications in the analytics datastore 226 that certain data has been tiered, and on which tier the data (e.g., files) reside. Reports and other displays may then be accurate as to the tiering status of files in the file server.

User interfaces (e.g., user interface 236 of FIG. 2) may provide an interface for a user to view, set, and/or modify the tiering profile. The user interface may be used to obtain information about tiering targets and credentials to be used by the virtualized file server (e.g., VFS 160) to connect and upload files to the tiers. The captured profile details may be communicated to the virtualized file server (e.g., to the tiering engine) via remote command. The user may also set the tiering policy and/or desired free capacity via the UI and this may be stored on an analytics datastore (e.g., datastore 226). Tiering criteria may be defined. For example, exclusion criteria may be defined (e.g., for file size, particular shares, and/or file types, such as categories or extensions) to specify certain items that may not be subject to the tiering policy. Another tiering criteria may be file size and priority for tiering. Another tiering criteria may be tier threshold age. Another tiering criteria may be file type (e.g., category and/or extension) and priority. The policy engine (e.g., policy engine 244) may be implemented using a cron job that may run periodically and may be based on tiering policy and desired capacity. The policy engine may wholly and/or partially determine the candidate files for moving to a particular tier. For example, job scheduler 232 may include and/or may be used to implement policy engine 244. The files which meet the criteria for a particular tier may be communicated to the tiering engine of the VFS via a remote command (e.g., to remote request service 214).

The tiering engine of the VFS (which may be hosted, e.g., on node 102, node 104, and/or node 106 of FIG. 1A and/or FIG. 1B) may tier the files to the specified tiering targets responsive to instructions from the analytics policy engine. For example, the policy engine of the analytics system may evaluate a capacity of the VFS. If a capacity threshold is exceeded, the analytics system may itself identify and/or communicate with the VFS (e.g., with the tiering engine) to identify files in accordance with the tiering policy for tiering. The files may be grouped for tiering by ID in each share and a task entry may be made for each group. The tasks may be executed by the tiering engine of the VFS, which may in some examples generate the tasks, and in some examples may receive the tasks from the analytics system (e.g., the policy engine). Once the files have been tiered the tiering engine may send audit events for each of the tiered files to the analytics system. The audit events may contain the object identifier (e.g., object ID and/or file ID) and the target to which the file is tiered. The tier audit event may be stored in the datastore (e.g., datastores 226 of FIG. 2) and the state of the file ID may be updated to "Tiered" when tiered. The audit event indicative of tiering failure may contain a reason for failure, and a file table entry for that file may be updated with the reason.

A user may (e.g., through user interface 236) set an automatic recall policy while setting up the tiering policy and/or at another time. A recall policy may specify when a file may be recalled from a tier back into the main storage pool and/or other tier. The recall policy may, for example, be based on how many accesses (e.g., reads and/or writes) within a period may trigger a recall. Other users (e.g., admins) may also initiate the recall of specific tiered files, according to the users' requests. In case of manual recall, a user may provide a file, directory and/or a share for recall. The request may be saved in an analytics datastore (e.g., datastore 226 of FIG. 2) and accessed by a backend recall process.

In some examples, the tiering engine of the file server may collect file server statistics used to make a tiering decision (e.g., network bandwidth, pending tiering requests). The analytics system may receive the file server statistics collected by the tiering engine, e.g., through one or more API calls and/or audit events. The file server statistics may be used by the analytics system (e.g., the policy engine 244) to control the number of tiering instructions provided to the file server.

Based on the collected information and current state of the objects, the analytics system (e.g., analytics system 216, such as by using policy engine 244) may calculate the projected storage savings using a particular tiering selection on a time scale. This information may aid users to configure snapshot and tiering policies for most effective utilization of the file server, balancing between performance and cost in some examples.

Accordingly, tiering engines in a file server may utilize file analytics determined based on collected metadata and/or events data from the file server to make decisions on which files to tier and subsequently truncate in some examples from the primary storage. File analytics systems may additionally or instead decide to untier files based on user defined recall policy (e.g., based on access pattern as determined using collected event data and metadata) and/or based on manual trigger. The policy engine of an analytics system may generally include a collection of services which may work together to provide this functionality. The policy engine may execute the tiering policy in the background, and call file server APIs to tier and recall files. The policy engine may keep track of tiered files and/or the files in the process of being tiered or recalled.

Figure 3:
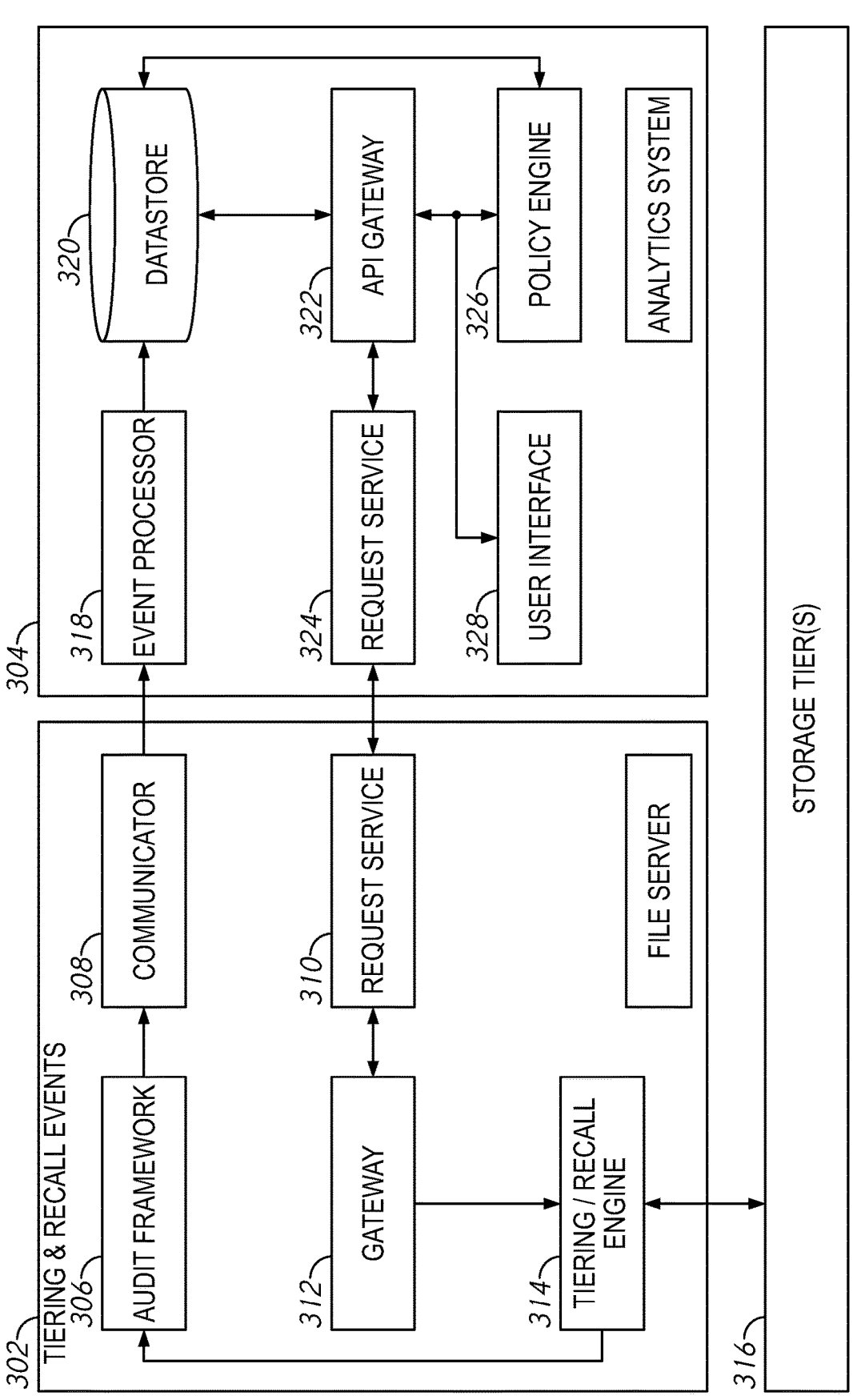
FIG. 3 is a schematic illustration of a system arranged in accordance with examples described herein.

FIG. 3 is a schematic illustration of a system arranged in accordance with examples described herein. The system of FIG. 3 includes file server 302 in communication with analytics system 304. The file server 302 includes audit framework 306, communicator 308, request service 310, gateway 312, and tiering engine 314. The analytics system 304 includes event processor 318, datastore 320, API gateway 322, request service 324, policy engine 326, and user interface 328. The file server 302 is additionally in communication with storage tier(s) 316.

The components shown in FIG. 3 generally may be implemented using software (e.g., executable instructions, which, when executed, cause one or more processors to perform the functions described). The components in FIG. 3 are exemplary only. Additional, fewer and/or different components may be used in other examples. The file server 302 of FIG. 3 may be implemented by and/or used to implement one or more file servers described herein, such as the system described with respect to FIG. 1A and FIG. 1B, and/or file server 202 of FIG. 2. For example, the components of file server 302 may be implemented on each file server virtual machine (FSVM) used to provide a distributed file server in some examples, such as the file server virtual machines shown in FIG. 1A and FIG. 1B. The analytics system 304 may be used to implement and/or may be implemented by analytics systems described herein, such as the analytics system 216 of FIG. 2.

Generally, file servers described herein may support tiering. In the example of FIG. 3, the file server 302 may include audit framework 306. The audit framework 306 may operate in an analogous manner as the audit framework 208 described with respect to FIG. 2. Generally, the audit framework 306 may track events that occur in a file system hosted by the file server 302. The audit framework 306 may provide these events to communicator 308 for transmission to analytics system 304. In addition to events involving user manipulation of files in the file system (e.g., read, write, rename, delete, create), the audit framework 306 may track tiering and recall events. For example, the audit framework 306 may provide events relating to the tiering and/or recall of a file. Examples of tiering and recall events include that a particular file was tiered to a particular tier of storage and/or that a particular file was recalled to a particular tier of storage. These tiering and recall events may also be communicated by communicator 308 to the analytics system 304. The communicator 308 may generally be implemented using any communications service that may be used to communicate with another computing system such as analytics system 304.

The file server 302 of FIG. 3 further includes a request service 310. The request service 310 may be implemented using a service for receiving requests from a computing system, such as an API call in some examples. The request service 310 may receive requests from the analytics system 304. The requests from analytics system 304 may be based on the file system metadata and/or event data analyzed by the analytics system 304. In some examples, the requests may include requests to tier particular files and/or a schedule for tiering files. In this manner, the analytics system 304 may provide requests to the file server 302 to tier one or more files during one or more time periods. The request service 324 and/or request service 310 may be implemented using one or more remote command clients, e.g., RCC. The file server 302 of FIG. 3 may include a gateway 312 that may receive requests from the request service 310 and provide commands or other instructions to a tiering engine 314. The gateway 312 may be optional in some examples and may function to translate or otherwise communicate information from the request service 310 into actionable commands for the tiering engine 314.

Examples of file servers described herein may include a tiering engine which may tier files to a particular target(s). The tiering engine 314 of FIG. 3 may be a software service which may conduct the tiering—may move files from one tier of storage to another and/or may recall files from one tier of storage to another. The tiering engine 314 may additionally truncate tiered files, such that a truncated version of the tiered file remains in primary storage. The tiering engine 314 may be in communication with the audit framework 306 to provide tiering event data. The tiering engine 314 may send audit events for each of the tiered files that contain an object identifier that has been tiered to a target tier. The audit events may be processed by audit framework 306 and sent to the analytics system 304. The tiering audit event may be stored in an audit table, for example, the event processor 318 may store the tiering audit event in an audit table in datastore 226. In some examples, the tiering engine 314 may provide an indication that a file was successfully tiered to a target tier and/or that tiering failed. The indication may be provided with the event data to audit framework 306 and provided to analytics system 304. Responsive to an indication of a successful tiering event, a state may be updated to indicate successful tiering (e.g., 'tiered') in the datastore 320. For example, the datastore 320 may contain a variety of attribute information associated with files (e.g., a files table). One attribute associated with the files may be a tiering status (e.g., tiered and/or failed tiering attempt). In some example, a reason for the tiering failure may also be provided by tiering engine 314 and stored in datastore 320.

File servers described herein, such as file server 302 of FIG. 3, may additionally collect operational statistics and provide the statistics to an analytics system, such as analytics system 304 of FIG. 3. Examples of operational statistics include network bandwidth and/or number of pending tiering requests. These operational statistics may be obtained by analytics system 304 using API calls in some examples and/or may be provided as audit events and stored in datastore 320.

The file server 302 of FIG. 3 may include storage tier(s) 316. Generally, any number of storage tiers may be used, including 1, 2, 3, 4, 5, 6, or more storage tiers. Each storage tier may generally be a location and/or type of storage that may be associated with a particular capacity, access time, and/or cost, in some examples. Data (e.g., files) may be identified for tiering based on an evaluation of the system performance under various tiering configurations-generally system operators may endeavor to optimize access time while reducing the overall cost of the storage solution and remaining within the capacity constraints of the various tiers. In some examples, a first (e.g., primary) tier may be local storage devices of computing nodes used to host the file server 302. The local storage nodes may have generally fast access time for accessing the storage items, but may generally be a higher cost storage option. In some examples, another storage tier may be networked storage—e.g., storage available on one or more networked storage devices. The access time may be less for networked storage than for the local storage devices, for example, due to the time used to send and receive requests over the network. However, the networked storage may in some examples be cheaper and/or more abundant. In some examples, another storage tier may be cloud storage—e.g., storage available from one or more cloud service providers. In some examples, the cloud storage may have a longer, less desirable, access time than local storage, but may be cheaper and/or more abundant. Various different types or kinds of cloud storage and/or networked storage may also be used, and may make up additional tiers.

In examples described herein, analytics systems may analyze file system metadata and/or event data and may transmit requests to a file server to tier selected files in accordance with a particular schedule and/or at particular times in some examples.

The analytics system 304 includes event processor 318. The event processor 318 may be analogous to the event processor 224 of FIG. 2, for example. The event processor 318 may receive metadata and/or event data from the file server 302 and may process those events for storage in datastore 320. The datastore 320 may accordingly maintain a variety of data based on the metadata and/or event data received from the file server 302. For example, the datastore 320 may maintain a file table which includes information about each file in the file server 302, including events involving the file. Other information which may be stored in the file table include, file ID (e.g., inode ID), file name, file type, file extension, file size, owner, and/or most recent event. The datastore 320 may be analogous to the datastore 226 and may be implemented using, for example, one or more databases and/or data warehouses, such as SNOW-FLAKE.

The analytics system 304 may include API gateway 322. The API gateway 322 may be utilized to generate API calls, or other requests or queries, that may be provided to request service 324 and/or datastore 320. The analytics system 304 may include request service 324 which may generate requests for transmission to the file server 302. For example, the request service 324 of analytics system 304 may communicate with the request service 310 of file server 302. The request service 324 may receive communications from the file server 302, such as from the request service 310.

The analytics system 304 may include a user interface 328. The user interface 328 may be analogous to the user interface 236 of FIG. 2 and may provide an input mechanism for a user (e.g., a human user or another software process) to input information to the analytics system 304. The user interface 328 may cause the display of one or more search fields, text entry fields, buttons, or other selectors, to receive information from one or more users. The user interface 328 may cause the display of analytics information-such as tiering status, estimated tiering results, or other information about the file system provided by file server 302.

In some examples, the user interface 328 may be used for a user to establish a tiering policy. The user may provide, through user interface 328, information about tiering targets, such as storage tier(s) 316 (e.g., names, types, costs, access times, and capacity of each tier). The user may provide access credentials for file server 202 and/or storage tier(s) 316 to the analytics system 304 using user interface 328. In some examples, a user may provide a tiering policy and/or desired free capacity for each tier through the user interface

328. In some examples, the tiering policy and/or desired free capacity for each tier may be predetermined. The tiering policy and/or desired free capacity for each tier may be stored, for example, in datastore 320. The tiering policy may include information regarding a target access time or overall storage cost for the system. The tiering policy may include information about the files which may be tiered and/or may be excluded from tiering. For example, certain file types, shares, and/or owners may be excluded from tiering. Those files may not be tiered in accordance with the operation of the tiering engine 314. The exclusion criteria may be stored, for example, in datastore 320. The tiering policy may describe a threshold file access frequency for tiering (e.g., files last accessed greater than a threshold time ago may be eligible for tiering).

Examples of file analytics systems described herein may have a policy engine, such as policy engine 326 which may be implemented by and/or used to implement policy engine 244 of FIG. 2. The policy engine 326 may access data in the datastore 320 (e.g., through API gateway 322 and/or using one or more queries). The datastore 320 may include data regarding the files in the file server 302—e.g., object ID, name, size, age, and/or a variety of other data regarding the each file. The policy engine 326 may identify files for tiering using a variety of selection criteria. The identification of files for tiering may be based on data in the datastore 320—e.g., data based on metadata and/or event data received from the file server. Files may be selected by the policy engine 326 for tiering based on one or more factors. One example factor is age. Age of the file (e.g., based on creation date and/or last accessed date) may be used by the policy engine 326 as a factor for selecting a file for tiering. The age of the file may be accessed by the policy engine 326 from the datastore 320. The datastore 320 may include, for example, a file table which may include a last access time for the file and a creation date of the file. Another example factor is size. Files may be selected by the policy engine 326 for tiering based on their size. In some examples, the policy engine 326 may select files having greater than a threshold size or a size within a range. The size of the file may be accessed by the policy engine 326 from the datastore 320. The datastore 320 may include, for example, a file table which may include a size for each file in the file server. Another example factor is exclusion criteria. Exclusion criteria may be established by a user, for example through user interface 328. Exclusion criteria may refer to criteria for files that should not be selected for tiering, even if the file otherwise meets the tiering criteria. Examples of exclusion criteria include MIME type, file type, file owner, permissions on the file, and/or particular shares.

Examples of file analytics systems described herein may include user behavior as one or more factors in selecting files for tiering. For example, analytics systems described herein may access data based on the metadata and/or event data received from a file server. Accordingly, the analytics system may access audit events relating to user behavior regarding files, and this information may be used, e.g., by policy engine 326, in selecting files for tiering. Examples of user behavior which may be used include whether specified actions have occurred (and/or not occurred) for a file within a particular time period. For example, files that have not been accessed by particular users within a particular time frame (e.g., 5 days) may be selected for tiering. As another example, files that have only been read (e.g., not modified) within a particular time frame (e.g., 5 days). Generally, any particular time frame and/or user action may be used as a factor in selecting files for tiering by the policy engine 326.

For example, the policy engine 326 may access the datastore 320 which may contain audit records for actions performed by particular users on the files in the file server. This information may be used by the policy engine 326 to select files for tiering.

In some examples, content of the file may be used as a factor by the policy engine 326 in selecting files for tiering. For example, files containing personal identifiable information (PII) may be selected (or excluded) by the policy engine 326 for tiering. The policy engine 326 may access information in datastore 320 regarding the files. In some examples, certain file content, such as PII, may be indicated in the datastore 320 and used by the policy engine 326 as a factor in selecting files for tiering.

In some examples, the policy engine 326 may be implemented using a cron job that may run periodically and/or at scheduled times on the analytics system 304. For example, the policy engine 326 may be scheduled to run at times when the file server 302 is predicted to have processing capacity for tiering (e.g., less busy times). For example, the policy engine 326 may run on weekend days or overnight in some examples. In some examples, the policy engine 326 may be wholly and/or partially implemented using a batch processor, such as batch processor 246 of FIG. 2. In some examples, the batch processor may aid in identifying batches of files and/or instructing the file server to tier batches of files. The policy engine 326 may utilize a variety of methods to implement a tiering policy. In this manner, the policy engine 326 may identify files for tiering. Requests to tier the files may be provided by the request service 324 to the request service 310 (e.g., using remote commands or other communication techniques), and the files tiered using the tiering engine 314.

Examples of policy engines described herein may select files for recall and provide requests to recall files to file servers. For example, the policy engine 326 may access the datastore 320 and select files for recall from tiered storage (e.g., from secondary storage) back to primary storage. It may be tedious for system administrators to manually identify files for recall from tiered storage; accordingly, it may be advantageous for a policy engine to utilize recall techniques described herein to select files automatically for recall.

In some examples, a recall policy may also be set through user interface 328 and/or provided by policy engine 326. The recall policy may specify, for example, how many accesses (e.g., reads) may occur to trigger a recall. For example, a threshold number of accesses may be specified. After a file has been tiered, if it is accessed the threshold number of times and/or the threshold number of times within a particular time period, the policy engine 326 may request a recall of the file. The request for recall may be provided to the file server 302, and the tiering engine 314 may implement the recall. In some examples, a user may initiate a manual recall through the user interface 328, for example by providing a file, folder (e.g., directory), and/or share. The request may be stored in datastore 320 and may be acted on by the policy engine 326 when the policy engine 326 runs.

In some examples, analogous criteria may be used by a policy engine described herein to select files for recall as the criteria for selecting files for tiering. For example, policy engines described herein may select files for recall based in some examples on particular users. In some examples, the policy engine 326 may select files (e.g., files whose ID and/or other associated data is stored in datastore 320) owned by and/or last acted on by users from a particular enterprise group (e.g., accounting group and/or human resource group). In some examples, other files owned by and/or last acted on by other users may not be recalled, even if they otherwise meet the criteria for recall (e.g., number of attempted accesses within a particular time period). In some examples, a policy engine may select files for recall based on particular shares. Files belonging to particular shares may be selected for recall. In some examples, a policy engine may select files for recall based on file extension (e.g., .doc, .docx, .xls, .ppt). In some examples, files belonging to other shares may not be selected for recall, even if they otherwise meet the criteria (e.g., number of accesses) for recall. In some examples, a policy engine may select files for recall, based on file size. For example, files less than a threshold size may be eligible for recall, or within a particular size range. Accordingly, the policy engine 326 may select files for recall when they are eligible files (e.g., in accordance with particular users, extensions, shares, and/or file sizes) and they meet the recall criteria (e.g., accessed more than a threshold number of times within a predetermined time period).

In some examples, the analytics system 304 may provide a user with information used to provide, set, and/or update a tiering policy. For example, the user interface 328 may be used to display information useful in setting a tiering policy. Examples of such information include a calculated projected storage savings, storage savings over time, and/or overall cost of storage in different tiering configurations. This may aid a user in setting a tiering policy. The user may input a tiering policy to the user interface 328 based on information provided through the user interface 328 in some examples.

Examples of systems described herein may accordingly include a policy engine which may implement a tiering policy. Analytics systems described herein may leverage analytics based on metadata and event data received from a file server to make decisions regarding which files to tier and truncate from primary storage. The analytics system may additionally or instead decide to untier (e.g., recall) files based on recall policies and/or manual trigger. Tiering engines described herein may execute a tiering policy in the background, and may communicate with the file server to tier and recall files—e.g., by calling APIs of the file server. Tiering engines may maintain a record of the tiered files, and/or the status of the tiering process for each file (e.g., tiering in process, tiering complete, tiering failed).

Examples of analytics systems described herein may provide ransomware protection as a service. For example, an analytics system, such as those shown and described with regard to FIG. 1-3, may provide for detection of and/or remediation from of a ransomware attack at one or more file servers in communication with and/or subscribed to the analytics system. In some examples, methods and systems described herein may provide no-touch auto rollout of ransomware signatures. Examples of analytics systems may accordingly be implemented using, and/or may include, a multi-tenant SaaS service that may automatically update and distribute ransomware signatures for tenants.

Accordingly, examples of analytics systems may include a cloud based no-touch auto-update mechanism that may have access to ransomware signatures. For example, the service may pull ransomware signatures from a centralized public datastore through APIs and update the ransomware signatures on file servers subscribed to the analytics system. The service may include a scheduled listener which may keep looking for the availability of new ransomware signatures on the centralized datastore. It would make a determination whether and which of the file servers need to be updated with the new ransomware signatures. Once it has prepared an inventory list of file servers, the service may include an update functionality that may go on to update the ransomware signatures at the file servers. The service may manage state of ransomware signatures in the respective file servers and may perform auto-retries when for some reason the updates fail. Since example analytics system may be a SaaS muti-tenant product, the ransomware service may be multi-tenant in nature. Examples of the ransomware service may be cloud-based, and accordingly there may be no physical limits on the number of signatures to be updated and there may be no limits on the number of file servers to be updated. The ransomware service may operate without intervention from the customers.

Accordingly, example analytics systems may discover new ransomware signatures, such as when they are discovered or become public knowledge through a third party integration (e.g., File Server Resource Manager (FSRM) API), auto rollout the new signatures to on-prem systems (e.g., virtualized distributed file servers) in near-real time so that the target systems (e.g., virtualized distributed file servers) are made aware of any new ransomware. There is no physical limit on the number of target systems the signatures need to be rolled out to nor there is any physical limit on the number of ransomware signatures that need to be rolled out. In addition to that, the system may ensure that customer-managed extensions are taken into account during the auto-rollout process so that the customer's applications are not impacted as some ransomware signatures may share extensions with that of legitimate applications.

In this manner, examples of ransomware services described herein may provide real-time and/or near-real-time updates for ransomware signatures to target systems. Customers of the analytics system may accordingly be protected at all times based on updated ransomware signature information.

Note that, in some examples, viruses are different than ransomware. Both virus and ransomware may be referred to as malware but they generally have different objectives, work differently and may cause a different response. Viruses generally refer to malicious code and like any legitimate code or computer program, they need to load themselves in the memory first to affect the operation of a system. Accordingly a 'signature' for a virus may be binary snippets of malicious code that may be loaded directly in memory, such as a removable storage media. Ransomware signatures described herein, however, generally operate at the files access protocol layer. For example, a ransomware signature may include a sequence of file operations. The sequence of file operations may be specified in a file access protocol (e.g., SMB and/or NFS protocol).

Examples of ransomware systems that may also be used together with autorollout functionality described herein are described in US Published Patent Application 2022/0131879 entitled "Malicious activity detection and remediation in virtualized file servers," and published on Apr. 28, 2022, which publication is hereby incorporated by reference in its entirety for any purpose.

Figure 4:
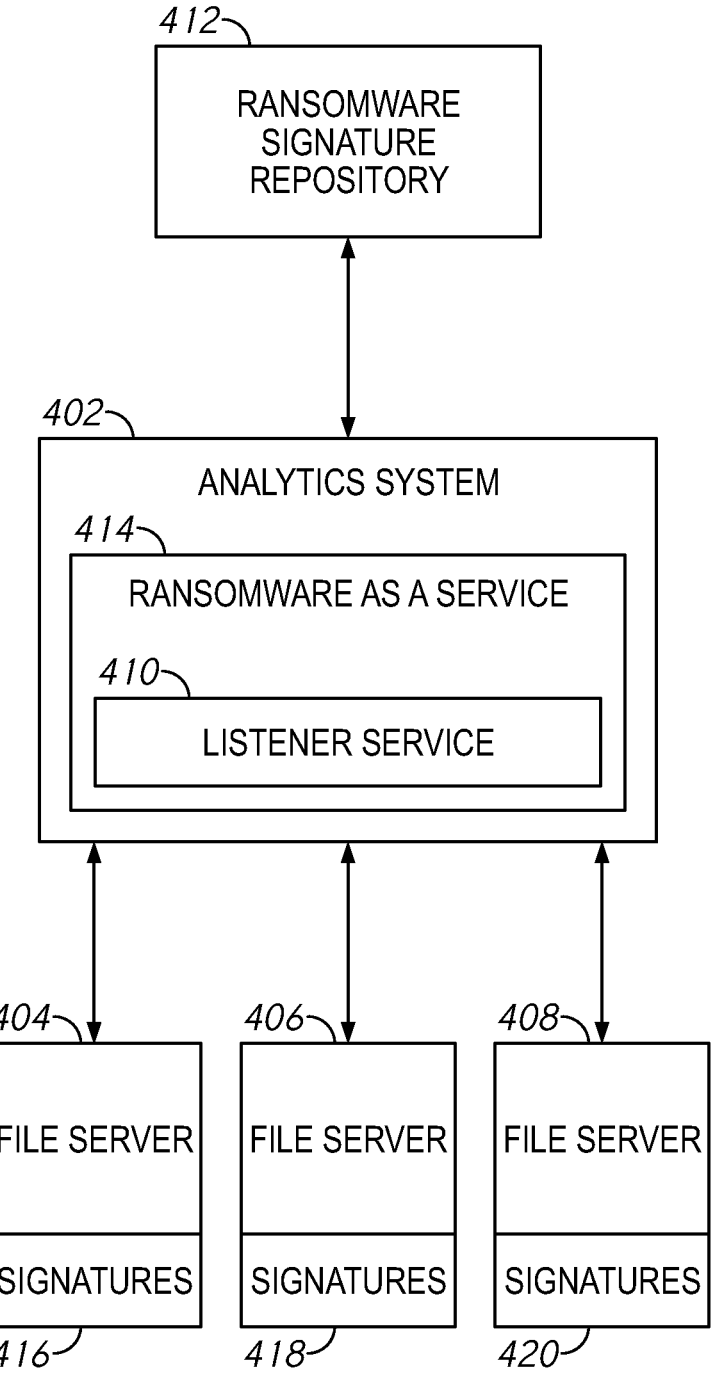
FIG. 4 is a schematic illustration of an analytics system including a ransomware service in accordance with examples described herein.

FIG. 4 is a schematic illustration of an analytics system including a ransomware service in accordance with examples described herein. The system of FIG. 4 includes analytics system 402, ransomware signature repository 412, and file server 404, file server 406, and file server 408. The analytics system 402 may include ransomware as a service 414, which may include listener service 410. Each file server may maintain a repository of ransomware signatures, such as signatures 416, signatures 418, and signatures 420. The analytics system 402 may be in communication with ransomware signature repository 412.

The analytics system 402 may be implemented using any analytics system disclosed and/or described herein, including those described with reference to FIGS. 1-3. Examples of the file server 404, file server 406, and file server 408 may be implemented using any file server, including those described herein such as those described with reference to FIGS. 1A and 1B.

The components of FIG. 4 are exemplary. Additional, fewer, and/or different components may be used in other examples.

Examples of analytics systems described herein, such as the analytics system 402 of FIG. 4 may include a ransomware as a service, such as ransomware as a service 414 of FIG. 4. The ransomware as a service 414 may be implemented, for example using one or more software processes. The software processes may be implemented using one or more non-transitory computer readable media encoded with executable instructions which, when executed by one or more processors of one or more computing nodes used to implement the analytics system, cause the analytics system to perform the ransomware as a service operations described herein.

Example of ransomware as a service processes described herein may include a listener service, such as listener service 410 of FIG. 4. Listener services may generally be in regular communication with a repository of ransomware signatures using local, networked, or other communication. In the example of FIG. 4, the listener service 410 may be in communication with ransomware signature repository 412 using periodic API calls to the ransomware signature repository 412. The listener service may be implemented in software, e.g., using executable instructions encoded on one or more computer readable media.

Examples of analytics systems described herein may be in communication with one or more ransomware signature repositories, such as ransomware signature repository 412 of FIG. 4. In some examples, the ransomware as a service software and/or the listener service, such as ransomware as a service 414 and/or listener service 410 of FIG. 4 may be in communication with the ransomware signature repository. Ransomware signature repositories may generally be implemented using one or more storage devices (e.g., hard drives, solid state drives) and/or other electronic storage media (e.g., memory). The storage devices may store one or more signatures of ransomware. Ransomware signatures generally refer to artifacts of a ransomware attack that may be identified as indicative of a ransomware attack. In some examples, a ransomware signature may include a sequence of events and/or process or user names associated with one or more known ransomware attacks. For example, a pattern of events for a file may be indicative of a ransomware attack. The pattern may be stored as a ransomware signature. In some examples, a particular manner in which a file is renamed (e.g., name and/or file extension) may be indicative of a ransomware attack. The features regarding the name and/or file extension may be stored as a ransomware signature. The ransomware signature repository 412 may include one or more computer systems in communication with the storage devices storing the ransomware signatures, such that the computer system(s) may communicate with analytics systems described herein, such as analytics system 402 of FIG. 4.

The ransomware signature repository 412 may be implemented, for example, using a File Server Resource Manager (FSRM). The ransomware signature repository 412 may be implemented using a public repository of ransomware signatures. The ransomware signature repository 412 may be administered by one or more administrators that may update, revise, delete, and/or add ransomware signatures over time as additional event patterns and/or users become associated with ransomware attacks.

Note that the ransomware signature repository 412 may store any number of ransomware signatures. In some examples, more than 2000 ransomware signatures are stored. In some examples, more than 4000 ransomware signatures are stored. In some examples, more than 10,000 ransomware signatures are stored. Other numbers of signatures may be used in other examples.

Examples of analytics systems described herein may be in communication with and/or associated with one or more file servers. In the example of FIG. 4, three file servers are shown-file server 404, file server 406, and file server 408, however any number may be used. In some examples, each file server may be associated with a different client (e.g., a different tenant). The file servers may be implemented using generally any file servers, including file servers described herein, such as virtualized file servers described with reference to FIG. 1A and FIG. 1B. The file servers may generally provide access to one or more file systems, including one or more namespaces of storage items, which may be stored by the file server in one or more storage devices. Each file server may include its own ransomware signature repository, such as signatures 416, signatures 418, and signatures 420 of FIG. 4. The file server 404 may store signatures 416, the file server 406 may store signatures 418, and the file server 408 may store signatures 420. The file servers may utilize the signatures in signatures 416, signatures 418, and signatures 420 to locally (e.g., by the file server) identify a ransomware attack on the file server.

As described herein, each of the file servers subscribed to the ransomware as a service may provide file events to the analytics system. Accordingly, the analytics system may maintain an audit log of file events at each of the file servers in communication with the analytics system.

The file servers may generally implement one or more file blocking policies in accordance with the ransomware signatures. For example, the file server 404 may implement a file blocking policy in accordance with the signatures 416. The blocking policy may make a file inaccessible that has been subject to a ransomware attack as identified by the signatures 416. In some examples, the blocking policy may prohibit certain user interactions with a file that would cause one of the signatures 416 to be met. Moreover, the file servers may remediate a ransomware attack. Remediation may occur in some examples in cooperation with the analytics system 402. The file servers may replace a file or other storage item affected by a ransomware attack with a previous version of the file. The previous version of the file may be stored at the file server and/or at the analytics system 402. For example, one or more snapshots of all or a portion of the file server may be used to remediate a ransomware attack. The snapshots may be stored in a location accessible to the analytics system 402 in some examples.

The file servers of FIG. 4 may be subscribed to the analytics system 402. For example, the file server 404, file server 406, and file server 408 may be registered with the analytics system 402 and in communication with the analytics system 402. One or more of the file servers of FIG. 4 may be subscribed to the ransomware as a service offering of the analytics system 402. If so, the subscribed file servers may receive ransomware signature updates from the analytics system 402 as described herein in some examples. The analytics system 402 may maintain a log of events occurring on each of the file servers-file server 404, file server 406, and file server 408. The log of events may include an audit log. The log of events may include an identification of each file operation which has been requested and/or processed for each file of the file server. Examples of file operations include, for example, read, write, copy, rename, and delete. The analytics system 402 may maintain a log of ransomware signatures stored at each file server, such as signatures 416, signatures 418, and signatures 420.

In some examples the file servers of FIG. 4 may be subscribed to the auto update of ransomware signature features described herein. For example, the one or more of the file servers shown in FIG. 4 may be included in the activities of the ransomware as a service 414 described herein. In some examples, a data model may be provided to facilitate tracking the file servers that are subscribed to ransomware as a service and/or to the auto-update features for ransomware signatures described herein. For example, the analytics system 402 may maintain a configuration data structure (e.g., a configuration table). The configuration data structure may be stored in a storage device and/or memory accessible to the analytics system 402. The configuration data structure may contain an association (e.g., a flag) between each file server and subscription to ransomware as a service (e.g., ransomware detection and/or remediation). The flag may be implemented, for example, as a bit. When the bit has a particular value (e.g., 0), the associated file server may not be subscribed to ransomware detection and/or remediation services of the analytics system 402. When the bit has another value (e.g., 1), the associated file server may be subscribed to ransomware detection and/or remediation services of the analytics system 402. The configuration data structure may contain an association (e.g., a flag) between each file server and subscription to ransomware signature updates. The flag may be implemented, for example, as a bit. When the bit has a particular value (e.g., 0), the associated file server may not be subscribed to ransomware signature update services of the analytics system 402. When the bit has another value (e.g., 1), the associated file server may be subscribed to ransomware signature update services of the analytics system 402.

During operation, analytics systems described herein, such as analytics system 402 of FIG. 4 may keep file servers updated with new or changed ransomware signatures over time. For example, during operation, the listener service 410 may periodically provide API calls to ransomware signature repository 412 to identify new or changed ransomware signatures. In some examples, deleted or removed ransomware signatures may additionally or instead be identified using the API call. In other examples, other communication protocols may be used between analytics system 402 and ransomware signature repository 412.

When updated, changed, and/or deleted or removed ransomware signatures have been identified by the analytics system 402 (e.g., by the ransomware as a service 414), the ransomware as a service 414 may compare the changes to logs of signatures maintained at each file server subscribed to the analytics system 402—e.g., file server 404, file server 406, and file server 408 of FIG. 4. The analytics system 402 may identify ransomware signatures which may not be present at the individual file servers. For example, the listener service 410 may provide an API call to the ransomware signature repository 412 to request an identification of all ransomware signatures in the repository and/or to request an identification of new, changed, deleted, or removed ransomware signatures. In some examples, new, changed, deleted, or removed ransomware signatures may be identified by the ransomware as a service 414 by comparing an identification of all ransomware signatures in the ransomware signature repository 412 with a previously-received identification of all ransomware signatures in the ransomware signature repository 412. In some examples, only the new, changed, removed, and/or deleted ransomware signatures since a previous API call may be returned to the analytics system 402. In an example, a new ransomware signature may accordingly be identified by the analytics system 402. The analytics system 402 may compare the new ransomware signature with the ransomware signatures stored at file servers subscribed to the analytics system 402. For example, the analytics system 402 may compare a new ransomware signature with signatures 416, signatures 418, and/or signatures 420. The comparison may be performed in some examples by the analytics system 402 access the signatures as stored by the connected file servers. In some examples, however, the analytics system 402 may maintain a log of ransomware signatures present at each of the file servers and the comparison may be performed by accessing a local storage and/or memory of the analytics system 402 to determine whether any or all of the connected file servers have already stored the new ransomware signature. In some examples, a file server may have already stored the new ransomware signature if, for example, the file server had been attacked by the ransomware bearing the signature, and the attack had been identified by the file server, and a signature of the ransomware stored. Accordingly, the analytics system 402 may identify file servers which do not have the new ransomware signature stored. In one example, the analytics system 402 may identify that the new ransomware signature is already stored in signatures 416, but not in signatures 418 or signatures 420 for example. Accordingly, the analytics system 402 may provide the new ransomware signature to file servers which have not already stored the ransomware signature, such as file server 406 and file server 408 in this example. In an analogous manner, the analytics system 402 may update, delete, and/or remove signatures from connected file servers. By updating the signatures in signatures 416, signatures 418, and/or signatures 420, the analytics system 402 may accordingly update the behavior of the file blocking policy of the file server 404, file server 406, and/or file server 408, respectively. The file blocking policy may now address ransomware attacks in accordance with the new or changed signature.

In some examples, analytics systems described herein may evaluate conflicts between new and/or changed ransomware signatures received from a repository and ransomware signatures suitable for use on particular connected file servers. For example, a particular file server-such as file server 406 of FIG. 4 may have removed a particular ransomware signature. The analytics system 402 may be aware of the presence of these files, because the analytics system 402 may maintain a data structure (e.g., table) of ransomware signatures removed or otherwise blocked or unused by the file server 406. The analytics system 402 may additionally be aware of common file event patterns on the file server 406, because the analytics system 402 may maintain a log of file events occurring on the file server 406. In some examples, when the analytics system 402 identifies a new or changed ransomware signature that is in conflict with operation of a file server, it may not provide the new or changed ransomware signature to the file server. Accordingly, in one example consider that the analytics system 402 becomes aware of a new ransomware signature that identifies ransomware as associated with a behavior regularly used by the file server 406. Providing that ransomware signature to each file server may block proper operation of files of certain file servers. In some examples, the analytics system 402 accesses a log of file events for the file server 406, determines that a particular sequence of events may occur regularly at the file server. Accordingly, the analytics system 402 may provide the new ransomware signature associating the particular sequence of events with a ransomware attack to the file server 404 and file server 408, but not to the file server 406 in some examples.

In some examples, ransomware associated with a particular ransomware signature may attack a particular kind of file. For example, files created by a particular application may be targeted by particular ransomware. In an example, a ransomware signature may be indicative of a ransomware attack that targets files having a .txt file extension. The analytics system 402 and/or ransomware as a service 414 may access metadata of files in each of the file servers 404, 406, and 408. The analytics system 402 and/or ransomware as a service 414 may determine that a particular file server, file server 406 for example, does not host any .txt files. Accordingly, in some examples, ransomware signatures associated with ransomware attacks on .txt files may not be rolled out to the file server 406. While a .txt file has been used as an example, generally any file extension type may be used and ransomware signatures particular to files created by a particular application may not be provided to file servers that do not host any files created by that particular application.

In some examples, file servers may have stored signatures which may have been previously added by administrators or other entities or processes acting on the file server. For example, the signatures 416 stored by the file server 404 may include additional ransomware signatures which may not be present in signatures 418 and/or signatures 420. The additional ransomware signatures may have been added by an administrator of the file server 404 and/or other entity or process interacting with file server 404. These added ransomware signatures in some examples are not altered or removed by operation of the ransomware as a service 414. Accordingly, in some examples the ransomware as a service 414 may not conform the stored signatures of a particular file server to that of a global repository. For example, the analytics system 402 may not conform the signatures 416 to the signatures in the ransomware signature repository 412 in some examples. However, a new signature identified in the ransomware signature repository 412 by the analytics system 402 may be added to the signatures 416. In this manner, each of the file servers, file server 404, file server 406, and file server 408 may have additional unique ransomware signatures which may not be stored at other file servers and/or in ransomware signature repository 412.

In some examples, file servers may have had particular ransomware signatures removed by an administrator or other entity or process interacting with the file server. For example, the file server 404 may have had a ransomware signature removed from signatures 416 which may have interfered with proper operation of the file server 404. For example, an administrator or other process may determine that a particular ransomware signature, such as a signature associated with a particular sequence of events, may not be reliably associated with a ransomware event for the file server 404. Accordingly, an administrator may have deleted and/or removed one or more ransomware signatures from the signatures 416. In some examples, the file server 404 and/or analytics system 402 may maintain a log of ransomware signatures deleted or removed from the file servers. In this manner, when the analytics system 402 identifies a new ransomware signature from the ransomware signature repository 412, it may not provide the new ransomware signature to a particular file server if the particular file server had previously deleted and/or removed the ransomware signature, as indicated by a stored log of deleted or removed ransomware signatures.

When new ransomware signatures have been added to a specific file server's ransomware file blocking policy (e.g., to their stored signatures), the analytics system 402 may facilitate a notification to an administrator or other entity or process associated with the file server. For example, the analytics system 402 may provide an email notification to the recipients configured in the ransomware protection policy of that file server.

In some examples, the ransomware as a service 414 may attempt to update the signatures 416, signatures 418, and/or signatures 420 with new or changed ransomware signature identified on the ransomware signature repository 412. However, the update may fail in some examples, due to an interruption in connectivity between the analytics system 402 and one or more file servers, for example. In some examples, the analytics system 402 and/or ransomware as a service 414 may log the failure and may retry the update periodically and/or at another time. In some examples, the analytics system 402 and/or ransomware as a service 414 may provide a notification (e.g., an email) to alert an administrator of the file server and/or the analytics system 402 that an update failure has occurred.

In some examples, the analytics system 402 and/or ransomware as a service 414 may maintain a log including a timestamp of a last successful update of ransomware signatures for each connected file server—e.g., each of file server 404, file server 406, and file server 408 in the example of FIG. 4. The ransomware as a service 414 may provide updates to a particular file server based on the timestamp of the last successful update. For example, any new or changed ransomware signatures detected since the timestamp may be provided to the file server in some examples.

For example, the analytics system 402 may maintain a configuration data structure (e.g., configuration table). The configuration data structure may include an association between a file server (e.g., a UUID of a file server) and a latest version of ransomware signatures that have been rolled out (e.g., stored or updated at) the file server. In some examples, the association between a file server and a latest version of ransomware signatures is stored in the configuration data structure for only those file servers that have subscribed to the ransomware detection and/or remediation service or the ransomware signature update services described herein, as may also be indicated in the configuration data structure through associations described herein. For example, if the ransomware as a service 414 has stored new and/or updated ransomware signatures to a particular file server (e.g., file server 404), the association in the configuration data structure may be updated to associated file server 404 with an identifier of the latest version of ransomware signatures received by the ransomware as a service 414 and provided to the file server 404. If the provision of ransomware signatures to the file server 404 fails, the configuration data structure will associate the file server 404 with a previously version of ransomware signatures that was successfully provided to and recognized by the file server 404. The analytics system 402 and/or ransomware as a service 414 may utilize the configuration table associations to determine which file servers to retry sending updated ransomware signatures in the event of failure, for example.

Figure 5:
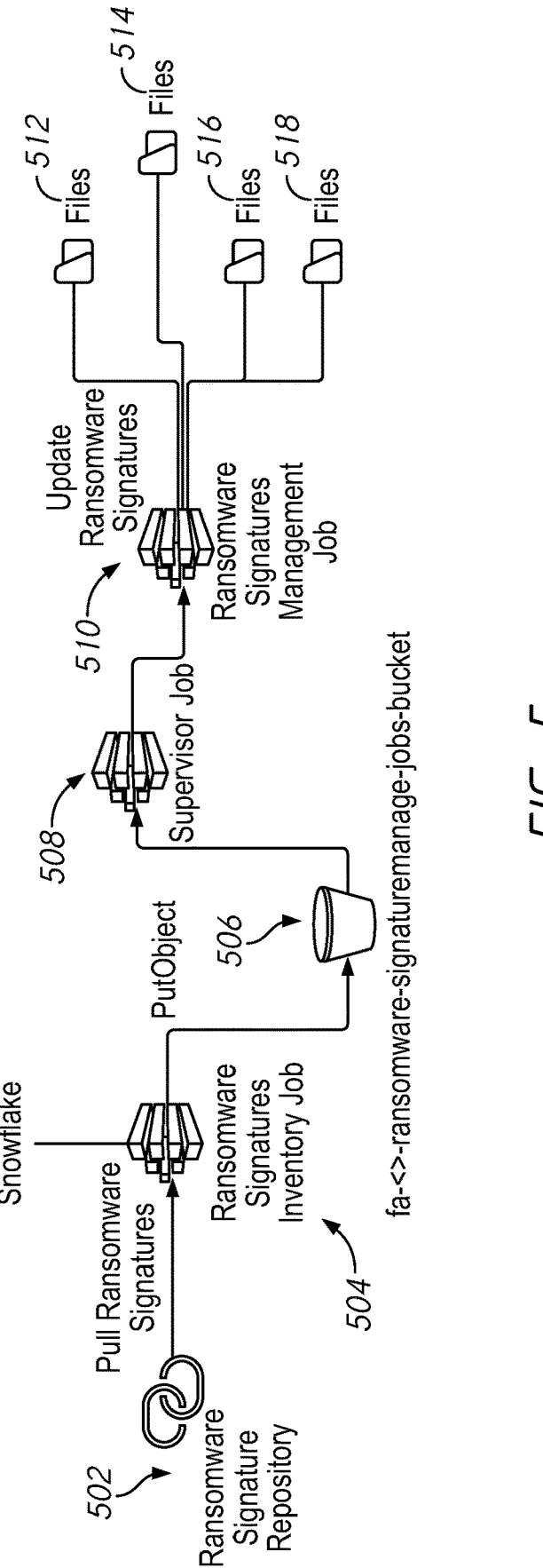
FIG. 5 is a schematic illustration of an implementation of a ransomware as a service system in accordance with an example described herein.

FIG. 5 is a schematic illustration of an implementation of a ransomware as a service system in accordance with an example described herein. The ransomware as a service example shown in FIG. 5 includes ransomware signature repository 502, ransomware signatures inventory job 504, signature manage jobs bucket 506, supervisor job 508, ransomware signatures management job 510, and file server 512, file server 514, file server 516, and file server 518. The system of FIG. 5 may be implemented and/or may be implemented using analytics systems described herein. For example, the analytics system 402 and/or ransomware as a service 414 of FIG. 4 may include the ransomware signatures inventory job 504, signature manage jobs bucket 506, supervisor job 508 and ransomware signatures management job 510 of FIG. 5. The file servers shown in FIG. 5 may be implemented using generally any file server, including file servers described herein such as with reference to FIG. 1A and FIG. 1B. The ransomware signature repository 502 may be implemented by and/or used to implement ransomware signature repository 412 of FIG. 4.

The jobs shown in FIG. 5 may be implemented as software—e.g., executable instructions stored on one or more non-transitory computer readable media for performing the functions of the job described herein. The job may be implemented, for example using one or more jobs on a cloud service provider, such as AMAZON WEB SERVICES. The executable instructions for performing the jobs may be executed by one or more processors of an analytics system described herein, such as analytics system 402 of FIG. 4. The components of FIG. 5 are exemplary only. Additional, different, and/or fewer components may be used in other examples.

Examples of analytics systems described herein may accordingly include a ransomware signatures inventory job 504. The ransomware signatures inventory job 504 may pull ransomware signatures from one or more repositories of ransomware signatures, such as ransomware signature repository 502. In some examples, the ransomware signatures inventory job 504 may be a batch job. In some examples the ransomware signatures inventory job 504 may download the signatures at a set interval (e.g., once in 15 days, once a week, once a day, once a month in some examples). The downloaded signatures may be stored, for example in signature manage jobs bucket 506. The ransomware signatures received by the ransomware signatures inventory job 504 may be associated with a create date and/or a modified date. The ransomware signatures inventory job 504 may compare the create date and/or modified date with a date or version number associated with subscribed file servers in a configuration data structure which may be maintained by the analytics and/or ransomware systems described herein. If the create and/or modify date of received ransomware signatures from the ransomware signature repository 502 is more recent than a date or associated version number associated with subscribed file servers, the ransomware signatures inventory job 504 may proceed to take actions to update ransomware signatures on one or more file servers.

Note that, in some examples, the ransomware signatures inventory job 504 may operate in an on demand mode. In the on demand mode, the ransomware signatures inventory job 504 may function to roll out a specified list of ransomware signatures. For example, an administrator of the analytics system 402 and/or one or more file servers described herein may identify particular ransomware signatures for rollout by ransomware as a service 414. The signatures, for example, may be a subset of signatures available at ransomware signature repository 502 and/or may be other signatures. The identified signatures may be stored in storage accessible to the analytics system 402 and/or the ransomware signatures inventory job 504. For example, the identified signatures may be stored in signature manage jobs bucket 506.

Examples of systems described herein may accordingly have storage for managing tasks and/or signatures used in rollout of ransomware signatures, such as signature manage jobs bucket 506 of FIG. 5. Generally any storage may be used. In the example of FIG. 5 the signature manage jobs bucket 506 may be implemented using an AMAZON S3 bucket, although other object storage services may be used in other examples.

The ransomware signatures inventory job 504 may update entries in a configuration data structure to associated the downloaded and/or identified ransomware signatures with the latest available signatures. For example, the configuration data structure may use a particular identifier (e.g., GLOBAL) to identify the ransomware signatures most recently obtained by the analytics system 402. The identifier may be used, for example, in place of a UUID for a file server where the configuration data structure may otherwise maintain association between file server IDs and ransomware signatures. Accordingly, an association between a particular UUID (e.g., GLOBAL) and most-recently received ransomware signatures may be stored in a configuration data structure. On receipt of new ransomware signatures and/or updated signatures, the ransomware signatures inventory job 504 may update the association to reflect the most recently received signatures. In some examples, the ransomware signatures inventory job 504 may store the previous indication of ransomware signatures in a configuration history data structure.

The ransomware signatures inventory job 504 may create a task for updating ransomware signatures. The task may initially have a status indicative of initialization—e.g., "not started." In some examples, the ransomware signatures inventory job 504 may compile information used in a task for each file server subscribed to ransomware signature updates. For example, the ransomware signatures inventory job 504 may compile a JSON file listing a task for each subscribed file server. The tasks (e.g., the JSON file) may be stored, such as in signature manage jobs bucket 506.

Examples described herein may include a supervisor job, such as supervisor job 508. The supervisor job 508 may monitor storage, such as the signature manage jobs bucket 506 to identify when additional actions may be triggered. For example, the supervisor job 508 may trigger ransomware signatures management job 510 responsive to objects being stored in the signature manage jobs bucket 506. For example, a put object event into signature manage jobs bucket 506 may cause the supervisor job 508 to trigger another job to begin the update process.

Examples described herein may include an update job, such as ransomware signatures management job 510. The ransomware signatures management job 510 may access stored information about update tasks (e.g., stored ransomware signatures and/or tasks in signature manage jobs bucket 506). For example, the ransomware signatures management job 510 may consume one or more JSON files in the signature manage jobs bucket 506. The ransomware signatures management job 510 may update the task status to a status indicative of in progress (e.g., "running"). The ransomware signatures management job 510 may compile a final list of ransomware signatures for each file server. For example, the ransomware signatures management job 510 may access data structures and/or communicate with the file servers to identify additional signatures previously added and/or removed at particular file server(s). This may cause a final list of ransomware signatures for update and/or a final list of ransomware signatures to be present at a file server to be different for one file server than another. The ransomware signatures management job 510 may accordingly update each subscribed file server with the final list of ransomware signatures for that file server. For example, the ransomware signatures management job 510 may provide the new and/or updated ransomware signatures to the file server, and the file server may store them in a signature repository used by the file server to identify ransomware.

When the rollout of signatures is successful (e.g., the file server acknowledges receipt and/or storage of the signatures to the ransomware signatures management job 510), the ransomware signatures management job 510 may update an association between the file server and the version of global ransomware signatures having been used to update that file server. For example, the analytics system 402 may store an association between each file server UUID and the last version of global ransomware signatures having been used to update the file server. The ransomware signatures management job 510 may retry the update if the rollout is not successful (e.g., the files server fails to acknowledge receipt and/or storage of the signatures). In some examples, the ransomware signatures management job 510 may retry an update of ransomware signatures responsive to identifying that an update is needed. For example, the ransomware signatures management job 510 may compare a last version of available ransomware signatures—e.g., a version associated with a GLOBAL or other indicator in the configuration data structure. That last version may be compared by the ransomware signatures management job 510 with a last version used to update a particular file server, which may be stored in the same or a different configuration data structure associated with the file server UUID. If the versions are different, the ransomware signatures management job 510 may retry an update for the file server.

The ransomware signature ransomware signatures management job 510 The ransomware signatures management job 510 may access a configuration data structure maintained by the analytics system 402 in some examples. When a flag in the configuration data structure indicates that a particular file server is subscribed to ransomware signature updates, the ransomware signatures management job 510 may perform updates to the ransomware signatures stored at the particular file server-such as any or all of file server 512, file server 514, file server 516, and/or file server 518 depicted in FIG. 5.

In some examples, analytics systems and/or ransomware as a service systems described herein may utilize ransomware signatures discovered at one subscribed file server to update other subscribed file servers. Accordingly, although examples have been described with respect to FIG. 4 and FIG. 5 that refer to the download of ransomware signatures from a repository of signatures, such as ransomware signature repository 412 of FIG. 4 and/or ransomware signature repository 502 of FIG. 5, it is to be understood that, in some examples, the ransomware as a service 414 may obtain new and/or updated signatures from one or more subscribed file servers themselves. For example, with reference to FIG. 4, the file server 404 may identify a new ransomware signature following a ransomware attack on the file server 404. The file server 404 may communicate the new ransomware signature to the ransomware as a service 414. The ransomware as a service 414 may process the new ransomware signature as described with respect to the processing of new signatures received from the ransomware signature repository 412. The ransomware as a service 414 may update configuration data structures, and roll out the new ransomware signature discovered by the file server 404 to other file servers-such as file server 406 and/or file server 408.

Once file servers receive new and/or updated ransomware signatures as described herein, the file servers may continue to operate normally (e.g., may continue to utilize and access all available files in a directory structure or other storage items). However, the file servers may be monitoring activity in accordance with the new or updated ransomware signatures. In this manner, the file servers are made aware of new threats. If a file server detects behavior (e.g., file access operations) consistent with a ransomware signature, the file server and/or the ransomware as a service system described herein may take action responsive to the detection of the ransomware signature. Actions may include blocking one or more users associated with the identified ransomware signature (e.g., users who took the actions contributing to those in the signature). Actions may include blocking access to one or more affected files by users of that file server. Actions may include remediating the attack (e.g., by replacing a file with a version stored prior to the identified ransomware activity).

Examples of analytics systems including ransomware as a service may implement a variety of features. The analytics systems may facilitate the monitoring and remediation of ransomware events in particular ways that may be based on the ability to receive new and updated ransomware signatures and deploy those received and updated signatures to subscribed systems on a continuous basis.

In some examples, a new or updated ransomware signature may be distributed in accordance with a prioritization rule. For example, the ransomware as a service 414 of FIG. 4 my implement a prioritization rule. The rule may be implemented as executable instructions to be executed by one or more processors of the analytics system 402. The executable instructions may be stored in memory and/or a storage device accessible to the analytics system 402. The prioritization rule may prioritize the distribution of new and/or changed ransomware signatures among subscribed file servers, such as file server 404, file server 406, and/or file server 408.

In some examples, the prioritization rule may prioritize distribution of a new or updated ransomware signature to other file servers associated with a same tenant or account as a file server on which the ransomware signature was discovered. For example, a new ransomware signature may be identified by file server 404, such as following a ransomware attack at the file server 404 in accordance with a new ransomware signature. The file server 404 may communicate the new ransomware signature to the ransomware as a service 414. The ransomware as a service 414 may accordingly update signatures at remaining file servers, such as file server 406 and/or file server 408 to include the new ransomware signature. In some examples, the update may be prioritized. For example, the file server 406 may be associated with a same tenant and/or account as the file server 404, where the new ransomware signature was identified. The file server 408 may be associated with a different tenant and/or account. Accordingly, the ransomware as a service 414 may prioritize delivery of the new ransomware signature to file server 406 over file server 408. For example, the file server 406 may receive the new ransomware signature before the file server 408.

In some examples, the ransomware as a service 414 may only provide the new ransomware signature identified at a file server to other file servers associated with the same customer and/or tenant. The analytics system 402 may maintain a tenant data structure (e.g., tenant table) which includes an association between each file server and its corresponding tenant and/or owner. The ransomware as a service 414 may access the tenant data structure to determine which file servers to provide a new ransomware signature to. For example, the ransomware signatures management job 510 of FIG. 5 may access the tenant data structure when updating ransomware signatures at subscribed file servers. In some examples, the ransomware signature discovered at a file server of one tenant may only be provided to file servers of other tenants after authorization by the tenant at which the ransomware was discovered. Accordingly, the analytics system 402 may provide a request to a computer system associated with the tenant having file server 404. The request may indicate that a new ransomware signature had been reported by file server 404, and seek authorization from the tenant to provide the new ransomware signature to file servers of other tenants. Authorization may be provided, for example, by clicking or selecting or otherwise communicating through a user interface to the analytics system 402 that authorization is provided for the ransomware as a service 414 to provide the new ransomware signature to the file servers of other tenants. After receipt of authorization, the ransomware as a service 414 may provide the new ransomware signature to file servers of other tenants, such as the file server 408. Generally, this prioritization may make the rollout process more effective because the fileservers belonging to the affected tenant may be more likely to experience an attack from the same ransomware given network proximity of the file servers in some examples.

In some examples, analytics systems described herein and/or file servers may review pre-existing audit events for indications of pre-existing infection from a newly detected ransomware signature. For example, when the ransomware as a service 414 had provided a new ransomware signature to a particular file server, such as file server 404, the analytics system 402 may access audit events for the file server and review previous audit events for an indication that the file server 404 has a pre-existing infection with the newly detected ransomware. In some examples, the file server 404 itself may review previous file server activity to detect the pre-existing infection. The analytics system 402 may review a log of audit events representing file system access operations at the file server 404. In some examples, one week of past audit events are reviewed, one month in some examples, one year in some examples, or other time periods of audit events in other examples. If audit events are found that correspond to the newly detected ransomware, the analytics system 402 and/or file server 404 may take action to remediate the pre-existing ransomware infection. In a similar manner, the analytics system 402 and/or file server 404 may rule out pre-existing infection if no audit events are found to correspond to the new ransomware signature. Review of audit events for pre-existing infection may also be prioritized. For example, audit logs of file servers associated with a same tenant at which the ransomware signature was detected may be reviewed first, before those of other file servers.

In some examples, analytics systems described herein may identify infection in newly onboarded file servers. Referring back to FIG. 4, a new file server (in addition to file server 404, file server 406, and file server 408) may become subscribed to the analytics system 402 and ransomware as a service 414. In such a situation, the analytics system 402 may not have an audit log of events for the new file server, because it has been newly added. However, new file servers generally may undergo a metadata scan by the analytics system 402 as part of their onboarding. Accordingly, the ransomware as a service 414 may, as part of the onboarding metadata scan of the analytics system 402, analyze for files whose metadata (e.g., their file names and/or extensions) match any ransomware signature of ransomware infected files. Any such potentially infected files if discovered may be flagged off to the customer for further review and possible remediation.

Examples of analytics systems and/or ransomware as a service systems described herein may recommend actions to remediate a detected and/or suspected ransomware attack. For example, if a potential infection is found for a particular file server, such as by matching a file and/or audit activity with a ransomware signature, the analytics system may determine a probable infection time stamp. For example, consider an example when the analytics system 402 and/or ransomware as a service 414 of FIG. 4 identify a ransomware attack on file server 404. In some examples, the file server 404 may itself identify the ransomware attack, and may notify the analytics system 402 and/or ransomware as a service 414. The analytics system 402 and/or ransomware as a service 414 may access metadata for files hosted by the file server 404 and/or audit logs for the file server 404. The analytics system 402 may store metadata of the file server 404 as part of its typical analytics function, for example. The time of notification of the ransomware attack may be used as the probable infection time stamp in some examples. The time of a last event in an audit log associated with a ransomware signature may be used as the probably infection time stamp in some examples. The analytics system 402 may identify one or more pre-existing snapshots of the affected file and/or share containing the affected file created before the probable infection time stamp. In this manner, when the analytics system 402 alerts a customer or other process of any infection and/or pre-existing infections, it may also recommend potential snapshot(s) for the customer or other process that may be used for recovery should the customer finally determines that these are indeed pre-existing undetected attack and hence the infected file and/or share should be restored back to a version prior to infection.

In some examples analytics systems described herein may identify a potential malicious client (e.g., a malicious user and/or machine) which may have been the source of the pre-existing undetected ransomware attack by looking at the audit event log and/or file metadata. The analytics system may flag these malicious clients to the tenant and/or file servers associated with the tenant and will further alert the tenant if these very clients are active and continue to access the file shares by looking at current audit events. The malicious client may be blocked as to all shares hosted by a file server in some examples, and/or just the particular suspected infected share in some examples. When blocked, the file server may prevent reads and/or writes to the share (or all shares) from that client.

Accordingly, analytics systems described herein may not only rollout ransomware signatures but may additionally undertake affirmative and proactive action in detecting pre-existing infections and undertaking remediation actions accordingly. Remediation actions may include sending a notification. The notification may be sent to a file server suspected of infection and/or to a customer or process associated with the file server and/or to a customer or process associated with a file suspected of infection. In some examples, remediation actions that may be taken by analytics systems described herein may include blocking a client as described herein. In some examples, remediation actions that may be taken by analytics systems described herein may include placing a suspected infected file server into read-only mode, with no clients able to read and/or to write to the shares hosted by the file server.

Figure 6:
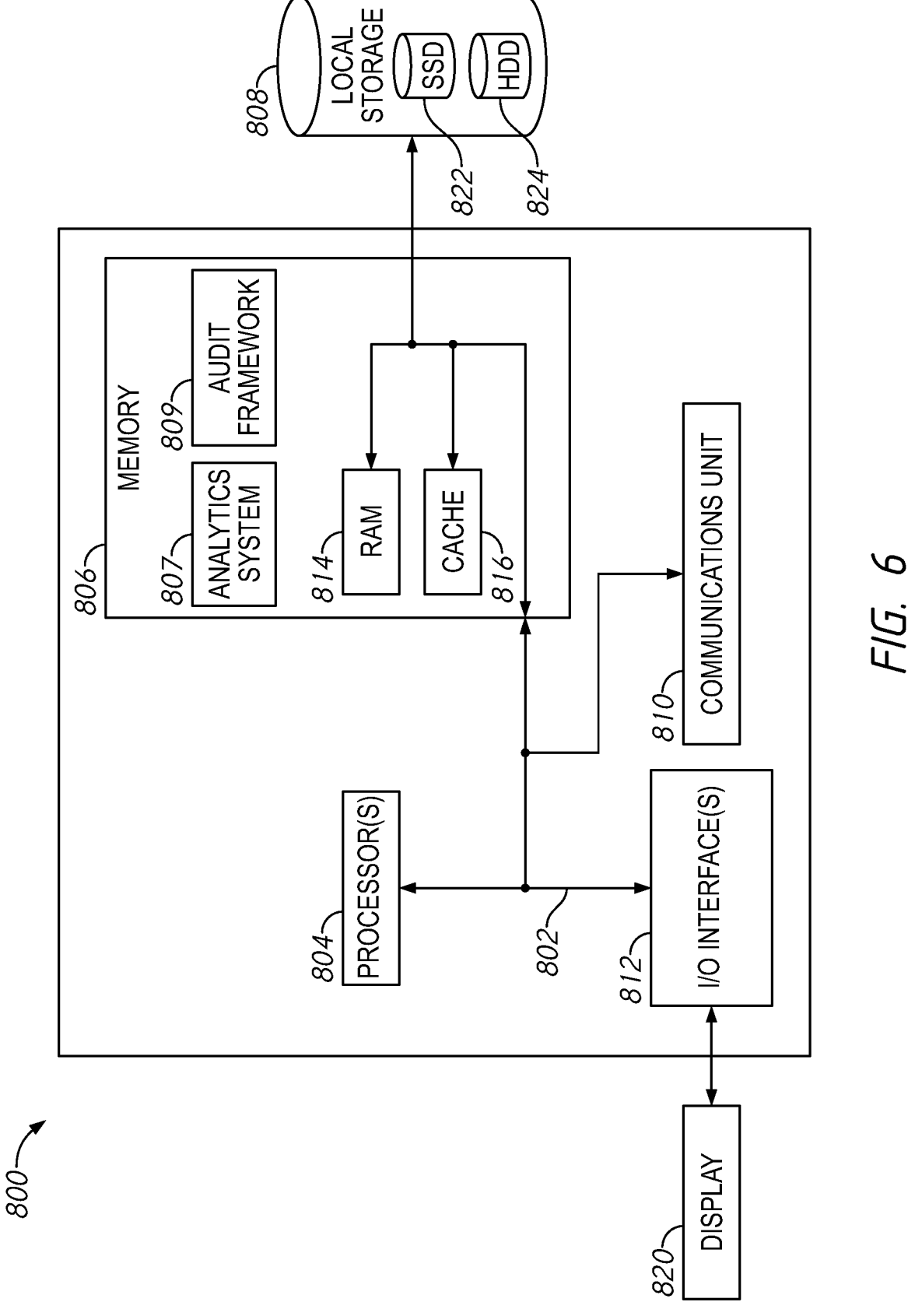
FIG. 6 is a schematic illustration of components of a computing node (e.g., computing device or computing system) in accordance with embodiments of the present disclosure.

FIG. 6 depicts a block diagram of components of a computing node (e.g., computing device or computing system) 800 in accordance with embodiments of the present disclosure. It should be appreciated that FIG. 6 provides only an illustration of one implementation and does not imply any limitations with regard to the environments in which different embodiments may be implemented. Many modifications to the depicted environment may be made. The computing node 800 may be implemented as at least part of the file server 160 of FIG. 1A, file server 202 of FIG. 2, analytics system 216 of FIG. 2, analytics system 402 of FIG. 4, and/or any other computing device and/or system described herein. In some examples, the computing node 800 may be a standalone computing node or part of a cluster of computing nodes configured to host a distributed file server (e.g., any of the file server virtual machines described herein).

The computing node 800 includes a communications fabric 802, which provides communications between one or more processor(s) 804, memory 806, local storage 808, communications unit 810, and I/O interface(s) 812. The communications fabric 802 can be implemented with any architecture designed for passing data and/or control information between processors (such as microprocessors, communications and network processors, etc.), system memory, peripheral devices, and any other hardware components within a system. For example, the communications fabric 802 can be implemented with one or more buses.

The memory 806 and the local storage 808 are computer-readable storage media. In this embodiment, the memory 806 includes random access memory RAM 814 and cache 816. In general, the memory 806 can include any suitable volatile or non-volatile computer-readable storage media. In an embodiment, the local storage 808 includes an SSD 822 and an HDD 824.

Various computer instructions, programs, files, images, etc. may be stored in local storage 808 for execution by one or more of the respective processor(s) 804 via one or more memories of memory 806. In some examples, local storage 808 includes a magnetic HDD 824. Alternatively, or in addition to a magnetic hard disk drive, local storage 808 can include the SSD 822, a semiconductor storage device, a read-only memory (ROM), an erasable programmable read-only memory (EPROM), a flash memory, or any other computer-readable storage media that is capable of storing program instructions or digital information.

The media used by local storage 808 may also be removable. For example, a removable hard drive may be used for local storage 808. Other examples include optical and magnetic disks, thumb drives, and smart cards that are inserted into a drive for transfer onto another computer-readable storage medium that is also part of local storage 808. The local storage may be configured to store executable instructions for an analytics system 807 and/or executable instructions for an audit framework 809. The analytics system 807 may perform operations described with reference to the analytics system 216 and/or analytics system 304 and/or analytics system 402 in some examples. The audit framework 809 may perform operations described with reference to the audit framework of the file server 202 of FIG. 2 and/or the audit framework 208 in some examples. In some examples, the memory 806 may be encoded with executable instructions for a query engine 242, policy engine and/or tiering engine as described herein, such as policy engine 244, policy engine 326, and/or tiering engine 314. In some examples, the computing node 800 may host one or more virtual machines and/or containers described herein.

Communications unit 810, in these examples, provides for communications with other data processing systems or devices. In these examples, communications unit 810 includes one or more network interface cards. Communications unit 810 may provide communications through the use of either or both physical and wireless communications links.

I/O interface(s) 812 allows for input and output of data with other devices that may be connected to computing node 800. For example, I/O interface(s) 812 may provide a connection to external device(s) 818 such as a keyboard, a keypad, a touch screen, and/or some other suitable input device. External device(s) 818 can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 808 via I/O interface(s) 812. I/O interface(s) 812 also connect to a display 820.

Display 820 provides a mechanism to display data to a user and may be, for example, a computer monitor. In some examples, a GUI associated with the user interface 236 of FIG. 2 and/or user interface 328 of FIG. 3 may be presented on the display 820.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signals or communications may be provided directly to and/or received directly from the recited components without intervening components, but also may be provided to and/or received from the certain components through intervening components.

What is claimed is:

1. A system comprising:
a repository of ransomware signatures, each of the ransomware signatures including a pattern of file events indicative of a ransomware attack;
an analytics system configured to periodically access a source of ransomware signatures and identify new or changed ransomware signatures and to provide new or changed ransomware signatures to file servers subscribed to a ransomware signature update service.

2. The system of claim 1, wherein the analytics system is configured to prevent adding a ransomware signature from the repository to a particular file server when a particular client has previously blocked the ransomware signature.

3. The system of claim 1, wherein the analytics system is configured to allow additional ransomware signatures at a particular file server when the particular file server has added the ransomware signature.

4. The system of claim 1, wherein the analytics system is configured to detect a new ransomware signature based on a ransomware attack on one of the file servers, the analytics system further configured to distribute the new ransomware signature to other ones of the file servers.

5. The system of claim 1, wherein the analytics system comprises a listener service configured for periodic communication with the repository of ransomware signatures.

6. The system of claim 1, wherein the pattern of file events indicative of the ransomware attacks include a rename event.

7. The system of claim 1, wherein at least one of the file servers includes a local ransomware signature repository, and wherein the new or changed ransomware signatures are used to update the local ransomware signature repository.

8. The system of claim 7, wherein the at least one of the file servers is configured to remediate a ransomware attack based on the local ransomware signature repository.

9. A method comprising:
   periodically connecting to a ransomware signature repository to identify a new or changed ransomware signature, wherein the new or changed ransomware signature is based on a pattern of file events;
   comparing the new or changed ransomware signature with ransomware signatures stored locally at a file server; and
   updating the file server with the new or changed ransomware signature based on said comparing.

10. The method of claim 9, wherein said periodically connecting comprises transmitting an API call to the ransomware signature repository.

11. The method of claim 9, further comprising identifying a deleted ransomware signature based on the ransomware signature repository.

12. The method of claim 9, wherein said updating the file server comprises updating a behavior of a file blocking policy of the file server.

13. The method of claim 9, further comprising refraining from updating a second file server with the new or changed ransomware signature when the second file server had previously removed the new or changed ransomware signature.

14. The method of claim 9, further comprising determining a particular sequence of events has occurred previously at a second file server; and
   refraining from updating the second file server with the new or changed ransomware signature when the new or changed ransomware signature includes the particular sequence of events.

15. The method of claim 9, further comprising:
   identifying a second ransomware signature based on a ransomware attack occurring on the file server; and
   updating the ransomware signature repository with the second ransomware signature.

16. The method of claim 9, further comprising distributing the new or changed ransomware signature to multiple file servers in accordance with a prioritization rule.

17. The method of claim 16, wherein the prioritization rule comprises a rule which prioritizes distribution of the new or changed ransomware signature to file servers associated with a same tenant from which the new or changed ransomware signature was discovered.

18. The method of claim 9, further comprising identifying pre-existing infection on the file server based on the new or changed ransomware signature.

19. The method of claim 9, further comprising identifying a malicious client based on the new or changed ransomware signature.

20. At least one non-transitory computer readable media encoded with instructions which, when executed, cause a system to perform operations comprising:
   periodically connecting to a ransomware signature repository to identify a new or changed ransomware signature, wherein the new or changed ransomware signature is based on a pattern of file events;
   comparing the new or changed ransomware signature with ransomware signatures stored locally at a file server; and
   updating the file server with the new or changed ransomware signature based on said comparing.

21. The non-transitory computer readable media of claim 20, wherein the operations further comprise refraining from updating a second file server with the new or changed ransomware signature when the second file server had previously removed the new or changed ransomware signature.

22. The non-transitory computer readable media of claim 20, wherein the operations further comprise:
   identifying a second ransomware signature based on a ransomware attack occurring on the file server; and
   updating the ransomware signature repository with the second ransomware signature.

23. The non-transitory computer readable media of claim 20, wherein the operations further comprise distributing the new or changed ransomware signature to multiple file servers in accordance with a prioritization rule.

24. The non-transitory computer readable media of claim 23, wherein the prioritization rule comprises a rule which prioritizes distribution of the new or changed ransomware signature to file servers associated with a same tenant from which the new or changed ransomware signature was discovered.

* * * * *